(12) United States Patent
Fuchie et al.

(10) Patent No.: US 8,170,120 B2
(45) Date of Patent: May 1, 2012

(54) INFORMATION PROCESSING APPARATUS AND INFORMATION PROCESSING METHOD

(75) Inventors: Takaaki Fuchie, Kanagawa (JP); Hiromi Yoshinari, Kanagawa (JP)

(73) Assignee: Sony Corporation, Tokyo (JP)

( * ) Notice: Subject to any disclaimer, the term of this patent is extended or adjusted under 35 U.S.C. 154(b) by 1277 days.

(21) Appl. No.: 11/899,005

(22) Filed: Aug. 30, 2007

(65) Prior Publication Data

US 2008/0056358 A1 Mar. 6, 2008

(30) Foreign Application Priority Data

Sep. 5, 2006 (JP) ................................ P2006-240301

(51) Int. Cl.
*H04N 7/12* (2006.01)
(52) U.S. Cl. ............................ 375/240.26; 375/240.21
(58) Field of Classification Search ............. 375/240.11, 375/240.19, 240.26, 240.27, 240.29, 240.21, 375/240.24

See application file for complete search history.

(56) References Cited

U.S. PATENT DOCUMENTS

| | | | |
|---|---|---|---|
| 5,696,557 A | 12/1997 | Yamashita et al. | |
| 5,835,662 A | 11/1998 | Inoue et al. | |
| 6,414,998 B1 | 7/2002 | Yoshinari et al. | |
| 6,414,999 B1 * | 7/2002 | Igi et al. | 375/240.26 |
| 6,529,550 B2 | 3/2003 | Tahara et al. | |
| 6,529,555 B1 * | 3/2003 | Saunders et al. | 375/240.26 |
| 6,567,471 B1 | 5/2003 | Yoshinari | |
| 6,721,453 B1 * | 4/2004 | Benson et al. | 382/199 |
| 2002/0080875 A1 * | 6/2002 | Tahara et al. | 375/240.02 |
| 2003/0185297 A1 * | 10/2003 | Greenfield et al. | 375/240.01 |
| 2004/0184551 A1 * | 9/2004 | Liu et al. | 375/260 |
| 2006/0045188 A1 | 3/2006 | Fuchie | |
| 2006/0045467 A1 | 3/2006 | Fuchie | |
| 2006/0067410 A1 * | 3/2006 | Park et al. | 375/240.25 |
| 2006/0072841 A1 * | 4/2006 | Terao | 382/240 |
| 2006/0083310 A1 * | 4/2006 | Zhang | 375/240.16 |
| 2006/0114350 A1 * | 6/2006 | Shimada et al. | 348/423.1 |
| 2006/0176954 A1 * | 8/2006 | Lu et al. | 375/240.03 |
| 2006/0209970 A1 * | 9/2006 | Kanterakis | 375/259 |
| 2007/0160128 A1 * | 7/2007 | Tian et al. | 375/240 |
| 2009/0010329 A1 * | 1/2009 | Hora | 375/240.12 |
| 2010/0254456 A1 * | 10/2010 | Matsushita et al. | 375/240.12 |

FOREIGN PATENT DOCUMENTS

| | | | |
|---|---|---|---|
| EP | 0940015 | * | 1/2004 |
| JP | 2000-134617 | | 5/2000 |
| JP | 2002 199392 | | 7/2002 |
| WO | WO 2006/022221 | | 3/2006 |

* cited by examiner

*Primary Examiner* — Eleni Shiferaw
*Assistant Examiner* — Abu Sholeman
(74) *Attorney, Agent, or Firm* — Frommer Lawrence & Haug LLP; William S. Frommer; Paul A. Levy

(57) ABSTRACT

An information processing apparatus for encoding a baseband signal, the information processing apparatus includes: a data splitting block; an encoder; a control block; and a splicing block. The data splitting block is configured to acquire the baseband signal before splitting it into predetermined encoding sections. The encoder is configured to generate encoded streams by parallelly encoding a continuous plurality of the encoding sections acquired by the data splitting block from the baseband signal. The control block is configured to control the encoder to perform the parallel encoding in a manner subject to predetermined constraints. The splicing block is configured to splice the encoded streams generated by the encoder.

12 Claims, 30 Drawing Sheets

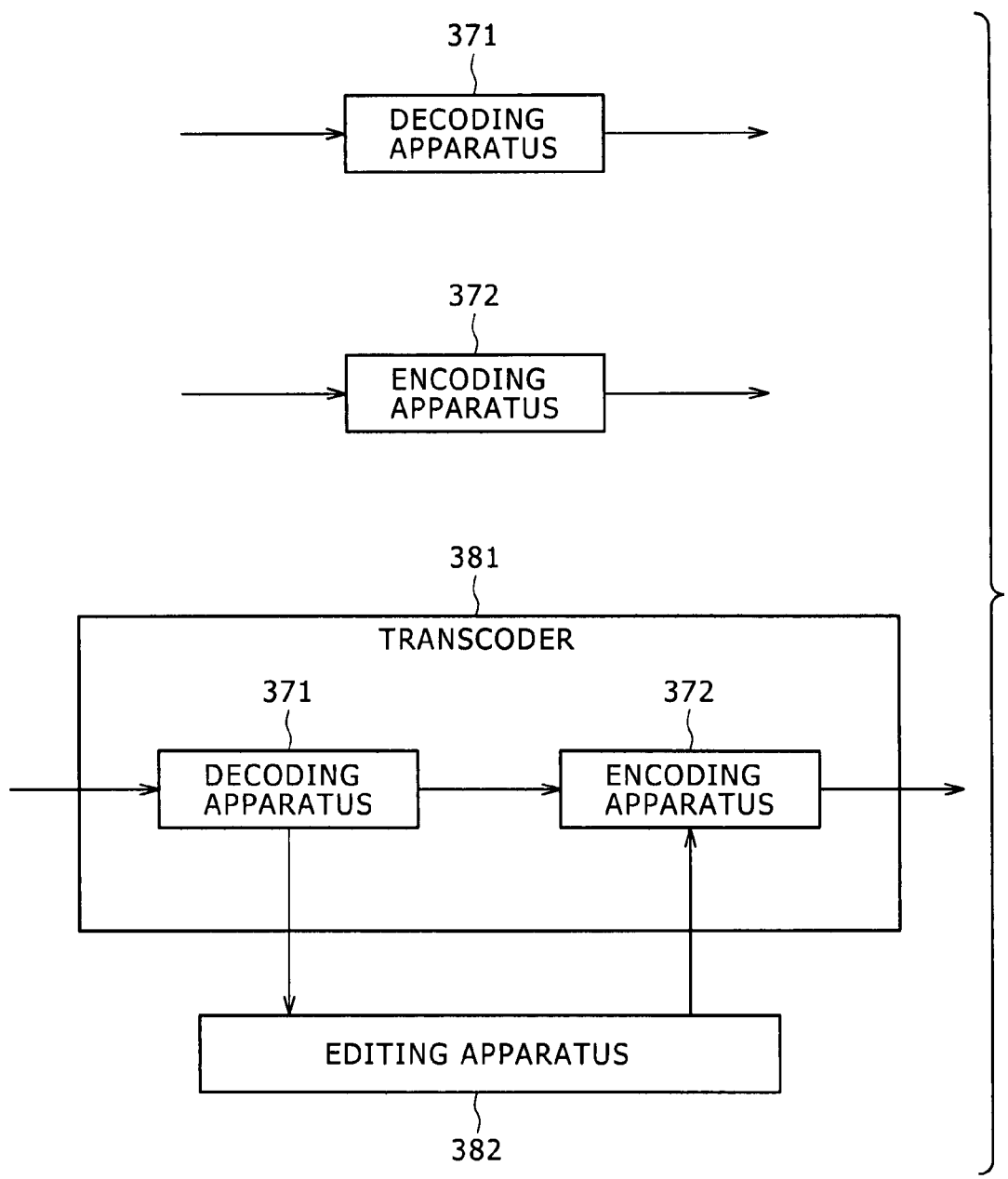

INFORMATION PROCESSING APPARATUS AND INFORMATION PROCESSING METHOD

CROSS REFERENCES TO RELATED APPLICATIONS

The present invention contains subject matter related to Japanese Patent Application JP 2006-240301 filed with the Japan Patent Office on Sep. 5, 2006, the entire contents of which being incorporated herein by reference.

BACKGROUND OF THE INVENTION

1. Field of the Invention

The present invention relates to an information processing apparatus and an information processing method. More particularly, the invention relates to an information processing apparatus and an information processing method used advantageously to carry out encoding.

2. Description of the Related Art

Picture compression systems, of which the MPEG (Moving Picture Coding Experts Group/Moving Picture Experts Group) is a representative standard, accomplish high degrees of data compression efficiency by compression-encoding video signals through inter-frame prediction.

Under the MPEG standard, there is a compression encoding system called Long-GOP (Group of Pictures) compression which utilizes bidirectional inter-frame prediction involving three picture types: I-picture, P-picture and B-picture.

The I-picture is short for an intra coded picture. Coded independently of other pictures, the picture can be decoded using information about this picture alone. The P-picture is short for an inter-frame forward predictive coded picture that is expressed by the differential relative to the temporally preceding frame (i.e., in forward direction). The B-picture is short for a bidirectionally predictive coded picture. This picture is coded through motion compensation inter-frame prediction using the temporally preceding (forward) or subsequent (backward) picture, or both the preceding and the subsequent pictures (bidirectional).

In a video editing setup, the pictures compressed through inter-frame prediction are subject to the constraints of relations of predictive compressed signals between the frames involved. That means video materials may not be spliced using the predictive compressed video signals. Thus most systems designed in advance to edit video materials perform their coding through intra-frame compression and dispense with inter-frame prediction.

However, where video signals involving huge quantities of high-resolution video information (e.g., HD (high definition) signals) are handled, coding through intra-frame compression alone yields low degrees of compression efficiency. If it is desired to send or store large quantities of data, intra-frame compression coding can thus result in low transmission speeds, large storage capacities required, and other related disadvantages. That in turn necessitates implementation of an expensive system capable of high-speed processing. In other words, inexpensive systems for handling video signals of high-resolution video information in large quantities should preferably raise their compression efficiency through the use of inter-frame prediction.

There already exist techniques for editing MPEG streams. According to one such technique (e.g., PCT Patent Publication No. WO99/05864), coded pictures in the vicinity of edit points (splicing points) are temporarily decoded so that the video signals in uncompressed form are spliced at the edit points, before the pictures are again encoded. According to another such technique (e.g., Japanese Patent Application No. Hei 10-178645), frames are each split into portions before they are encoded in order to implement high-speed coding.

SUMMARY OF THE INVENTION

As discussed in the above-cited PCT Patent Publication No. WO99/05864, the need exists for speeding the coding process so as to boost the efficiency of data editing and data conversion involving coding. Today, encoders for performing common Long-GOP structure compression barely operate in real time or fall behind it in terms of processing speed. As a result, it takes an inordinately long time to convert long-running materials.

Another way to speed the coding process is by splitting each of the frames into portions before they are encoded, as described in the above-cited Japanese Patent Application No. Hei 10-178645. Under this scheme, however, each frame is split into a plurality of portions so that controls tend to be unduly complex in the execution of inter-frame and intra-frame references and in the splicing of the split frame portions back into each frame.

The present invention has been made in view of the above circumstances and it is desirable to provide information processing apparatus and information processing method for carrying out encoding at high speed without splitting each of the frames involved.

In carrying out the present invention and according to one embodiment of the present invention, there is provided an information processing apparatus for encoding a baseband signal, the information processing apparatus including: a data splitting block; an encoder; a control block; and a splicing block. The data splitting block is configured to acquire the baseband signal before splitting it into predetermined encoding sections. The encoder is configured to generate encoded streams by parallelly encoding a continuous plurality of the encoding sections acquired by the data splitting block from the baseband signal. The control block is configured to control the encoder to perform the parallel encoding in a manner subject to predetermined constraints. The splicing block is configured to splice the encoded streams generated by the encoder.

Preferably, the constraints may involve performing the encoding process in such a manner that the encoding sections acquired by the data splitting block have boundaries overlapping with the boundaries of GOPs of the encoded streams generated by the encoder.

The constraints may preferably involve performing the encoding process in such a manner that a starting GOP of each of the encoding sections acquired by the data splitting block is used as a closed GOP.

The constraints may preferably involve adding either a Sequence Header or a Quant Matrix Extension to an encode starting point of each of the encoding sections acquired by the data splitting block.

The constraints may preferably involve controlling a generated code quantity in such a manner that VBV buffer occupancy at an encode ending point of each of the encoding sections acquired by the data splitting block becomes equal to VBV buffer occupancy at an encode starting point of the next encoding section.

The constraints may preferably involve performing the encoding process in such a manner that the encoding sections acquired by the data splitting block have boundaries shifted temporally backward by an interval M from the boundaries of GOPs of the encoded streams generated by the encoder, the interval M separating either an I-picture from the next I-picture or a P-picture from the next P-picture.

The constraints may preferably involve performing the encoding process in such a manner as to acquire a baseband signal provided with the last picture of the preceding encoding section for each encoding section preceded by the baseband signal corresponding to another encoding section among the encoding sections acquired by the data splitting block, the last picture of the preceding encoding section being not output when encoded but used as a reference picture.

The constraints may preferably involve matching conditions for encoding the last picture of the preceding encoding section used as the reference picture, to the conditions for encoding the corresponding picture of the preceding encoding section being parallelly encoded.

Preferably, the encoding conditions above may include bits assigned to the pictures and a Q scale of a first macro block.

Preferably, the constraints may further involve performing the encoding process in such a manner as to acquire a baseband signal provided with the last M+1 pictures of the preceding encoding section for each encoding section preceded by the baseband signal corresponding to another section among the encoding sections acquired by the data splitting block, the last picture of the preceding encoding section being not output when encoded but used as a reference picture.

The constraints may preferably involve encoding a second and a third picture from the last M+1 pictures of the preceding encoding section using the encoded first picture as the reference picture, the second and the third pictures being not output when encoded but used as a basis for controlling the generated code quantity corresponding to the encoded second and third pictures of the preceding encoding section being parallelly encoded.

The constraints may preferably involve performing the encoding process using the first picture among the last M+1 pictures of the preceding encoding section acquired as an I-picture.

According to another embodiment of the present invention, there is provided an information processing method for use with an information processing apparatus for encoding a baseband signal, the information processing method including the steps of: controlling; controlling; generating; and splicing. The controlling step controls acquisition of the baseband signal before splitting it into predetermined encoding sections. The controlling step controls supply of a continuous plurality of the acquired encoding sections to encoders of the information processing apparatus. The generating step generates encoded streams by causing the encoders parallelly to encode the encoding sections including the baseband in a manner subject to predetermined constraints. The splicing step splices the encoded streams generated.

According to the present invention, as outlined above, a baseband is first acquired and split into predetermined encoding sections. A continuous plurality of the split encoding sections included in the baseband signal are provided to encoders for parallel encoding subject to predetermined constraints. Encoded streams generated by the encoders are then spliced.

In the description that follows, the term "network" will refer to a setup that connects at least two apparatuses in a manner enabling one apparatus to send information to the other apparatus. The apparatuses communicating with one another through the network may either be independent of one another or constitute internal blocks that form a single piece of equipment.

Also in the ensuing description, the term "communication" will refer to arrangements that function wirelessly or in wired fashion. The arrangements may alternatively work in a manner in which wired communications performed in one zone are taken over by wireless communications in another zone. The arrangements may further work in such a manner that one apparatus communicates in wired fashion with another apparatus which in turn communicates wirelessly with yet another apparatus, and so on.

Furthermore, the term "editing apparatus" will refer to an independent apparatus for editing or to a block for carrying out editing processes within an information processing apparatus.

According to the embodiments of the present invention outlined above, the baseband signal arranged in units of predetermined encoding sections is parallelly encoded in a manner subject to predetermined constraints before being spliced into correctly encoded streams.

BRIEF DESCRIPTION OF THE DRAWINGS

Further advantages of the present invention will become apparent upon a reading of the following description and appended drawings in which:

FIG. 30 is a schematic view explanatory of a structure of another apparatus to which the present invention can be applied.

DETAILED DESCRIPTION OF THE PREFERRED EMBODIMENTS

Figure 1:
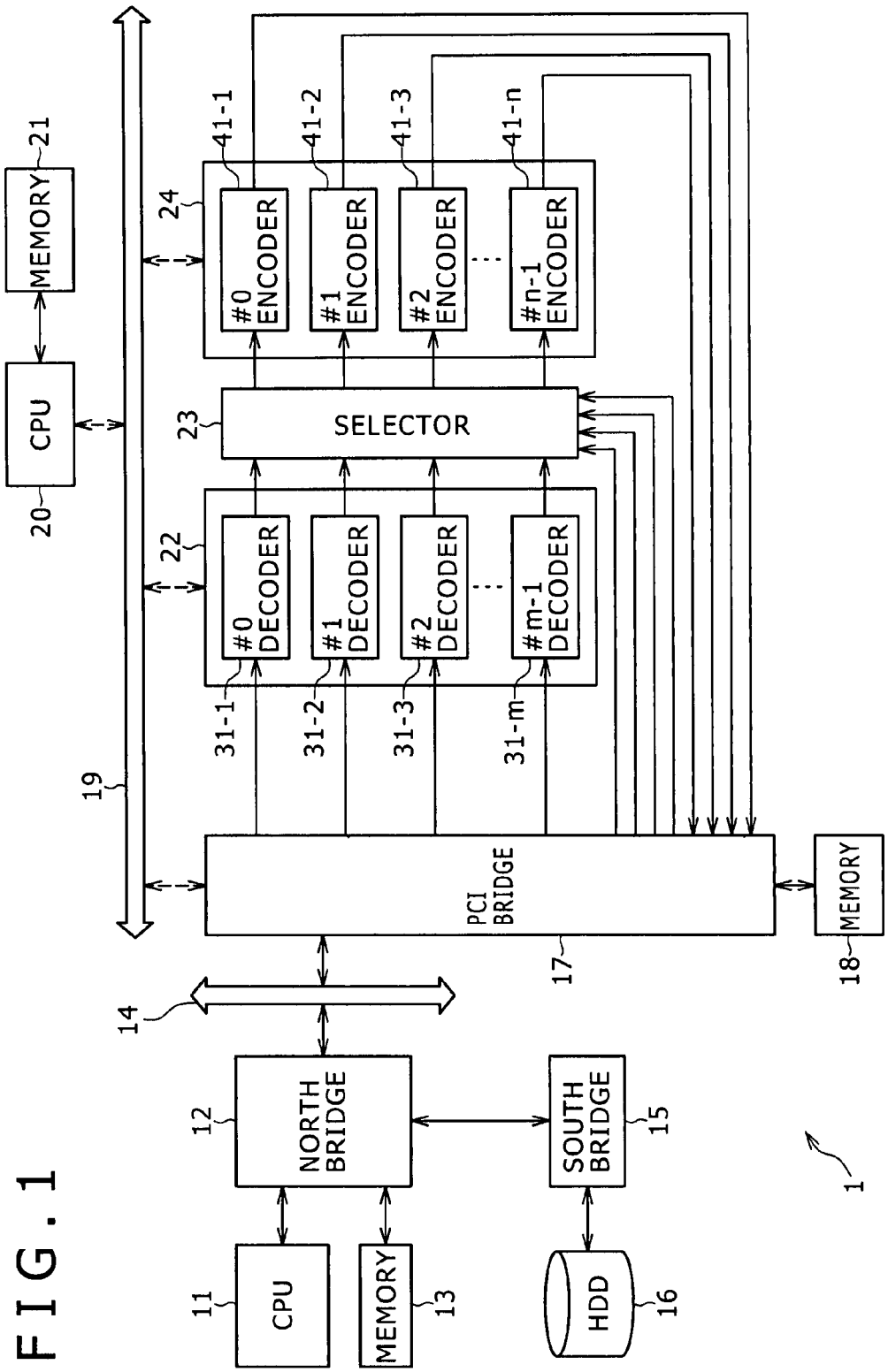
FIG. 1 is a block diagram showing a structure of an editing apparatus.

Preferred embodiments of the present invention will now be described in reference to the accompanying drawings. FIG. 1 is a block diagram showing a hardware structure of an editing apparatus 1 practiced as an embodiment of the present invention.

A CPU (Central Processing Unit) 11 connected to a north bridge 12 for example reads data from a HDD (Hard Disk Drive) 16 and generates and outputs control signals and commands to control editing processes performed by a CPU 20. Under control of the CPU 11, the north bridge 12 connected to a PCI (Peripheral Component Interconnect/Interface) bus 14 for example receives data from the HDD 16 and forwards the received data to a memory 18 via the PCI bus 14 and a PCI bridge 17. The north bridge 12 is also connected to a memory 13 and exchanges with the memory 13 the data necessary for processing by the CPU 11.

The memory 13 stores the data for the CPU 11 in carrying out its processing. A south bridge 15 controls writing and reading of data to and from the HDD 16. The HDD 16 stores uncompressed baseband signals or encoded data.

The PCI bridge 17 controls writing and reading of data to and from the memory 18, supply of either encoded streams to a decoder unit 22 or uncompressed data to a selector 23, and exchanges of data over the PCI bus 14 and a control bus 19. Under control of the PCI bridge 17, the memory 18 stores the baseband signal or encoded data retrieved from the HDD 16 and the encoded data provided from an encoder unit 24.

The CPU 20 controls processes to be performed by the PCI bridge 17, decoder unit 22, selector 23, and encoder unit 24 in accordance with the control signals and commands provided from the CPU 11 via the north bridge 12, PCI bus 14, PCI bridge 17, and control bus 19. A memory 21 stores the data for the CPU 20 in executing its processing.

The decoder unit 22 includes as many as "m" decoders 31-1 through 31-*m*. Under control of the CPU 20, the decoder unit 22 decodes the encoded streams provided from the PCI bridge 17 and forwards the decoded streams to the selector 23. The decoders 31-1 through 31-*m* included in the decoder unit 22 may operate in parallel.

In the description that follows, the "m" decoders may be called individually #0 decoder 31-1, #1 decoder 31-2, #2 decoder 31-3, . . . , #m−1 decoder 31-*m*. Where there is no need to distinguish one decoder from another, the decoders will be simply referred to as the decoder 31.

The selector 23 chronologically splits an uncompressed baseband signal provided from the PCI bridge 17 or from the decoder unit 22 into data units of a predetermined length each. The split data units are provided to a plurality of encoders 41-1 through 41-*n* included in the encoder unit 24.

The data units split by the selector 23 are referred to as sections each having a length called "Section_Length." The selector 23 supplies the encoder unit 24 with ranges of data necessary for encoding the data corresponding to given sections. Those sections of the baseband signal that are provided to the encoder unit 24 may be independent of one another or may partially overlap with one another.

Under control of the CPU 20, the encoder unit 24 includes the encoders 41-1 through 41-*n* encodes the uncompressed baseband provided from the selector 23 in a manner subject to predetermined constraints and outputs the encoded data to the PCI bridge 17. The encoders 41-1 through 41-*n* can operate in parallel. The encoders 41-1 through 41-*n* working in parallel are subject to the constraints so that their processing will be executed correctly. Details about the constraints will be described later.

The encoder unit 24 as a whole or the individual encoders 41-1 through 41-*n* may be an independent units not included in the editing apparatus 1. For example, if the encoder unit 24 is furnished as an independent unit, the encoder unit 24 will receive the input of uncompressed video signals, encode the signals through processes to be discussed later, and output the encoded data.

In the ensuing description, the "n" encoders may be called individually #0 encoder 41-1, #1 encoder 41-2, #2 encoder 41-3, . . . , #n−1 encoder 41-*n*. Where there is no need to distinguish one encoder from another, the encoders will be simply referred to as the encoder 41.

How the editing apparatus 1 works will now be described.

The HDD 16 stores streams compressed by Long-GOP compression using an open-GOP system, intra coded streams, and uncompressed baseband signals. The CPU 11 receives operations input by the user through an operation input unit, not shown, determines on the data to be encoded on the basis of the user's operation input, and determines whether to decode the encoded data subsequently.

The CPU 11 sends the encoded streams or baseband signal to be processed to the PCI bridge 17 via the north bridge 12 and PCI bus 14, and generates commands. If there are parameters necessary for decoding or encoding, the CPU 11 supplies the parameters together with the generated commands to the CPU 20 through the north bridge 12, PCI bus 14, PCI bridge 17, and control bus 19.

The CPU 20 controls the PCI bridge 17 to store the provided encoded streams or baseband signal into the memory 18. If the provided data is the encoded streams to be decoded according to the provided command, the CPU 20 controls the PCI bridge 17 to send the encoded streams to the decoder unit 22. If the provided data is the baseband signal not to be decoded, then the CPU 20 controls the PCI bridge 17 to provide the baseband signal to the selector 23.

The decoders 31-1 through 31-*m* included in the decoder unit 22 can operate in parallel. If one stream is to be decoded using a plurality of decoders 31, the CPU 20 controls the PCI bridge 17 to split the encoded stream into sections. If the stream turns out to be an encoded stream acquired by the open-GOP system based on Long-GOP compression, then the CPU 20 sends the stream sections to the corresponding decoders 31 together with reference picture frames for the decoders for their decoding.

Then the CPU 20 control the decoder unit 22 to carry out the decoding process and to supply the uncompressed baseband signal acquired by decoding to the selector 23. Under control of the CPU 20, #0 decoder 31-1 through #m−1 decoder 31-*m* included in the decoder unit 22 decode the provided data into an uncompressed baseband signal that is sent to the selector 23.

In accordance with the command from the CPU 11, the CPU 20 controls the selector 23 to split the provided baseband signal into sections and to establish groups of as many sections as the number of the parallelly operated encoders 41. The sections to be encoded of the baseband signal are provided to a predetermined number of the encoders 41 which constitute part of the encoder unit 24 and which are used to encode the sections. Under control of the CPU 20, the selector 23 splits the provided data into sections of a predetermined length each and establishes groups of as many sections as the number of the parallelly operated encoders 41. The baseband signal to encode each section is sent to the encoders 41 in such a manner that the baseband corresponding to any one section group is concurrently encoded by one of the encoders 41.

In accordance with the command from the CPU 11, the CPU 20 causes the encoder unit 24 to encode the respective sections and to provide the encoded streams to the PCI bridge 17. Part or all of the encoders 41-1 through 41-n included in the encoder unit 24 can operate in parallel. The encoding process of the encoder unit 24 is subject to constraints, to be discussed later, so that the streams encoded by the parallelly operated encoders 41-1 through 41-n will be subsequently spliced correctly.

Of the encoders 41-1 through 41-n included in the encoder unit 24, those which are provided with the baseband signal proceed to encode the provided data under control of the CPU 20 in a manner subject to the predetermined constraints. The constraints and the encoding process will be discussed later in more detail. The individual encoders 41 send the encoded streams to the PCI bridge 17.

In accordance with the command from the CPU 11, the CPU 20 controls the PCI bridge 17 to adjust the addresses in the memory 18 to which to store the encoded streams in the order designated by the user's operation input, with the encoded streams corresponding to the lengths of the sections provided from the encoders 41.

More specifically, the addresses to which to store the encoded streams in the memory 18 are arranged in such a manner that the encoded streams of which the lengths correspond to the sections generated through encoding by a plurality of encoders 41 are spliced to reconstruct the section groups. The section groups are in turn spliced together to reconstitute the unprocessed data. It might happen that a plurality of streams or baseband signals are designated to be spliced at a given edit point for example by the user's operation input. In that case, according to the command from the CPU 11, the stored addresses in the memory 18 are arranged to store the lengths of the sections involved in such a manner that the multiple streams or baseband signals are spliced at the edit point. In other words, the encoded streams of which the lengths correspond to the sections encoded by the encoder unit 24 are spliced in the memory 18.

By way of the control bus 19, PCI bridge 17, PCI bus 14, and north bridge 12, the CPU 20 notifies the CPU 11 that the data processing based on the provided commands has ended. In turn, the CPU 11 reads from the memory 17 the encoded streams spliced through the north bridge 12, PCI bus 14, and PCI bridge 17. The retrieved streams are stored onto the HDD 16 via the north bridge 12 and the south bridge 15 or output to an external apparatus through an interface, not shown.

Figure 2:
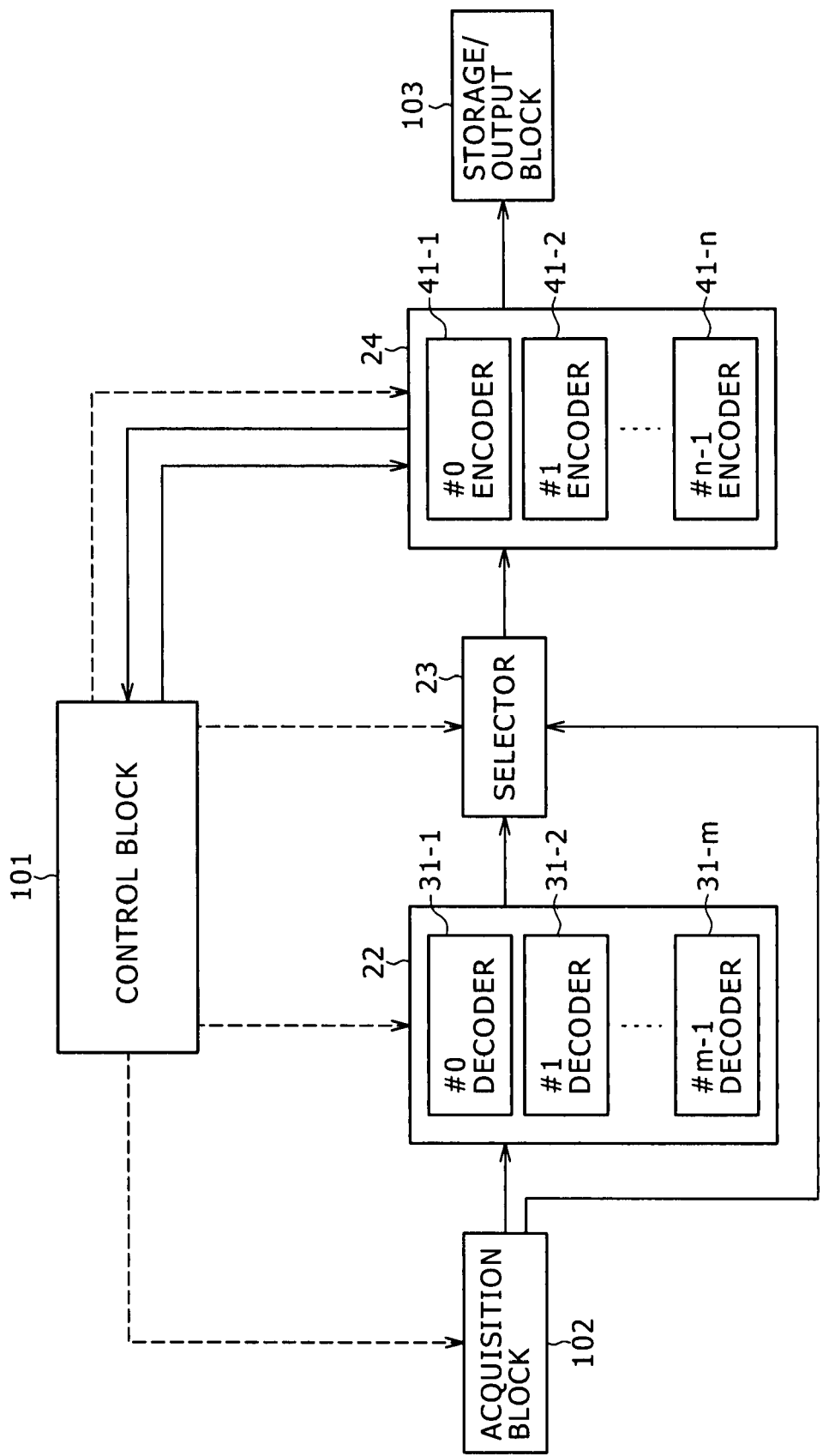
FIG. 2 is a functional block diagram showing a functional structure of the editing apparatus.

FIG. 2 is a functional block diagram explanatory of major functions possessed by the editing apparatus 1 of FIG. 1. In FIG. 2, the component parts which have their functionally equivalent counterparts included in FIG. 1 are designated by like reference numerals, and their descriptions are omitted where redundant.

The editing apparatus 1 includes a control block 101, an acquisition block 102, a decoder unit 22, a selector 23, an encoder unit 24, and a storage/output block 103.

The control block 101 corresponds to the CPU 11 and CPU 20 and controls the components of the editing apparatus 1. Under control of the control block 101, the acquisition block 102 acquires the data to be processed from the HDD 16 or from the memory 18. Of the acquired data, the data that need to be decoded are provided to the decoder unit 22 and data not to be decoded are provided to the selector 23. The acquisition block 102 may include the HDD 16 or memory 18 that stores compression-encoded streams or uncompressed baseband signals. Alternatively, the acquisition block 102 may include the PCI bridge 17 that acquires compression-encoded streams or uncompressed baseband signals from the HDD 16 or memory 18 or from another apparatus connected to the editing apparatus 1.

A plurality of decoders 31 included in the decoder unit 22 decode the compressed video material data provided from the acquisition block 102 into an uncompressed baseband signal that is sent to the selector 23. Under control of the control block 101, the selector 23 splits the uncompressed baseband signal provided from the decoder unit 22 or from the acquisition block 102 into groups of sections. The sections included in the same section group are sent concurrently to the encoder unit 24.

A plurality of encoders 41 included in the encoder unit 24 encode the uncompressed baseband signal provided from the selector 23 into groups of sections under control of the control block 101 in a manner subject to predetermined constraints. Specific examples of the constraints will be discussed later.

The storage/output block 103 stores or outputs the encoded streams generated by the encoder unit 24. For example, the storage/output block 103 may includes the HDD 16 or memory 18. Alternatively, the acquisition block 102 may include the PCI bridge 17 that outputs compression-encoded streams to the HDD 16 or memory 18 or to another apparatus connected to the editing apparatus 1.

Figure 3:
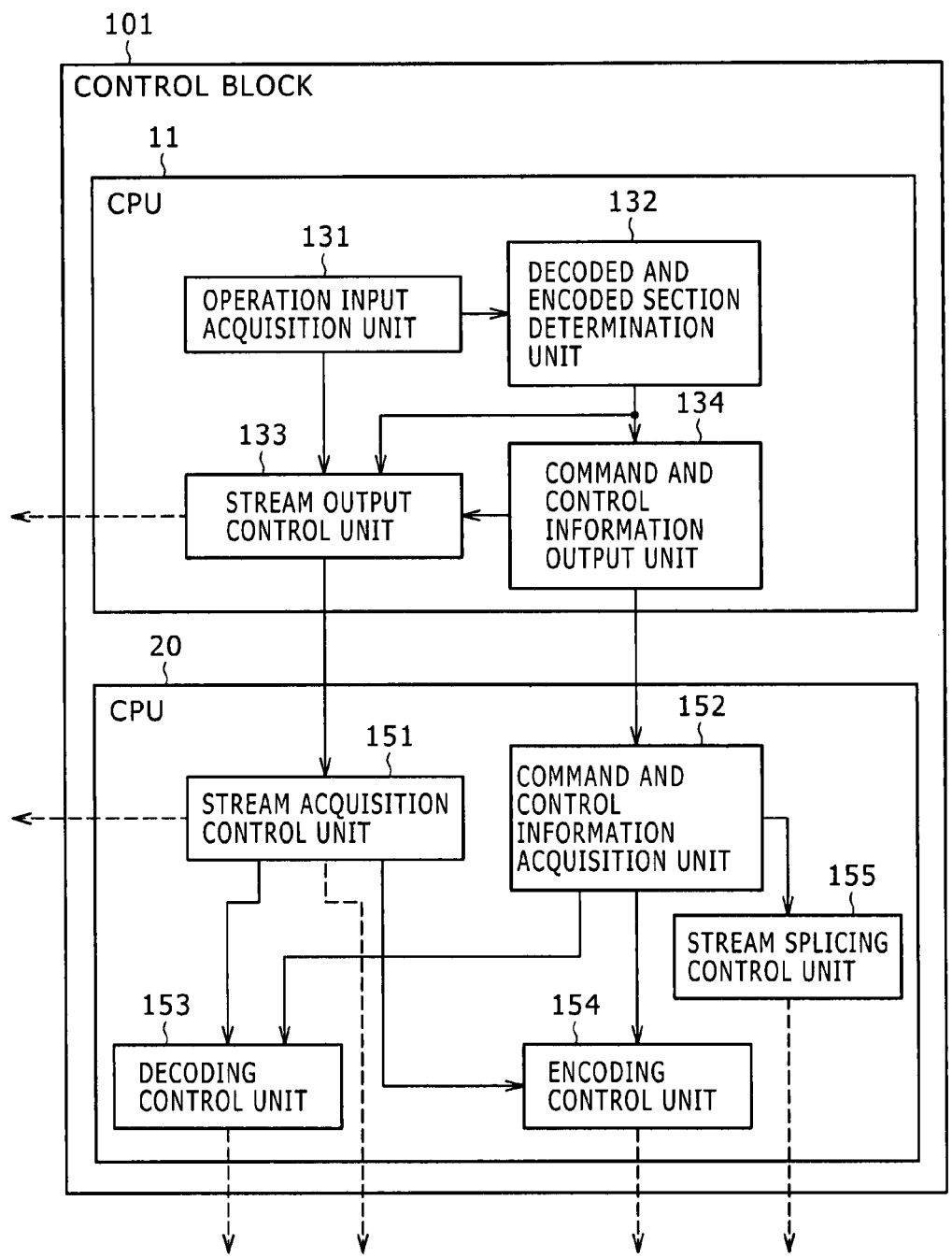
FIG. 3 is a functional block diagram showing a functional structure of a control block.

More specifically, the control block 101 has the functions shown in FIG. 3.

As illustrated, the control block 101 is defined to have the functions that may be implemented by the CPU 11 and CPU 20. The CPU 11 includes the function of an operation input acquisition unit 131, a decoded and encoded section determination unit 132, a stream output control unit 133, and a command and control information output unit 134. The CPU 20 includes a stream acquisition control unit 151, a command and control information acquisition unit 152, a decoding control unit 153, an encoding control unit 154, and a stream splicing control unit 155.

In response to the user's operation input, the operation input acquisition unit 131 acquires information about the data to be encoded, e.g., information as to whether the input data to be encoded is in compression-encoded stream format or in uncompressed baseband signal format, and how many GOPs of data are to be encoded. The acquired information is sent to the decoded and encoded section determination unit 132 or to the stream output control unit 133.

On the basis of the information provided from the operation input acquisition unit 131, the decoded and encoded section determination unit 132 determines on the sections of data to be encoded by the encoder unit 24, determines whether the data to be encoded should be subsequently decoded, and decides on the parameters and initial values necessary for the encoding process. The determined content is provided to the command and control information output unit 134 and to the stream output control unit 133.

On the basis of the information from the operation input acquisition unit 131 and from the decoded and encoded section determination unit 132, the stream output control unit 133 controls the acquisition block 102, when in the case where the sections set to be encoded need to be decoded to output the data of, the sections in question to the decoder unit 22. On the other hand, the stream output control unit 133 controls the acquisition block 102, when in the case where the sections set to be encoded are not to be decoded, to output the data of the sections in question to the selector 23. In accordance with the information from the operation input acquisition unit 131, the stream output control unit 133 supplies the stream acquisition control unit 151 with control signals designed to perform user-designated processes including editing of streams.

Based on the information from the decoded and encoded section determination unit 132, the command and control information output unit 134 supplies the command and control information acquisition unit 152 with various parameters to control the processes of encoding, decoding, and splicing of encoded streams.

In accordance with control signals from the stream output control unit 133, the stream acquisition control unit 151 controls the acquisition block 102 to acquire compression-encoded streams or an uncompressed baseband signal and to make sure that those sections of data set to be encoded and then decoded are output to the decoder unit 22 and that those sections not to be decoded are sent to the selector 23. Furthermore, the stream acquisition control unit 151 controls the selector 23 chronologically to split the uncompressed baseband signal into sections of a predetermined length each and to supply the split sections to the encoder unit 24.

From the command and control information output unit 134, the command and control information acquisition unit 152 acquires various parameters necessary for decoding and encoding of streams. The acquired parameters are provided to the decoding control unit 153 and encoding control unit 154.

On the basis of the parameters provided from the command and control information acquisition unit 152, the decoding control unit 153 controls the decoder unit 22 in the decoding process.

In accordance with the parameters from the command and control information acquisition unit 152, the encoding control unit 154 controls the encoder unit 24 to carry out the encoding process in a manner subject to predetermined constraints.

The stream splicing control unit 155 controls the storage/output block 103 to splice and output the streams that have been encoded by the encoder unit 24.

Although FIG. 3 shows the functions to be implemented separately by the CPU 11 and the CPU 20, this is not limitative of the invention. Alternatively, these functions may be implemented either by a single CPU or by three or more CPUs in the control block 101.

Figure 4:
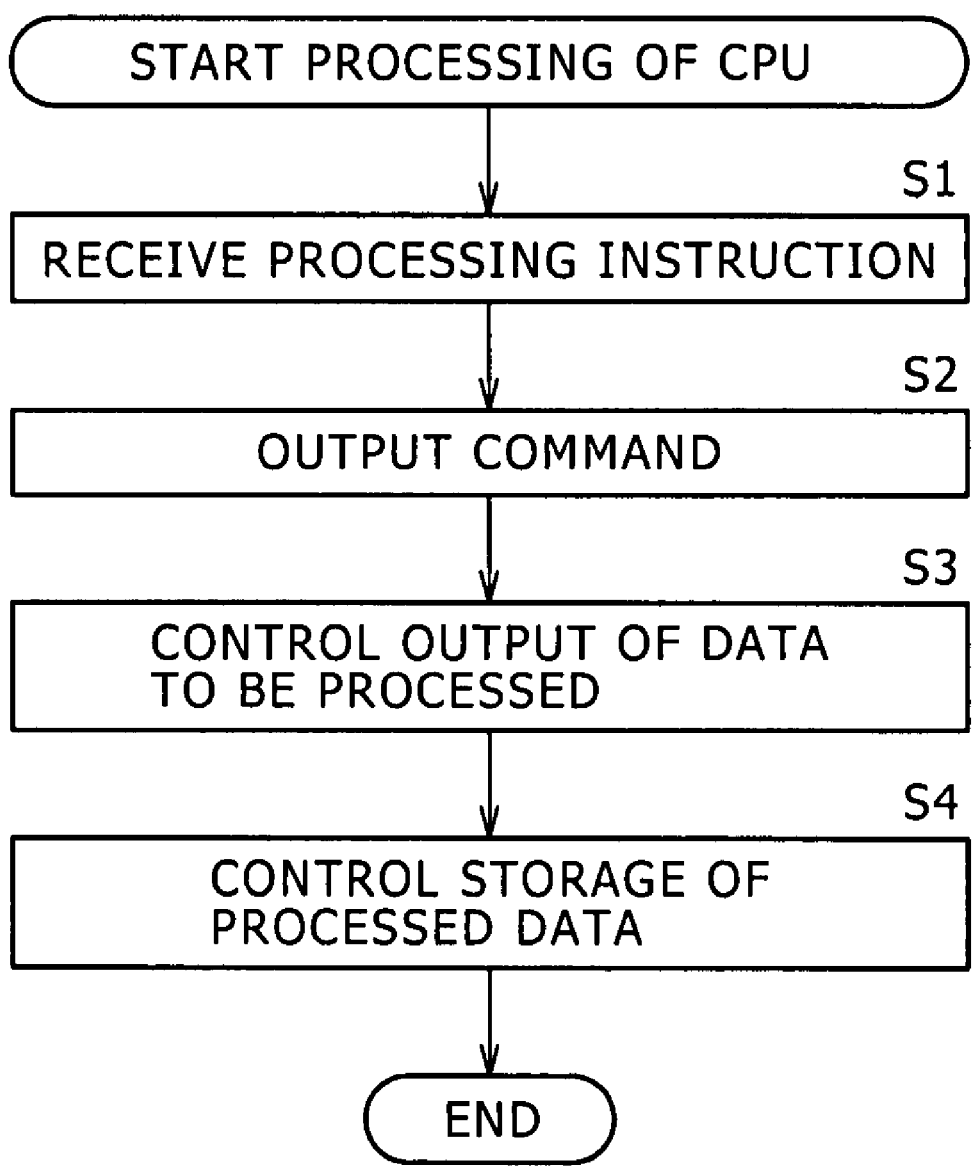
FIG. 4 is a flowchart of processing steps of a CPU.

The processing performed by the CPU 11 will now be described in reference to the flowchart of FIG. 4.

In step S1, the CPU 11 (operation input acquisition unit 131) receives an instruction to execute a process from a user operating an operation input unit, not shown. The process may, for example, involve encoding a baseband signal stored in the HDD 16, converting intra coded streams stored in the HDD 16 into Long-GOP encoded streams, or splicing encoded streams or baseband signals stored in the HDD 16 at predetermined edit points.

In step S2, the CPU 11 (decoded and encoded section determination unit 132) determines the sections to be decoded and encoded in accordance with the user's operation input. The CPU 11 (command and control information output unit 134) generates the command to carry out the process based on the user's operation input, and outputs the generated command to the CPU 20 through the north bridge 12, PCI bus 14, PCI bridge 17, and control bus 19.

In step S3, the CPU 11 (stream output control unit 133) controls output of the data to be processed. More specifically, the CPU 11 outputs the encoded streams or baseband signal to be processed to the PCI bridge 17 via the north bridge 12 and PCI bus 14.

In step S4, the CPU 11 receives from the CPU 20 notification that the processing of the data based on the provided command has ended. In turn, the CPU 11 reads the spliced encoded streams from the memory 18 via the north bridge 12, PCI bus 14, and PCI bridge 17. The CPU 11 proceeds to control storage of the processed data onto the HDD 16, and ends the processing.

In the steps outlined above, the CPU 11 first receives the user's operation input to perform a process, generates the command to carry out the process based on the user's input, and sends the command to the CPU 20. The target data stored in the HDD 16 is provided to the PCI bridge 17 and converted under control of the CPU 20 into encoded streams which in turn are stored in the HDD 16.

Figure 5:
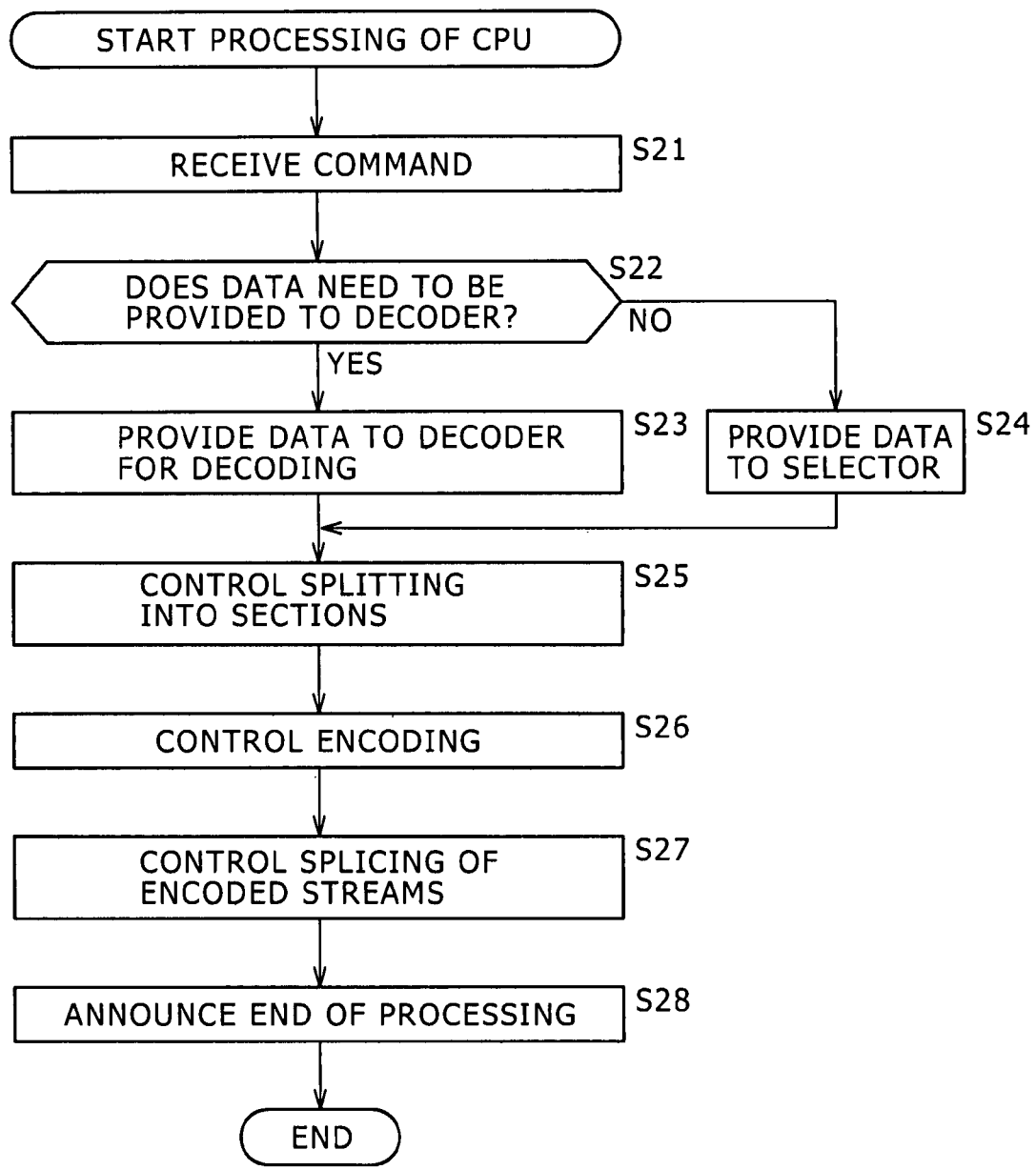
FIG. 5 is a flowchart of processing steps of another CPU.

The processing performed by the CPU 20 will now be described in reference to the flowchart of FIG. 5.

In step S21, the CPU 20 (command and control information acquisition unit 152) receives a command from the CPU 11 through the north bridge 12, PCI bus 14, PCI bridge 17, and control bus 19. The CPU 20 (stream acquisition control unit 151) controls the PCI bridge 17 to store the encoded streams or baseband signal provided into the memory 18.

In step S22, based on the provided command, the CPU 20 (command and control information acquisition unit 152) determines whether the data to be processed needs to be decoded.

If in step S22, the data to be processed is determined to be sent to the decoders, then step proceeds to step S23. In step S23, the CPU 20 (stream acquisition control unit 151) controls the PCI bridge 17 to provide the data to be processed (i.e., encoded streams) to the decoder unit 22. Then the CPU 20 (decoding control unit 153) controls the decoder unit 22 to decode the encoded streams into an uncompressed baseband signal. The uncompressed baseband signal is sent to the selector 23. Step S23 is followed by step S25.

If in step S22, the data to be processed is not determined necessary to be provided to the decoders, then step goes to S24. In step S24, the CPU 20 (stream acquisition control unit 151) controls the PCI bridge 17 to provide the data to be processed (i.e., baseband signal) to the selector 23. Step S24 is followed by step S25.

Upon completion of step S23 or S24, the CPU 20 (encoding control unit 154) goes to step S25 and, based on the command from the CPU 11, controls the selector 23 to split the provided baseband signal into groups of as many sections as the number of the parallelly operated encoders 41. The baseband signal for encoding each of the sections is sent to a predetermined number of encoders 41 in the encoder unit 24.

In step S26, based on the command from the CPU 11, the CPU 20 (encoding control unit 154) controls the encoder unit 24 to encode the respective sections on the basis of the predetermined constraints and to provide the respectively encoded streams to the PCI bridge 17.

In step S27, in accordance with the command from the CPU 11, the CPU 20 (stream splicing control unit 155) controls the PCI bridge 17 to adjust the addresses in the memory 18 to which to store the encoded streams in the order designated by the user's operation input, so that the encoded streams corresponding to the lengths of the sections provided from the encoders 41 will be correctly stored and spliced in the memory 18.

In step S28, the CPU 20 notifies the CPU 11 that the processing of the data based on the provided commands has ended, by way of the control bus 19, PCI bridge 17, PCI bus 14, and north bridge 12. The processing is then brought to an end.

In the above steps based on the commands from the CPU 11, the CPU 20 controls the PCI bridge 17, decoder unit 22, selector 23, and encoder unit 24 to carry out their respective processes. The processes may for example involve encoding the baseband signal stored in the HDD 16, converting the intra coded streams stored in the HDD 16 into Long-GOP encoded streams, and splicing the encoded streams or baseband stored in the HDD 16 at predetermined edit points.

As discussed above, the encoder unit 24 includes a plurality of encoders 41. Each of the encoders 41 receives an uncompressed baseband signal from the selector 23 and encodes the provided baseband signal into an encoded stream that is sent to the PCI bridge 17. The encoded streams of a short length each sent to the PCI bridge 17 are written to suitably established addresses in the memory 18 to be spliced therein under control of the CPU 20.

In the encoder unit 24, a plurality of encoders 41 encode split data sections in parallel. The section-by-section encoded streams derived from parallel encoding are written to the suitable addresses in the memory 18 for splicing. The encoding process needs to be carried out according to predetermined constraints so that the spliced streams will remain consistent in terms of continuity under diverse conditions.

Three methods are for example proposed by which to impose the constraints on the encoding process. A first method involves constraining the encoding process in such a manner that the starting GOP for the sections acquired by splitting of target data is a closed GOP. A second method constrains the encoding process so that target data is split into sections in a manner different from the first method, with the starting GOP for the sections being not a closed GOP. A third method involves constraining the encoding process in such a manner that the starting GOP for the sections acquired by splitting of target data is not a closed GOP, that the target data is split into sections the same way as the second method, that the range of data to be sent to the encoders 41 differs from that with the second method, and that part of the target data is pre-encoded.

Figure 6:
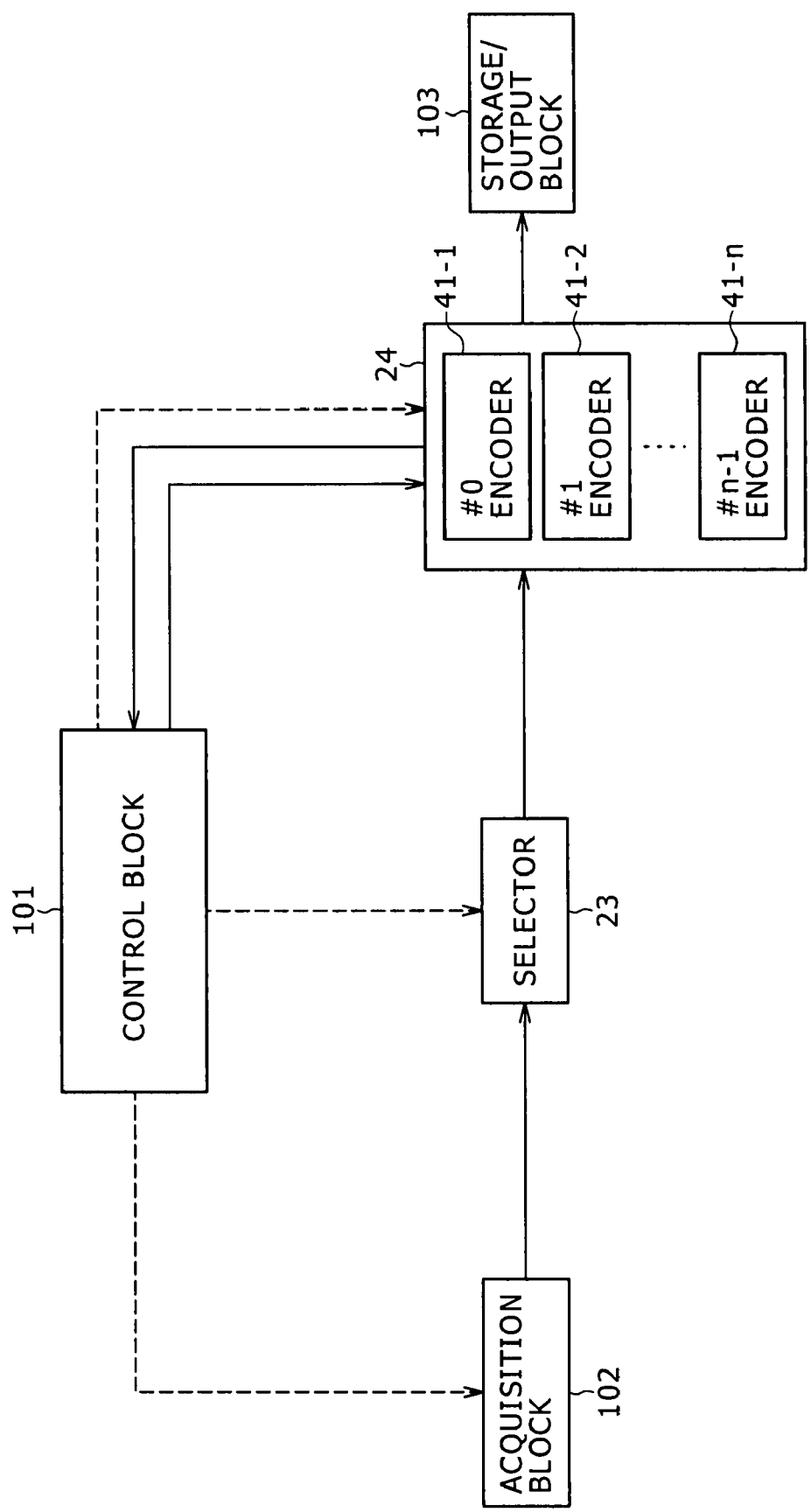
FIG. 6 is a functional block diagram showing another functional structure of the editing apparatus.

The uncompressed baseband signal provided from the selector 23 to the encoder unit 24 may be either the uncompressed baseband signal generated through decoding by the decoder unit 22 or the uncompressed baseband signal sent from the PCI bridge 17 directly to the selector 23. That is, the editing apparatus 1 having at least the component parts shown in FIG. 6 will do, in order to implement any one of the first, the second and the third methods by which to carry out the encoding process.

Under control of the control block 101, the selector 23 splits the uncompressed baseband signal provided from the acquisition block 102 chronologically into sections of a predetermined length each. The baseband signal for encoding each of the sections is provided to a plurality of the encoders 41-1 through 41-*n* included in the encoder unit 24.

Under control of the control block 101, those of the encoders 41-1 through 41-*n* which receive the baseband signal from the selector 23 and which included in the encoder unit 24 encode the provided baseband signal parallelly in a manner subject to predetermined constraints, as will be discussed later in reference to FIGS. 7 through 27. The parallelly encoded baseband signal is output to the storage/output block 103.

The constraints imposed on the encoding process according to the first method will now be described in reference to FIGS. 7 through 9.

Figure 7:
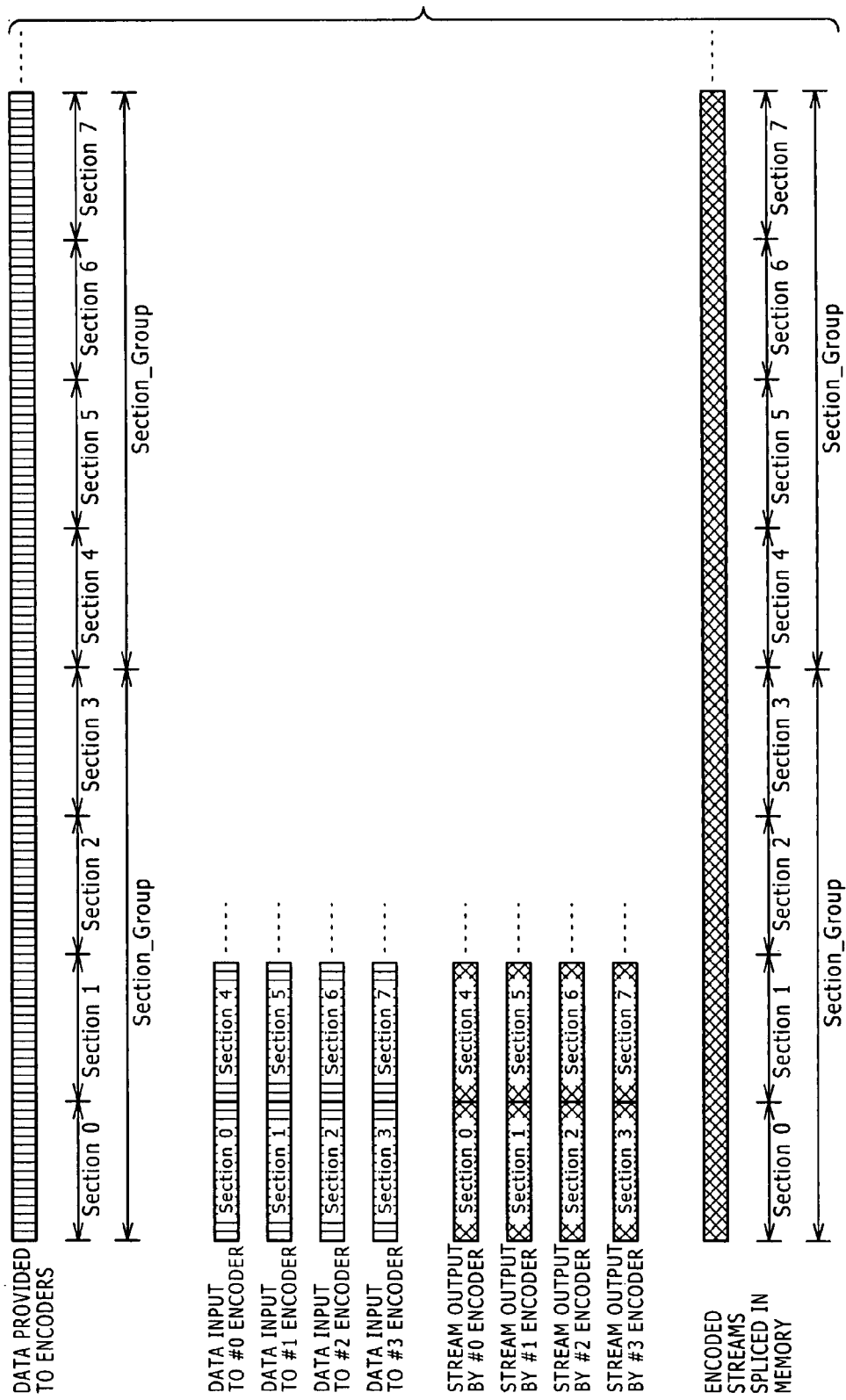
FIG. 7 is a schematic view explanatory of a first method.

Described first with reference to FIG. 7 is how data is split and spliced. FIG. 7 shows an example in which four sections of input data are encoded in parallel.

The selector 23 splits the baseband signal into sections in such a manner that the length of each section (Section_Length) becomes an integer multiple of the length of each GOP (GOP_Length) generated by encoding. If, for example, the length of each of the GOPs constituting the encoded streams generated by the encoders 41 is 15 frames (i.e., the most often used length), then the Section_Length corresponds to an integral multiple of 15 frames.

A section group (Section_Group) is formed by a plurality of sections encoded parallelly by the encoder unit 24. If four sections are parallelly encoded as shown in FIG. 7, then one section group includes sections 0 through 3, another section group by sections 4 through 7, and so on.

The baseband signal input to each of #0 encoder 41-1 through #3 encoder 41-4 is a baseband signal of which the range corresponds to the section applicable to the encoder in question. The data input to #0 encoder 41-1 through #3 encoder 41-4 is changed from one section to another. More specifically, if "Num_Of_Encoder" denotes the number of parallelly operated encoders, then as many sections as the "Num_Of_Encoder" counted from the beginning of the material data, i.e., a plurality of section constituting a single section group, are concurrently input to the encoders 41-1 through 41-4.

For example, as shown in FIG. 7, sections 0, 4, 8, may be provided to #0 encoder 41-1; sections 1, 5, 9, to #1 encoder 41-2; sections 2, 6, 10, . . . , to #2 encoder 41-3; and seconds 3, 7, 11, . . . , to #3 encoder 41-4. Any other way of feeding the sections to the encoders may be adopted as long as the sections constituting the same section group are sent concurrently to the respective encoders 41. For example, sections 0, 7, 8, . . . , may be provided to #0 encoder 41-1; sections 1, 6, 9, . . . , to #1 encoder 41-2; sections 2, 5, 10, . . . , to #2 encoder 41-3; and sections 3, 4, 11, . . . , to #3 encoder 41-4. As another alternative, sections 0, 5, 11, . . . , may be provided to #0 encoder 41-1; sections 2, 4, 9, . . . , to #1 encoder 41-2; sections 1, 7, 10, . . . , to #2 encoder 41-3; and sections 3, 6, 8, . . . , to #3 encoder 41-4.

Under control of the control block 101 (CPU 20), #0 encoder 41-1 through #3 encoder 41-4 parallelly encode the provided baseband signal according to the predetermined constraints. The encoded streams are output to the PCI bridge 17.

For example, suppose that sections 0, 4, 8, . . . , are provided to #0 encoder 41-1; sections 1, 5, 9, . . . , to #1 encoder 41-2; sections 2, 6, 10, . . . , to #2 encoder 41-3; and sections 3, 7, 11, . . . , to #3 encoder 41-4. In such a case, sections 0 through 3 making up the input data of a first section group are provided to and encoded by #0 encoder 41-1 through #3 encoder 41-4 respectively; the encoded streams corresponding to sections 0 through 3 are output to the PCI bridge 17. Sections 4 through 7 making up the input data of a second section group are then provided to and encoded by #0 encoder 41-1 through #3 encoder 41-4 respectively; the encoded streams corresponding to sections 4 through 7 are also output to the PCI bridge 17.

The PCI bridge 17 writes the section-by-section encoded streams provided from #0 encoder 41-1 through #3 encoder 41-4 to suitable addresses in the memory 18 in the order in which the sections are arranged.

For example, suppose that sections 0, 4, 8, ..., are provided to #0 encoder 41-1; sections 1, 5, 9, ..., to #1 encoder 41-2; sections 2, 6, 10, ..., to #2 encoder 41-3; and sections 3, 7, 11, ..., to #3 encoder 41-4. In that case, #0 encoder 41-1 through #3 encoder 41-4 first encode the sections making up the first section group and supply the encoded sections 0 through 3 to the memory 18 via the PCI bridge 17. In the memory 18, the sections 0 through 3 are written to addresses such that the sections are spliced in ascending order of their section numbers. Then #0 encoder 41-1 through #3 encoder 41-4 encode the sections making up the second section group and supply the encoded sections 4 through 7 to the memory 18 via the PCI bridge 17. In the memory 18, the sections 4 through 7 are written to addresses such so that the sections are also spliced in ascending order of their section numbers. In this manner, as shown in FIG. 7, the sections constituting each of the section groups are written to and spliced in the memory 18 in ascending order of the section numbers.

A first constraint under the first method involves determining sections of data to let their boundaries overlap with the boundaries of GOPs so that the streams derived from the individually encoded sections constitute a single continuous stream when spliced together, the encoding being carried out so that at least the starting GOP containing an encode starting point at which each of the encoders 41 starts its encoding is a closed GOP. According to the first constraint, there will be no predictive relations between the sections involved.

A second constraint under the first method involves adding a Sequence Header to the head of the GOP serving as the encode starting point for each of the encoders 41. This allows Q-Matrix to be reset for each section so that the section in question is freed from the effects of any other section being encoded.

A third constraint under the first method involves determining in advance the VBV buffer occupancy at the beginning of the sections, i.e., VBV buffer occupancy at the encode starting point of a given section for each of the encoders 41, and controlling a generated code quantity in such a manner that the VBV buffer occupancy at the encode ending point of a given section for each of the encoders 41 becomes equal to the VBV buffer occupancy at the encode starting point of the next section.

That is, the encoding process is controlled so that if "Occupancy_Start_x" denotes the VBV buffer occupancy at the beginning of section No. "x" and "Occupancy_End_x" represents the VBV buffer occupancy at the end of section No. "x," then "Occupancy_End_x" will become equal to "Occupancy_Start_x+1." Under this constraint, the individually encoded streams restore their continuity in terms of VBV buffer occupancies when subsequently spliced together.

Figure 8:
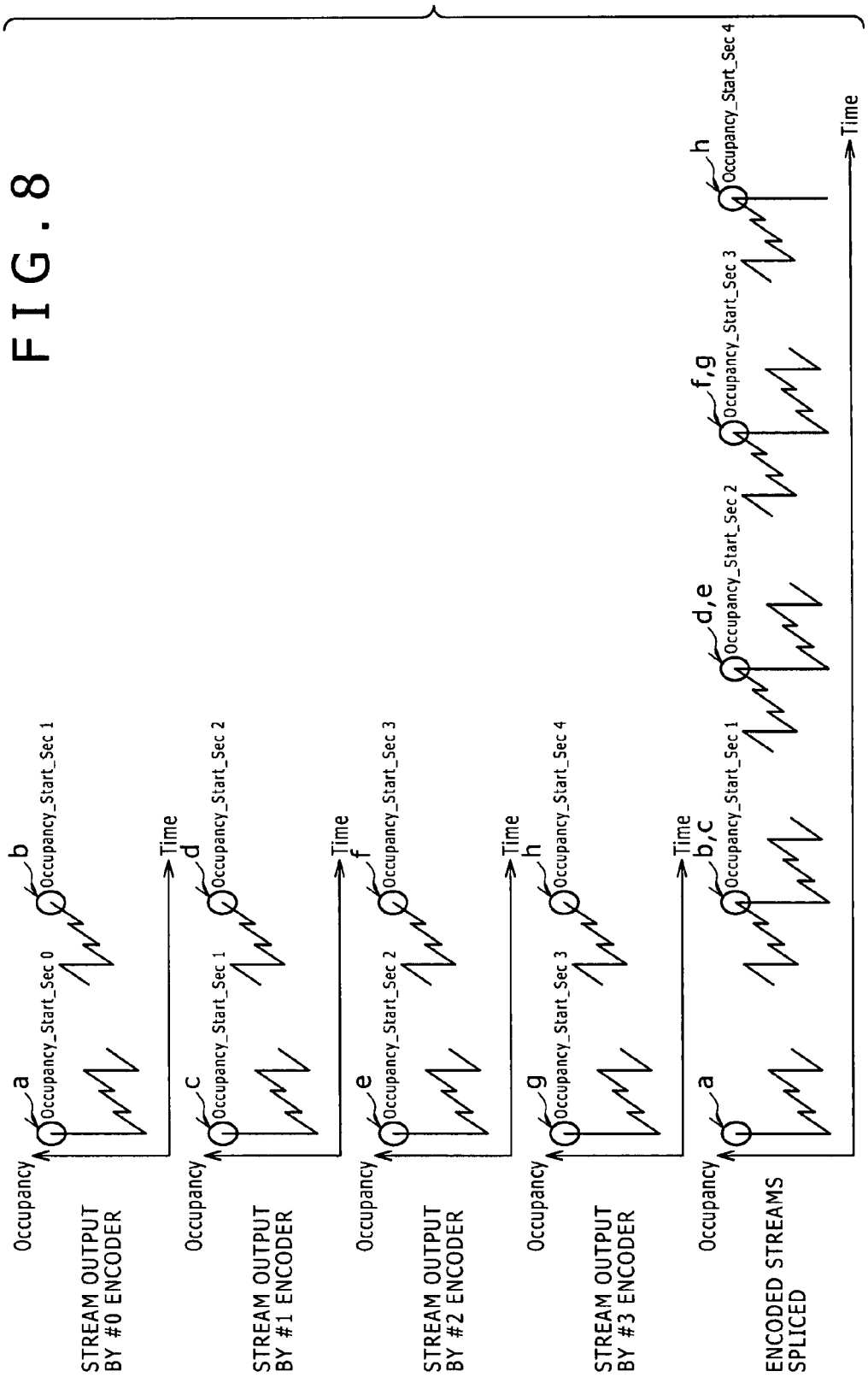
FIG. 8 is another schematic view explanatory of the first method.

For example, as shown in FIG. 8, "Occupancy_Start_Sec 0" indicated by reference character "a" is predetermined as the VBV buffer occupancy at the beginning of an ultimately spliced encoded stream. Before sections 0, 1, 2 and 3 are encoded by #0 encoder 41-1, #1 encoder 41-2, #2 encoder 41-3 and #3 encoder 41-4 respectively, "Occupancy_Start_Sec 1," "Occupancy_Start_Sec 2" and "Occupancy_Start_Sec 3" indicated by reference characters "c," "e" and "g" respectively are determined. How to determine the occupancy at the beginning of each section is discretionary. For example, if the degree of difficulty of encoding is known for each section, then the value of the occupancy may be determined according to the difficulty level. If the degree of difficulty of encoding is unknown, then "Occupancy_Start_Sec 1," "Occupancy_Start_Sec 2" and "Occupancy_Start_Sec 3" may all be given the same value as that of "Occupancy_Start_Sec 0" at the starting point.

Then #0 encoder 41-1 encodes section 0 assuming that the initial value of the VBV buffer occupancy is set to "Occupancy_Start_Sec o" indicated by reference character "a" and that the value of the VBV buffer occupancy at the ending point indicated by reference character "b" is equal to "Occupancy_Start_Sec 1" as the initial value of the VBV buffer occupancy at the beginning of the next section. The #1 encoder 41-2 encodes section 1 assuming that the initial value of the VBV buffer occupancy is set to "Occupancy_Start_Sec 1" indicated by reference character "c" and that the value of the VBV buffer occupancy at the ending point indicated by reference character "d" is equal to "Occupancy_Start_Sec 2" as the initial value of the VBV buffer occupancy at the beginning of the next section.

Likewise, #2 encoder 41-3 encodes section 2 assuming that the initial value of the VBV buffer occupancy is set to "Occupancy_Start_Sec 2" indicated by reference character "e" and that the value of the VBV buffer occupancy at the ending point indicated by reference character "f" is equal to "Occupancy_Start_Sec 3" as the initial value of the VBV buffer occupancy at the beginning of the next section. The #3 encoder 41-4 encodes section 3 assuming that the initial value of the VBV buffer occupancy is set to "Occupancy_Start_Sec 3" indicated by reference character "g." At the end of the encoding process, "Occupancy_Start_Sec 4" representing the value of the VBV buffer occupancy at the ending point indicated by reference character "h" becomes the initial value of the VBV buffer occupancy at the beginning of the starting section in the next section group. That is, at the time of encoding the next section group, #0 encoder 41-1 encodes section 4 assuming that the initial value of the VBV buffer occupancy is set to "Occupancy_Start_Sec 4."

The encoded streams derived from the encoding process as described above are spliced in the memory 18 under control of the CPU 20.

As long as the generated code quantity is controlled in the manner discussed above, the encoded streams restore their continuity in terms of VBV buffer occupancies when subsequently spliced together. The encoded streams thus comply with the MPEG standard.

Figure 9:
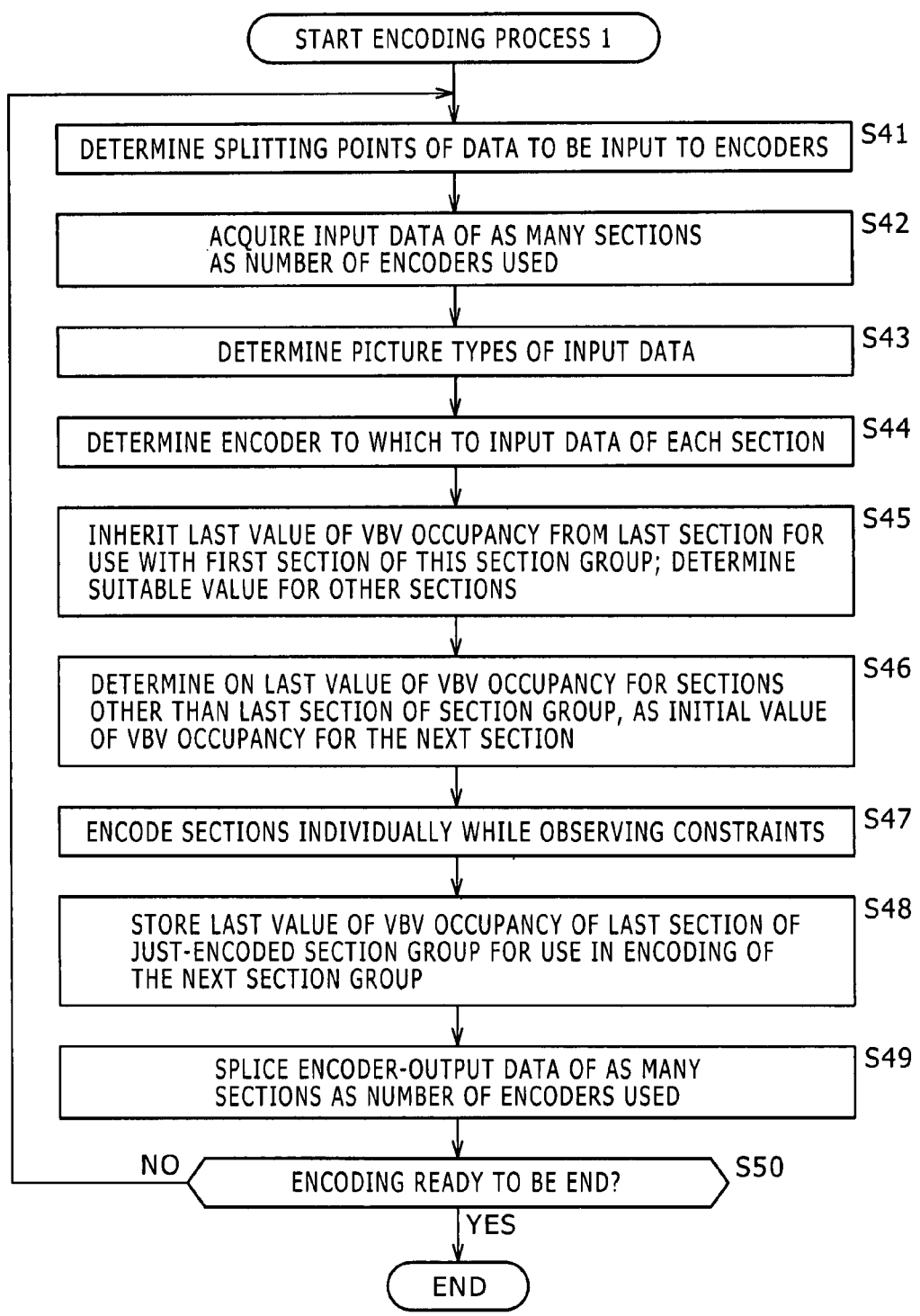
FIG. 9 is a flowchart of processing steps of an encoding process 1.

Described below in reference to the flowchart of FIG. 9 is a first example of the encoding process called the encoding process 1 corresponding to the first method above.

In step S41, the stream acquisition control unit 151 determines the number of encoders 41 used for parallel encoding out of the encoders 41 included in the encoder unit 24. The stream acquisition control unit 151 then determines where to split the data to be input to the encoders 41, i.e., determines on the sections and the section groups described above in reference to FIG. 7.

In step S42, the stream acquisition control unit 151 acquires as many sections of input data as the number of encoders 41 in use, the acquired data making up one section group.

In step S43, the encoding control unit 154 determines the picture types for the input data to be encoded in such a manner that the boundaries of the sections overlap with the boundaries of GOPs.

In step S44, the stream acquisition control unit 151 determines the encoders 41 to which to input each section of data.

In step S45, as described above in reference to FIG. 8, if the section group about to be processed is at the beginning of the data to be processed, then the encoding control section 154 establishes a predetermined value as the value of the VBV buffer occupancy at the starting point of the starting section in the group. If the section group about to be processed is not at the beginning of the data to be processed, then the encoding control unit 154 causes the VBV buffer occupancy at the starting point of the starting section in the group to inherit the value of the VBV buffer occupancy at the ending point of the ending section in the preceding section group, and suitably determines the value of the VBV buffer occupancy at the starting point of each of the sections other than the starting section in the group.

The manner in which to determine the occupancy at the beginning of each of the sections other than the starting section in a given section group is discretionary. For example, if the degree of difficulty of encoding per section is known, the occupancy value may be determined according to the difficulty level. If the degree of difficulty of decoding is unknown, then "Occupancy_Start_Sec 1," "Occupancy_Start_Sec 2" and "Occupancy_Start_Sec 3" may all be given the same value as "Occupancy_Start_Sec 0" at the starting point.

In step S46, as discussed above in reference to FIG. 8, the encoding control unit 154 determines on the last value of the VBV buffer occupancy for the sections other than the ending section in the section group to be processed, as the value of the VBV buffer occupancy at the starting point of the next section.

In step S47, the stream acquisition control unit 151 controls the selector 23 to supply the data to be parallelly encoded to the encoders 41 corresponding to the data in the encoder unit 24. The encoding control unit 154 controls the corresponding encoders 41 in the encoder unit 24 individually to encode the provided sections in keeping with the three constraints of the above-described first method.

That is, in keeping with the first constraint, the sections are determined to let their boundaries overlap with the boundaries of GOPs so that the streams derived from the individually encoded sections constitute a single continuous stream when spliced together, the encoding being carried out so that the GOP containing the encode starting point for each of the encoders 41 is being a closed GOP. In accordance with the second constraint, the encoding process is performed with a Sequence Header added to the head of the GOP serving as the encode starting point for each of the encoders 41. According to the third constraint, the encoding process is carried out by determining in advance the VBV buffer occupancy at the beginning of the sections, i.e., VBV buffer occupancy at the encode starting point of a given section for each of the encoders 41, and by controlling the generated code quantity in such a manner that the VBV buffer occupancy at the encode ending point of a given section for each of the encoders 41 becomes equal to the VBV buffer occupancy at the encode starting point of the next section.

In step S48, the encoding control unit 154 temporarily stores the last value of the VBV occupancy of the ending section in the just-encoded section group for use in the next encoding process.

In step S49, the stream splicing control unit 155 controls the addresses in the memory 18 to which to write the encoded streams sent from the encoder unit 24 up to the PCI bridge 17, in such a manner as to splice the encoder-output data of as many sections as the number of the parallelly operated encoders, i.e., to splice the encoded streams of which the lengths correspond to the sections involved.

In step S50, the encoding control unit 154 checks to determine whether the encoding process is ready to be end. If the encoding process is not found ready to be end, control is returned to step S41 and the subsequent steps are repeated. If the encoding process is found ready to be end in step S50, then the encoding process 1 is brought to an end.

When the steps above are carried out, predictive relations are eliminated from between the sections, and Q-Matrix is reset for each section so that the section in question is freed from the effects of any other section being encoded. With the VBV buffer occupancy inherited from one section to another, the encoded streams derived from parallel encoding by a plurality of encoders 41 can be spliced into a consistently encoded stream in the memory 18.

When a plurality of encoders 41 are used parallelly to encode sections of data, these encoders can take the place of an expensive encoder for high-speed processing. The encoders 41 combine to provide a throughput far exceeding their individual capabilities when carrying out the high-speed encoding process of the Long-GOP structure.

The second method will now be described in reference to FIGS. 10 through 19.

Whereas the first method was shown to involve performing the encoding process with the starting GOP of a given data unit handled as a closed GOP, the second method does not impose the closed-GOP constraint. Under the second method, the encoding process is executed in a manner subject to other constraints.

Figure 10:
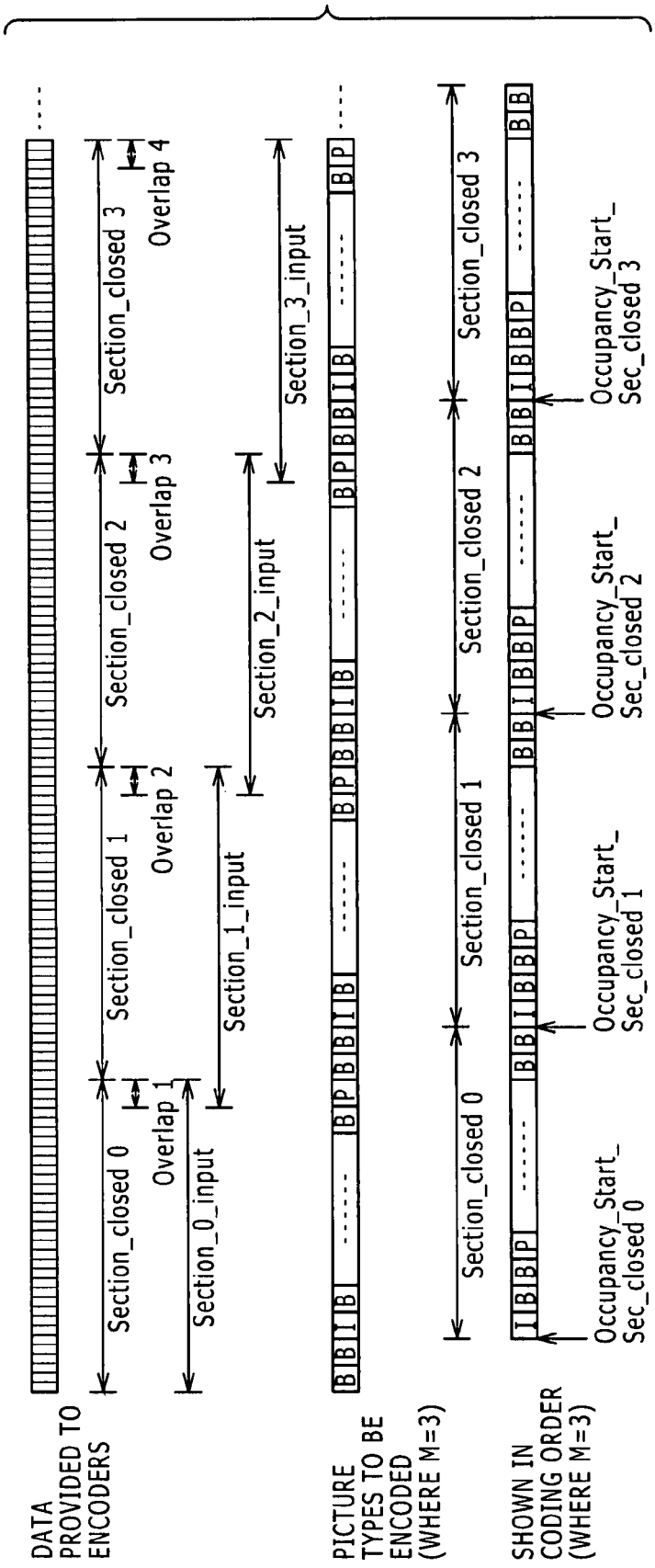
FIG. 10 is a schematic view explanatory of a second method.
Figure 11:
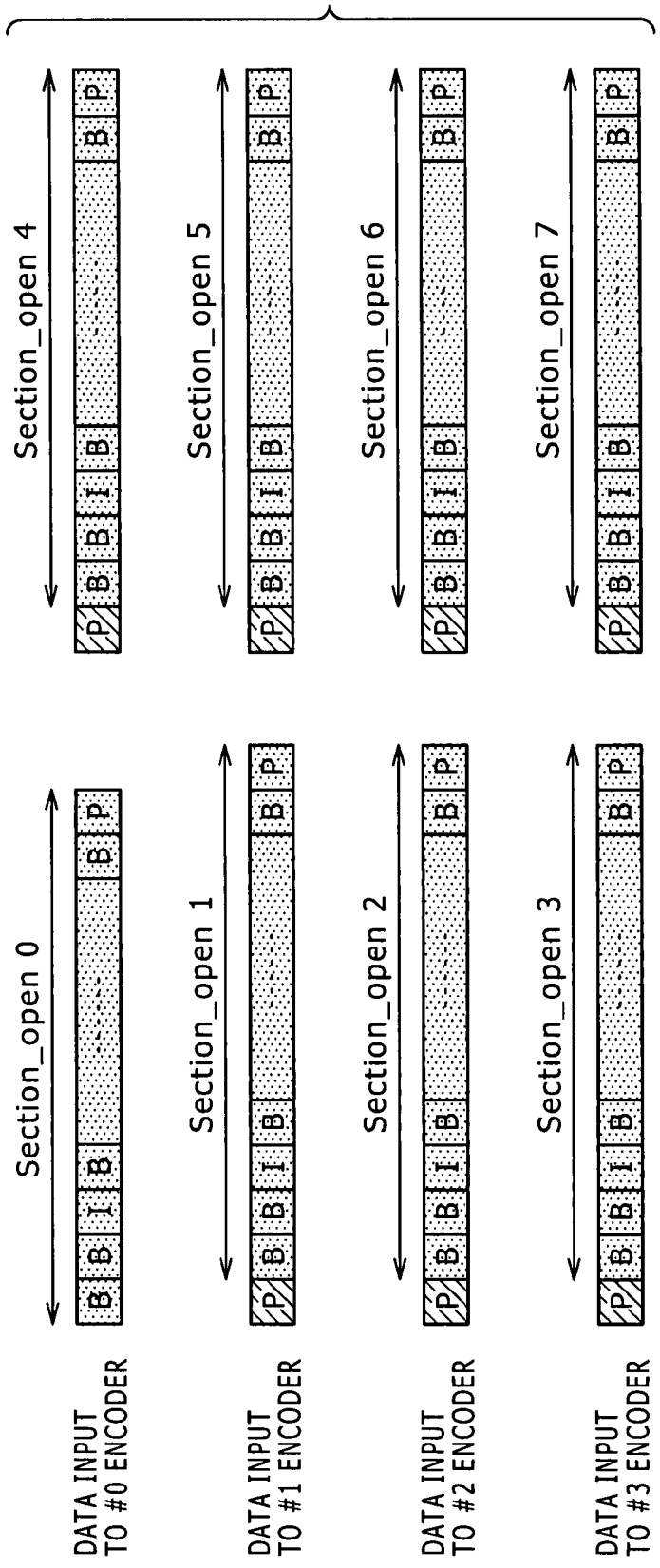
FIG. 11 is another schematic view explanatory of the second method.
Figure 12:
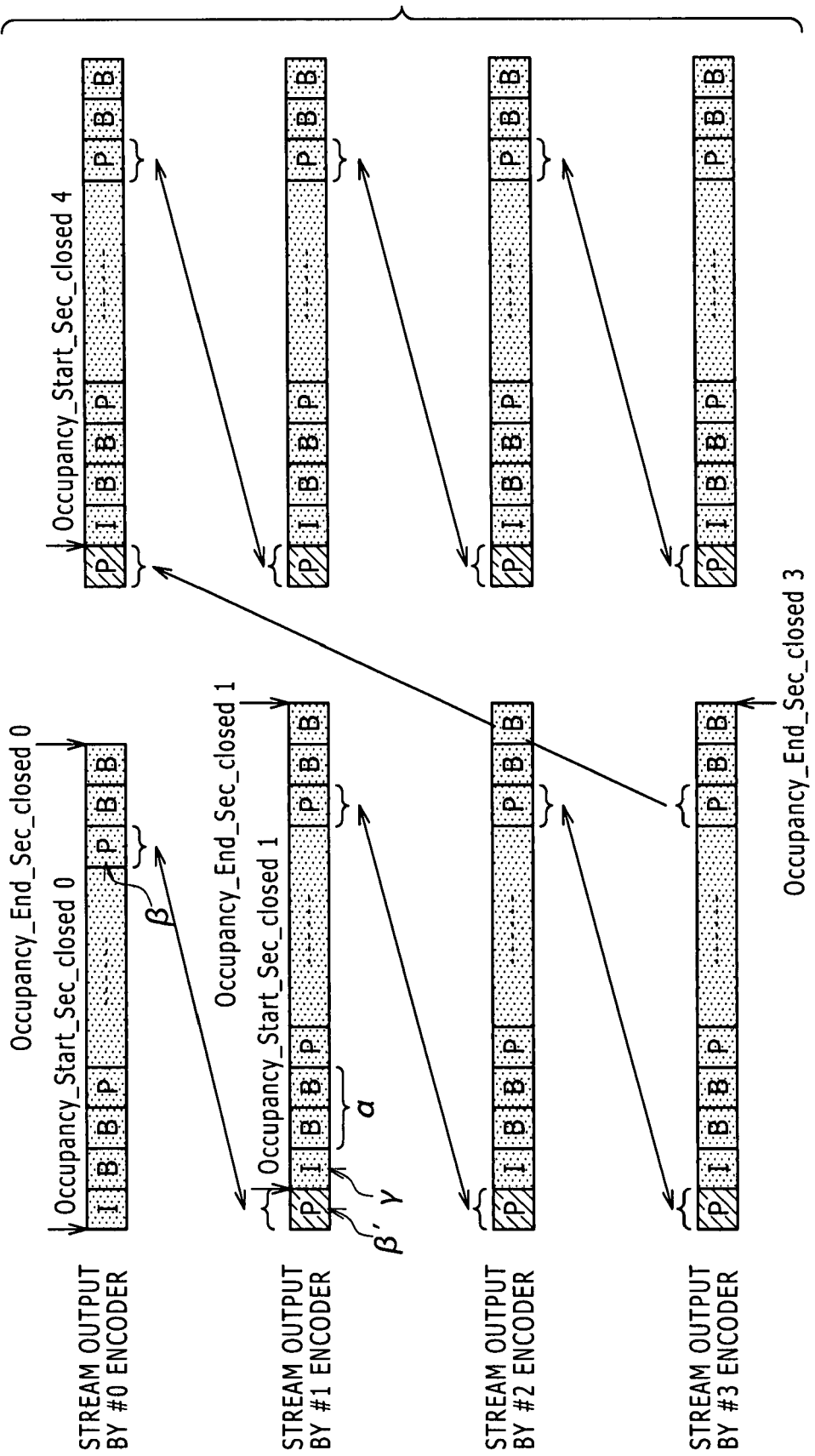
FIG. 12 is another schematic view explanatory of the second method.

Explained below in reference to FIGS. 10 through 12 is how the second method came about in view of how the sections not subject to the closed GOP constraint are related to the data actually input to the respective encoders 41 from the viewpoint of the reference picture. The ensuing explanation will deal with arrangements which, although conducive to bringing about the second method, ultimately do not apply to the second method.

In FIG. 10, the sections under the first method are represented by "Section_closed" each. Suppose now that the selector 23, in the same manner as under the first method, splits the baseband signal into sections such that their "Section_Length" becomes an integer multiple of the length of each GOP (GOP_Length) generated by the encoding process. In that case, if the closed GOP constraint were not imposed, the encoding process would need the P-picture of the preceding GOP as the reference picture for two B-pictures at the beginning of the current GOP. For this reason, except for the starting section of an entire encoding process, i.e., other than section 0 that has no preceding frame, each "Section_closed" is provided with the last picture of the preceding section when sent to the corresponding encoder 41. In FIG. 10, the data sections to be provided to the respective encoders are denoted by "Section_x_input" each. As shown by indications overlap 1, 2, 3, 4 in FIG. 10, "Section_x_input" corresponding to each section overlaps by one picture with "Section_x_input" corresponding to each of the immediately preceding and succeeding sections.

The encoding process is thus carried out in such a manner that sections are determined in reference to the boundaries of GOPs, that the starting point of the data provided to each encoder 41 comes before the last picture of the GOP in the preceding section, and that the ending point of the data provided to each encoder 41 overlaps with the ending point of the GOP in the current section. In such a case, the picture types of the sections are determined in the same manner as the picture types of the GOP in the "Section_closed" serving as the reference for determining "Section_x_input."

Thus in coding order, the P-picture of the preceding GOP as the reference picture for encoding two B-pictures subsequent to the first I-picture is always sent to the encoder 41. The first P-picture of each "Section_x_input" is used solely as the reference picture for each encoder 41; the first P-picture of the encoded "Section_x_input" is not output.

Described below in reference to FIGS. 11 and 12 is how four sections are for example encoded in parallel after being split as explained above. In FIG. 11, two section blocks (i.e., sections 0 through 7) are shown as the data to be input ("Section_x_input" each) to #0 encoder 41-1 through #3 encoder 41-4. As explained above, the first P-picture of each "Section_ x_input" is used as the reference picture for the corresponding encoder; the first P-picture of each encoded "Section_x_input" is not output. In FIG. 11, each section to be output is denoted by "Section_open x" that is the same as "Section_closed" in FIG. 10.

It is assumed here that the encoder 41 to which each section is input is determined in the same manner as under the first method. It is also assumed that the second and the third constraints under the first method are imposed likewise.

Sections 1 through 7, with the exception of section 0, have an open GOP at the beginning of each section. For this reason, the two B-pictures at the beginning of each section are encoded in reference to a picture outside the current section, i.e., in reference to the P-picture preceding the section. In each of sections 1 through 7, except for section 0, the first P-picture not included in "Section_open x" is used solely as the reference picture for encoding the first two B-pictures of the ensuing GOP.

The sections each indicated by "Section_x_input" in FIG. 10 are input to #0 encoder 41-1 through #3 encoder 41-4 in display order. The input sections are then rearranged into coding order before they are encoded.

As shown in FIG. 12, the first two B-pictures indicated by reference character α at the beginning of the section encoded by #1 encoder 41-2 are encoded in reference to two pictures: the last P-picture indicated by reference character β in the last GOP of the last section, and the first I-picture indicated by reference character γ in the current GOP. However, at the time the two B-pictures indicated by reference character α at the beginning of the section are encoded, the P-picture indicated by reference character β has yet to be encoded by #0 encoder 41-1. Thus the P-picture indicated by reference character β', the same as the P-picture indicated by reference character β, is provided to #1 encoder 41-2 for use as the reference picture.

Still, where continuous data is traditionally encoded by a single encoder and where the P-picture indicated by reference character β in FIG. 12 is to be used as the reference picture, the actually used picture is a picture that was encoded and then decoded. In other words, if the two B-pictures indicated by reference character α at the beginning of the section are not split into sections, they are encoded using a distorted picture derived from the encoded P-picture being again decoded within the encoder. The picture that is encoded and then decoded for reference purposes inside the encoder is referred to as the locally decoded picture.

Likewise, the P-picture indicated by reference character β' in FIG. 12 is to be use as the reference picture a locally decoded picture acquired by once encoding and then decoding a suitable picture. Where it is desired to have the same locally decoded picture used as the reference picture by both the P-picture indicated by reference character β and the P-picture indicated by reference character β', the encoding process needs to proceed under the same encoding conditions. In order to encode each P-picture (picture type) under the same conditions, it is necessary to encode the preceding I-picture and the succeeding P-picture using #1 encoder 41-2 under the same conditions as those applicable to #0 encoder 41-1. In this case, it is extremely difficult to match the encoding conditions between the two encoders. These arrangements, if adopted, would be exceedingly inefficient.

It could be attempted alternatively to effect the encoding process by regarding the P-picture indicated by reference character β' as the I-picture. This, however, would produce a different locally decoded picture that is highly likely to trigger deterioration of picture quality upon decoding.

As described, splitting data into sections in such a manner that the picture to be transferred as the reference picture to the decoder from one section to another is a P-picture is an inefficient and inappropriate method that is highly prone to deterioration of picture quality. According to an alternative method, data may be split into sections in such a manner that the picture sent as the reference picture to the encoder 41 from one section to another is an I-picture.

The I-picture is a picture that is encoded using information about itself, without reference to any other picture. If the same encoder is used, the encoding algorithm is considered the same for all I-pictures. Thus if initial parameters are the same, the result of the encoding process is predicted to be the same. Under the second method, each picture sent as the reference picture to the decoder from one section to another is arranged to be an I-picture. The initial parameters for encoding the picture are controlled to be the same, whereby the locally decoded picture is kept identical for the different encoders involved.

Figure 13:
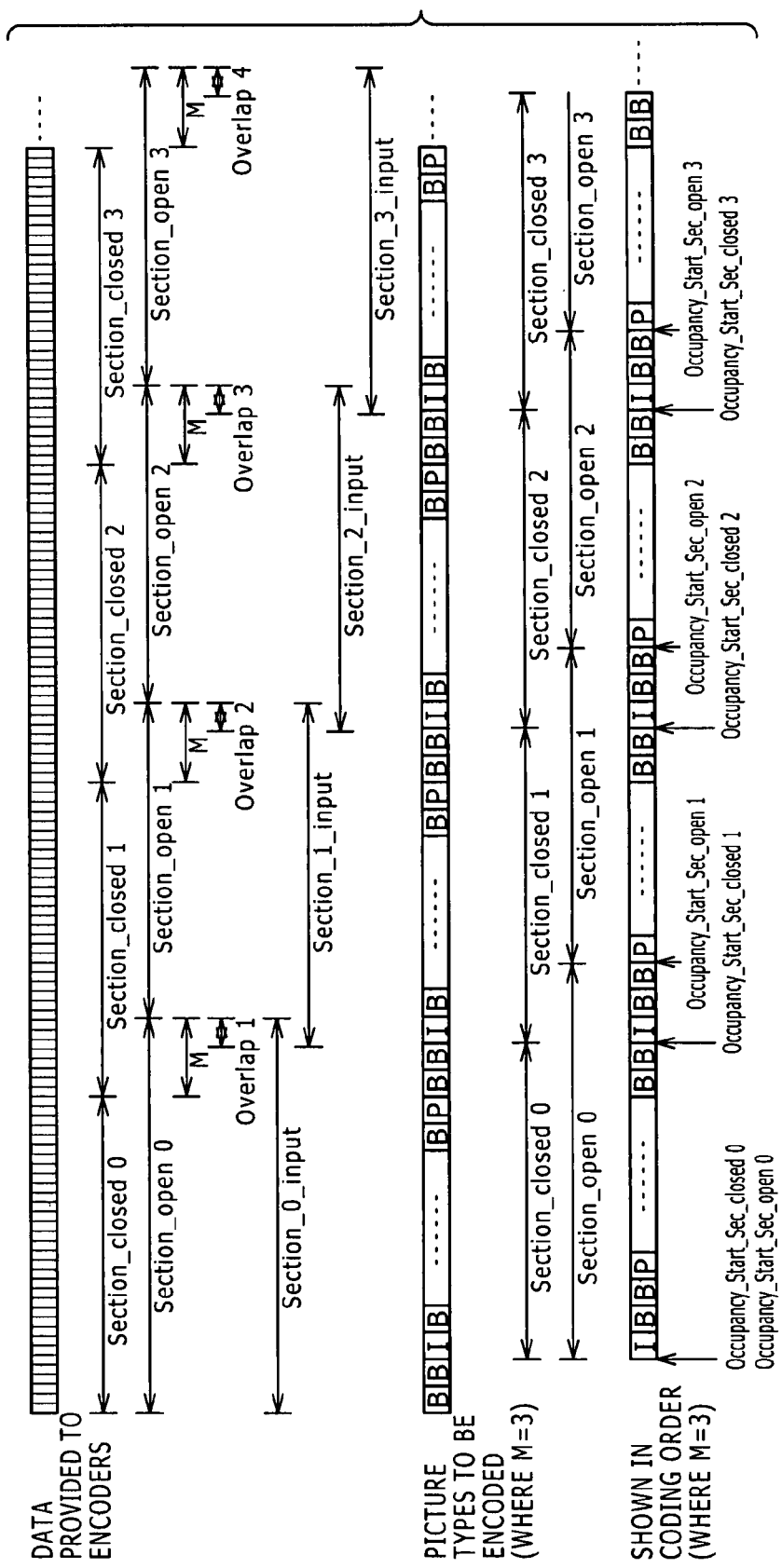
FIG. 13 is another schematic view explanatory of the second method.

Described below in reference to FIG. 13 is where data is split into sections according to the second method, along with the pictures to be input to the encoders 41.

In FIG. 13, the sections according to the first method are represented by "Section_closed" each. Under the second method, the selector 23 determines where to split data into sections in such a manner that the split sections have their boundaries shifted temporally backward by an interval M from the boundaries of the sections "Section_closed" under the first method (M=3 for the typical 15-picture MPEG long GOP structure), the interval M separating either an I-picture from the next I-picture or a P-picture from the next P-picture in the GOP. The starting section of the entire encoding process, i.e., section 0 with no preceding frame, is encoded in the same picture structure as with the sections "Section_closed," the last section alone being shifted backward by the interval M. In FIG. 13, the sections split according to the second method are represented by "Section_open x" each.

According to the second method, the relations between sections and picture types are established so that the boundaries between the sections "Section_open" under the second method each come between the first BBI of each GOP and the succeeding two B pictures.

To encode the pictures in the first incomplete GOP (i.e., minus the first BBI) of a given section needs utilizing the last I picture of the preceding section as the reference picture. Thus except for the starting section of the whole encoding process, i.e., other than section 0 that has no preceding frame, each section "Section_open x" is provided with the last picture of the preceding section (i.e., I-picture) as the reference picture when sent to the encoder 41. In FIG. 13, the data portion provided to each encoder is represented by "Section_ x_input." As shown by indications overlap 1, 2, 3, 4 in FIG. 13, "Section_x_input" corresponding to each section overlaps by one picture with "Section_x_input" corresponding to each of the immediately preceding and succeeding sections.

Each section group is set to have as many sections as the number of encoders 41 used. The range of the baseband signal representative of each section "Section_x_input" is provided to the applicable encoder 41 so that the sections making up each section group are encoded in parallel. The manner in which to determine the range of the baseband signal representative of each section "Section_x_input" and the applicable encoder 41 for which the range of the baseband signal is destined is the same as under the first method.

According to the second method, as described, the sections are determined in a manner shifted backward by the interval M relative to the boundaries of GOPs. The starting point of the data provided to the encoder 41 is arranged to come before the last picture of the preceding section, and the ending point of the data provided to the encoder 41 is set to overlap with the ending point of the current section.

Thus in coding order, the I-picture of the preceding section as the reference picture for encoding the first two B-pictures of the section is always sent to the encoder 41. The first I-picture of each "Section_x_input" is used solely as the reference picture for each encoder 41; the first I-picture of the encoded "Section_x_input" is not output.

Figure 14:
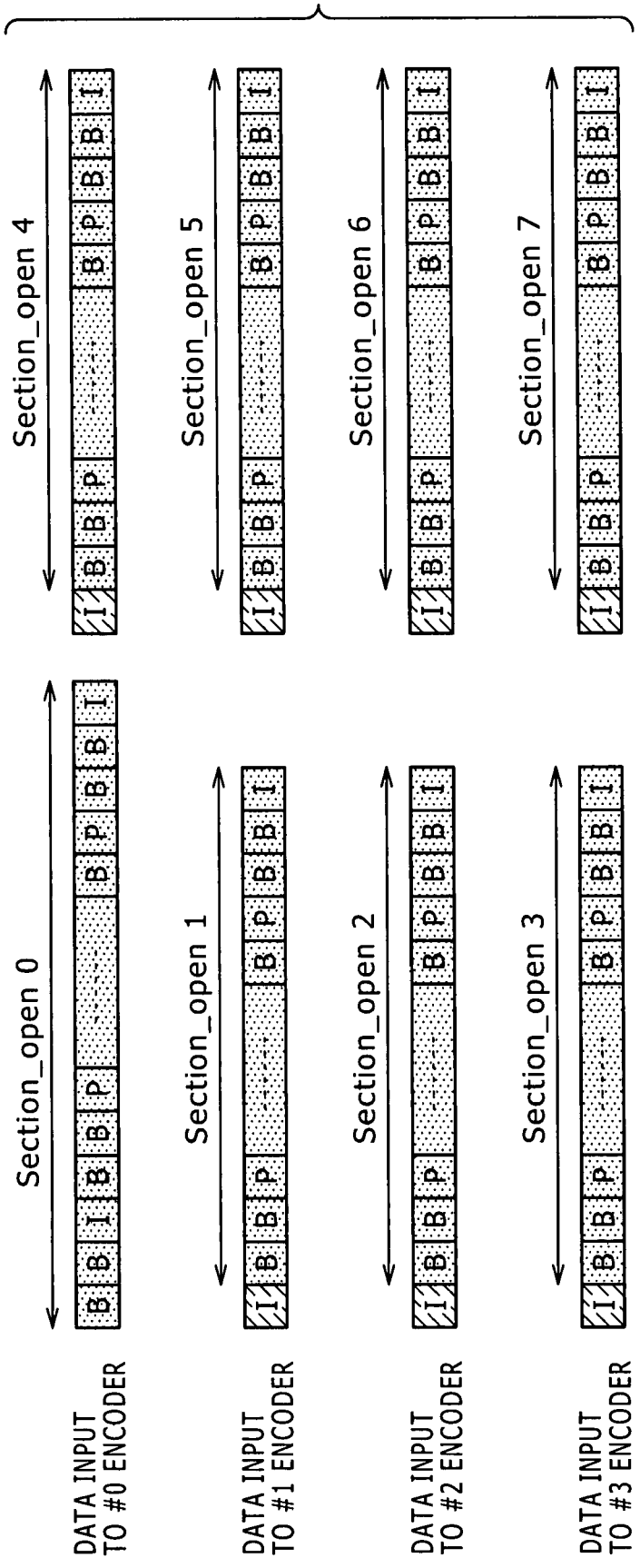
FIG. 14 is another schematic view explanatory of the second method.
Figure 15:
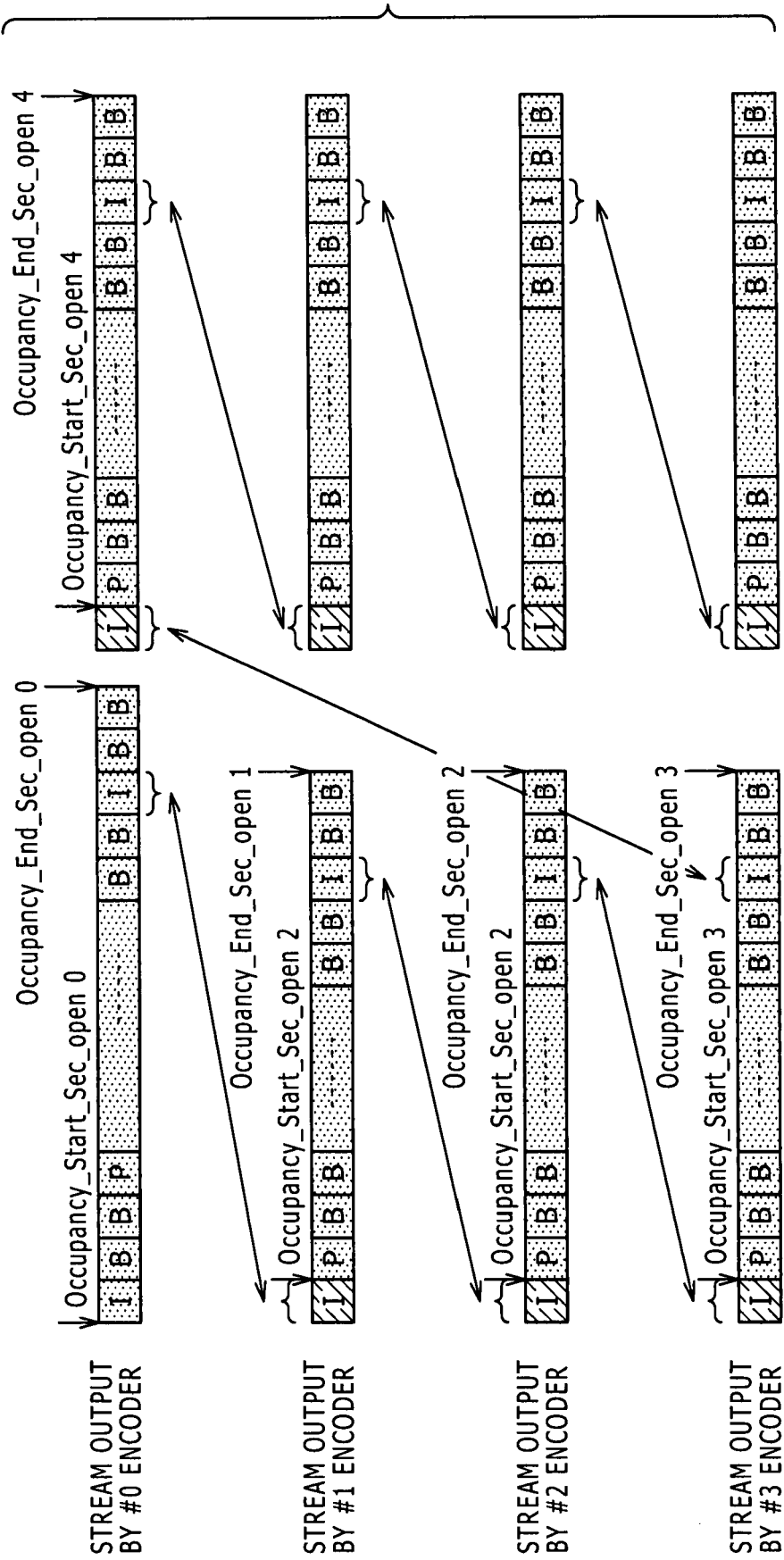
FIG. 15 is another schematic view explanatory of the second method.

Described below in reference to FIGS. 14 and 15 is how four sections are for example encoded in parallel according to the second method.

In FIG. 14, two section blocks (i.e., sections 0 through 7) are shown as the data to be input ("Section_x_input" each) to #0 encoder 41-1 through #3 encoder 41-4. As explained above, the first I-picture of each of sections 1 through 7 "Section_x_input" is used as the reference picture for the corresponding encoder; the first I-picture of each encoded "Section_x_input" is not output. The sections "Section_open x" in FIG. 14 are output.

In each of sections 1 through 7, with the exception of section 0, the first two B-pictures are encoded in reference to a picture outside the current section, i.e., in reference to the I-picture preceding the section. In each of sections 1 through 7, except for section 0, the first I-picture not included in "Section_open x" is used solely as the reference picture for encoding the first two B-pictures of the section.

The sections each indicated by "Section_x_input" in FIG. 13 are input to #0 encoder 41-1 through #3 encoder 41-4 in display order. The input sections are then rearranged into coding order before they are encoded.

For example, the first two B-pictures of the section encoded by #1 encoder 41-2 are decoded in reference to the last I-picture of the preceding section and the first P-picture of the same section. However, at the time the first two B-pictures of the section are encoded, the last I-picture has yet to be encoded by #0 encoder 41-1. Thus the same I-picture as the last I-picture of the section bound for #0 encoder 41-1 is provided to #1 encoder 41-2 for use as the reference picture, as shown in FIG. 15.

The foregoing is an open structure in which the boundaries of the sections as picture units to be encoded reference pictures in other sections. The first picture of each section "Section_x_input" is encoded as the I-picture and then turned into a locally decoded picture that is used as the reference picture for encoding the baseband signal of the corresponding section. The conditions for encoding the I-picture as the reference picture are arranged exactly to match the conditions for encoding the I-picture of the preceding section. Obviously, the conditions for encoding the reference picture in the starting section of each section group are inherited from the conditions for encoding the same picture in the last section of the preceding section group. The encoding conditions for pictures other than the reference picture are determined as usual.

Where #0 encoder 41-1 through #n−1 encoder 41-n are functionally identical encoders, they carry out their encoding processes using the same algorithm. In such a case, initial parameters are determined beforehand for use in encoding the two I-pictures. For example, if the rate control is implemented so as to determine the Q scale within the screen using "step 2" of TM5, then the bits allocated to the pictures and the Q scale for the first macro block may be held the same. This ensures the same results of encoding.

In practice, sections 1 through 7 are encoded in such a manner that the locally decoded picture of the I-picture is first generated as the reference picture that is used to start encoding the first P-picture of the section, the succeeding two B-pictures being encoded by use of the I-picture and the P-picture.

With the above arrangements in place, the sections with predictive relations therebetween can be encoded in parallel by a plurality of encoders 41. The encoding process is performed without the need to carry out complex processes for preparing the reference picture or to generate the locally decoded picture entailing deterioration of picture quality.

According to the second method, as discussed above, the encoding process is subject to another three constraints, the fourth, the fifth and the sixth. The fourth constraint involves determining where to split data into sections in such a manner that the split sections have their boundaries shifted temporally backward by an interval M from the boundaries of the sections "Section_closed" under the first method (M=3 for the typical 15-picture MPEG Long-GOP structure), the interval M separating either an I-picture from the next I-picture or a P-picture from the next P-picture in the GOP. The fifth constraint involves performing the encoding process in such a manner that except for the starting section of the whole encoding process, i.e., other than section 0 that has no preceding frame, each section "Section_open x" is provided with the last picture of the preceding section (i.e., I-picture) as the reference picture when sent to the encoder 41. The sixth constraint involves controlling the conditions for encoding the I-picture as the reference picture exactly to match the conditions for encoding the same I-picture of the preceding section.

Under the second method, the encoder 41 to which to supply each section is determined in the same manner as under the first method.

Furthermore, according to the second method, the third constraint and a constraint substantially similar to the second constraint under the first method are also imposed on the encoding process.

That is, as discussed above in reference to FIG. 8, the encoding process is controlled in such a manner that the encode starting point of each section corresponding to a given encoder 41, i.e., the VBV buffer occupancy of the P-picture at the beginning of the section, is determined beforehand, and that the VBV buffer occupancy at the encode ending point of each section corresponding to a given encoders 41 becomes equal to the VBV buffer occupancy at the encode starting point of the next section. In other words, the latter condition is that if the starting VBV buffer occupancy of section No. x is represented by "Occupancy_Start_x" and if the ending VBV buffer occupancy of section No. x is denoted by "Occupancy_End_x," then "Occupancy_End_x" is made equal to "Occupancy_Start_x+1." The individually encoded streams can then restore their continuity in terms of VBV buffer occupancies when subsequently spliced together.

A Quant Matrix Extension is added to the beginning of each section, i.e., to the P-picture heading each of the encoded streams generated by the encoders 41. Whereas the Sequence Header is added to the I-picture under the first method so as to reset the Q-Matrix for each section, the second method involves adding the Quant Matrix Extension to the beginning of each section in order to reset the Q-Matrix per section. With the Q-Matrix reset per section, each section is freed from the effects of any other section being encoded.

The encoded streams derived from the encoding process are spliced together in the memory 18 under control of the CPU 20.

Figure 16:
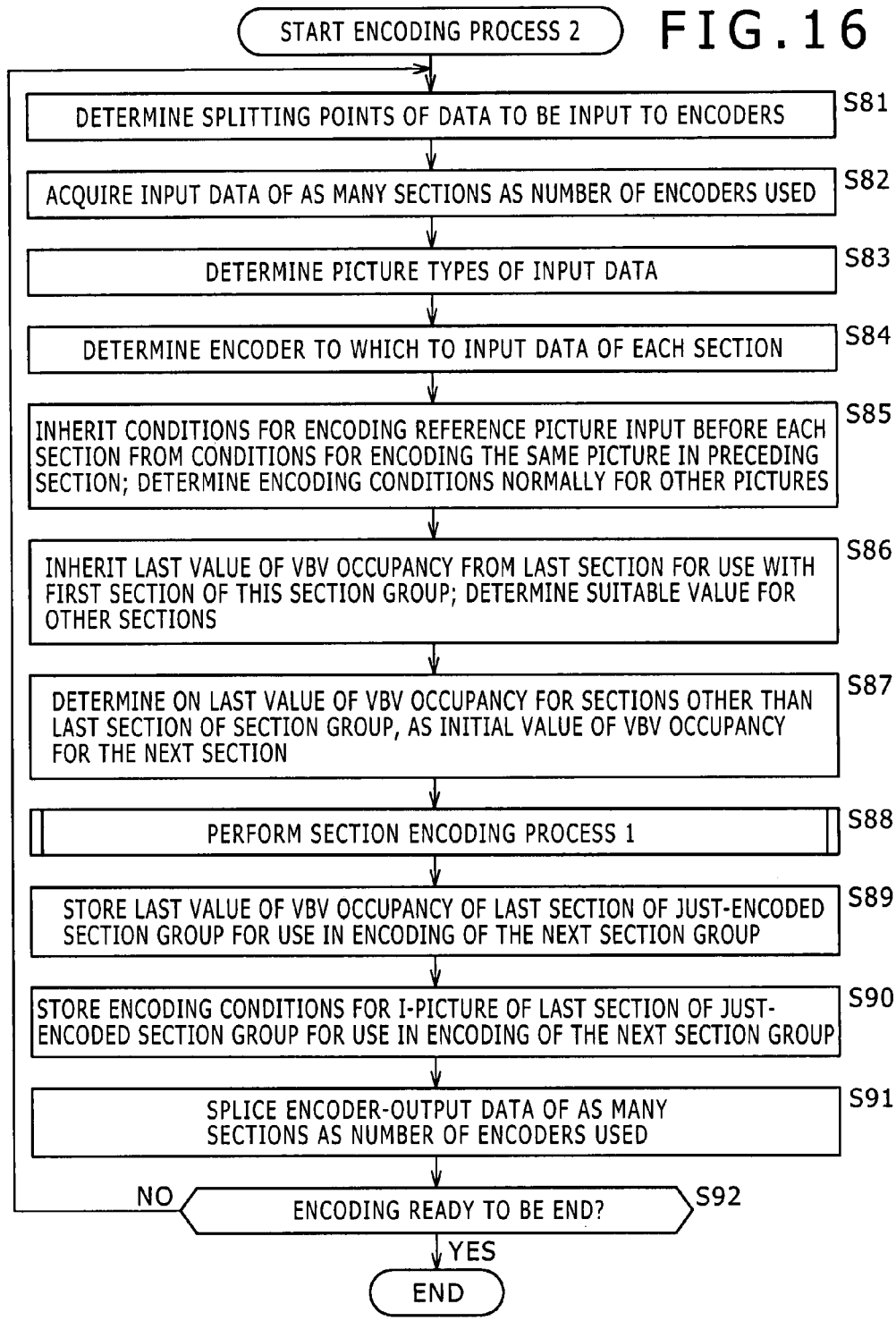
FIG. 16 is a flowchart of processing steps of an encoding process 2.

Described below in reference to the flowchart of FIG. 16 is a second example of the encoding process called the encoding process 2 corresponding to the second method above.

In step S81, the stream acquisition control unit 151 determines the number of encoders 41 used for parallel encoding out of the encoders included in the encoder unit 24. The stream acquisition control unit 151 then determines where to split the data to be input to the encoders 41, i.e., determines on the sections and the section groups described above in reference to FIGS. 13 through 15.

In step S82, the stream acquisition control unit 151 acquires as many sections of input data as the number of encoders 41 in use.

In step S83, the encoding control unit 154 determines the picture types for the input data to be encoded so that the sections will have their boundaries shifted temporally backward by an interval M from the boundaries of GOPs (e.g., each boundary comes between the first BBI of each GOP and the succeeding two B pictures in the typical 15-picture Long-GOP structure), the interval M separating either an I-picture from the next I-picture or a P-picture from the next P-picture in the GOP.

In step S84, the stream acquisition control unit 151 determines the encoders 41 to which to input each section of data.

In step S85, the encoding control unit 154 inherits the conditions for encoding the reference picture corresponding to the I-picture input at the beginning of each section, from the conditions for encoding the same picture of the preceding section, and determines the encoding conditions normally for the other sections. Obviously, the conditions for encoding the reference picture for the starting section of a given section group are inherited from the conditions for encoding the same picture in the ending section of the preceding section group.

In step S86, as described above in reference to FIG. 8, if the section group about to be processed is at the beginning of the data to be processed, then the encoding control section 154 establishes a predetermined value as the value of the VBV buffer occupancy at the starting point of the starting section in the group. If the section group about to be processed is not at the beginning of the data to be processed, then the encoding control unit 154 causes the VBV buffer occupancy at the starting point of the starting section in the group to inherit the value of the VBV buffer occupancy at the ending point of the ending section in the preceding section group, and suitably determines the value of the VBV buffer occupancy at the starting point of each of the sections other than the starting section in the group.

In step S87, as discussed above in reference to FIG. 8, the encoding control unit 154 determines on the last value of the VBV buffer occupancy for each of the sections other than the ending section in the section group to be processed, as the value of the VBV buffer occupancy at the starting point of the next section.

Figure 17:
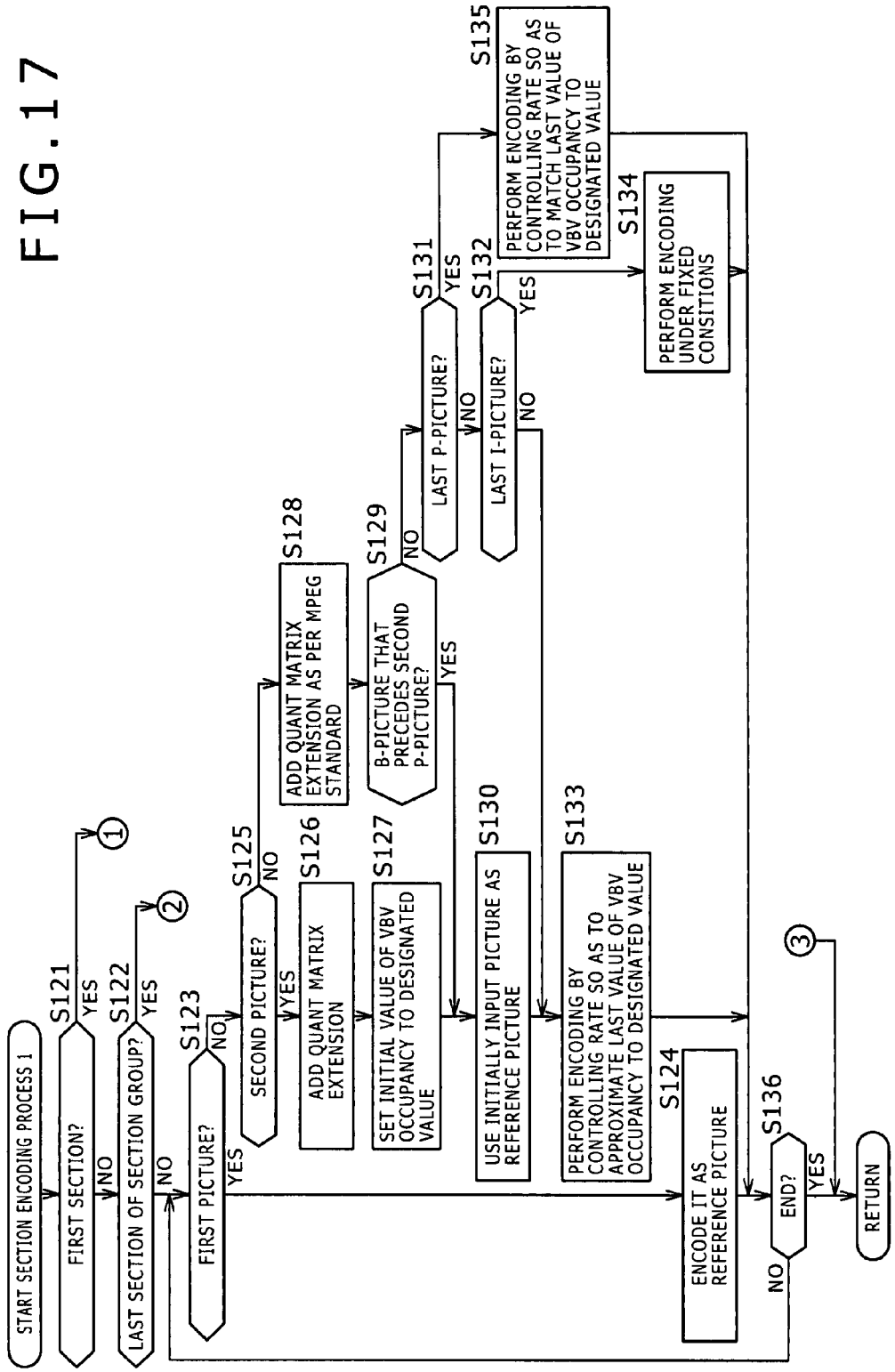
FIG. 17 is a flowchart of processing steps of a section encoding process 1.
Figure 18:
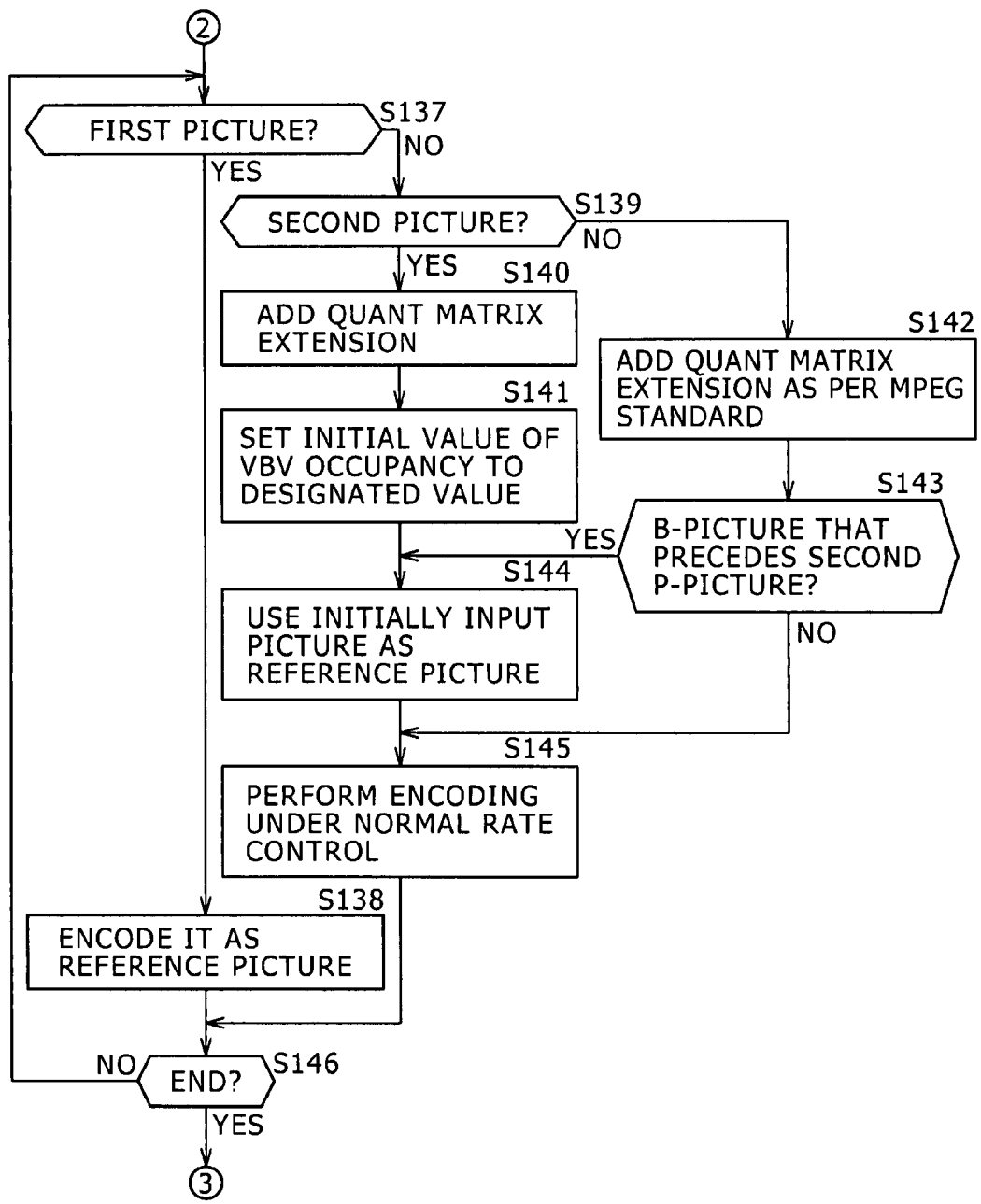
FIG. 18 is a flowchart of further processing steps of the section encoding process 1.
Figure 19:
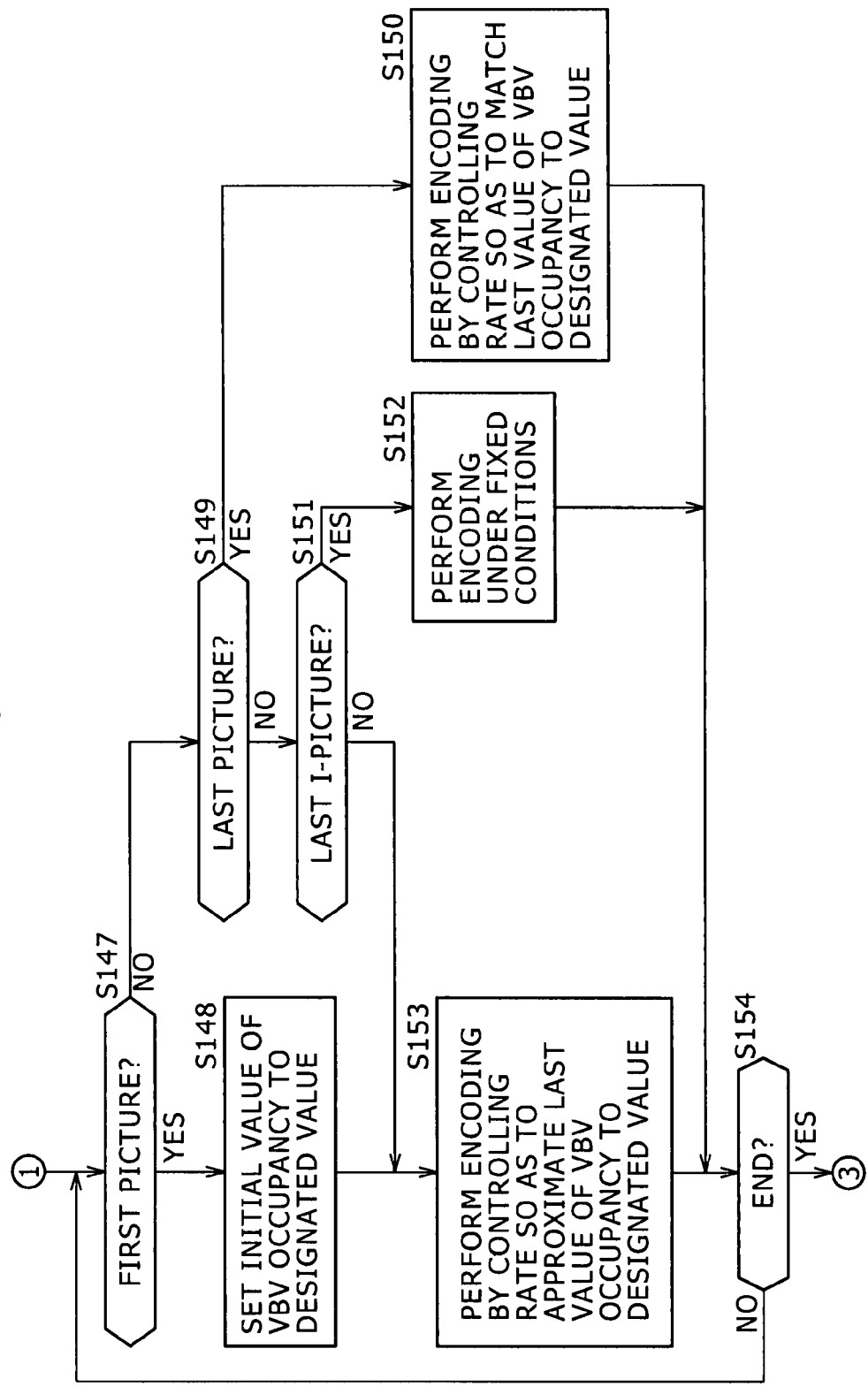
FIG. 19 is a flowchart of further processing steps of the section encoding process 1.

In step S88, a section encoding process 1 to be discussed later in reference to FIGS. 17 through 19 is carried out.

In step S89, the encoding control unit 154 temporarily stores the last value of the VBV occupancy of the ending section in the just-encoded section group for use in encoding the next section group.

In step S90, the encoding control unit 154 temporarily stores the conditions for encoding the I-picture of the ending section in the just-encoded section group, for use in encoding the next section group.

In step S91, the stream splicing control unit 155 controls the addresses in the memory 18 to which to write the encoded streams sent from the encoder unit 24 up to the PCI bridge 17, in such a manner as to splice the encoder-output data of as many sections as the number of the parallelly operated encoders, i.e., to splice the encoded streams of which the lengths correspond to the sections involved.

In step S92, the encoding control unit 154 checks to determine whether the encoding process is ready to be end. If the encoding process is not found ready to be end, control is returned to step S81 and the subsequent steps are repeated. If the encoding process is found ready to be end in step S92, then the encoding process 2 is brought to an end.

When the steps above are carried out, the I-picture can be prepared as the reference picture without triggering deterioration of picture quality even if predictive relations still exist between sections. The Q-Matrix is reset per section so that each section is freed from the effects of any other section being encoded. With the VBV buffer occupancy passed on from one section to another, the encoded streams produced parallelly by a plurality of encoders 41 are subsequently spliced together in the memory 18 in such a manner as to maintain their consistency.

As described, the multiple encoders 41 are arranged to operate in parallel to execute their encoding processes in the Long-GOP structure at high speed.

Under the second method, the starting GOP of a given section is arranged to be not a closed GOP but an open GOP. This makes it possible to prevent the deterioration of picture quality during encoding better than the first method.

Described below in reference to the flowcharts of FIGS. 17 through 19 is the section encoding process 1 performed in step S88 of FIG. 16.

The section encoding process 1 is carried out by the encoding control unit 154 controlling individually by the multiple encoders 41 involved.

In step S121, the encoding control unit 154 checks to determine whether a given picture to be encoded by a given encoder 41 is a picture in the starting section. If in step S121, the picture in question is found to be a picture in the starting section, then process proceeds to step S147, to be discussed later.

If in step S121, the picture in question is not found to be a picture in the starting section, then goes to step S122. In step S122, the encoding control unit 154 checks to determine if the picture in question is a picture in the ending section of the section group. If in step S122, the picture in question is found to be a picture in the ending section of the section group, then process proceeds to step S137, to be described later.

If in step S122, the picture in question is not found to be a picture in the ending section of the section group, then goes to step S123. In step S123, the encoding control unit 154 checks to determine whether the picture in question is the first picture that is provided.

If in step S123, the picture in question is found to be the first provided picture, i.e., an I-picture for reference purposes from outside the section, then goes to step S124. In step S124, the I-picture as the first provided picture from outside the section is encoded as the reference picture. Control is then passed on to step S136, to be described later.

If in step S123, the picture in question is not found to be the first provided picture, i.e., if the picture in question is found to be a picture included in the section, then goes to step S125. In step S125, the encoding control unit 154 checks to determine whether the picture to be encoded by given encoders 41 is the second provided picture, i.e., a P-picture heading the section. If in step S125, the picture in question is not found to be the second provided picture (i.e., not the P-picture heading the section), then process proceeds to step S128, to be discussed later.

If in step S125, the picture in question is found to be the second provided picture serving as the P-picture heading the section, then goes to step S126. In step S126, the encoding control unit 154 attaches a Quant Matrix Extension to the P-picture heading the encoded stream generated by the corresponding encoder 41. This resets the Q-Matrix per section, so that each section is freed from the effects of any other section being encoded.

In step S127, the encoding control unit 154 sets to a predetermined value the VBV buffer occupancy at the encode starting point of each section for each encoder 41, i.e., the VBV buffer occupancy of the P-picture heading the encoded stream generated by the corresponding encoder 41. Step S127 is followed by step S130.

How to determine the occupancy at the beginning of each section other than the starting section of a given section group is discretionary. If the degree of difficulty of encoding is known for each section, then the value of the occupancy may be determined according to the difficulty level. If the degree of difficulty of encoding is unknown, then "Occupancy_Start_Sec 1," "Occupancy_Start_Sec 2" and "Occupancy_Start_Sec 3" may all be given the same value as that of "Occupancy_Start_Sec 0" at the starting point of the section.

If in step S125, the picture in question is not found to be the second provided picture, i.e., not the P-picture heading the section, then goes to step S128. In step S128, the encoding control unit 154 attaches a Quant Matrix Extension to the picture in question, according to needs, based on the MPEG standard.

In step S129, the encoding control unit 154 checks to determine whether the picture to be encoded by a given encoder 41 is a B-picture preceding the P-picture as the second picture of the section. If in step S129, the picture in question is not found to be a B-picture preceding the P-picture as the second picture of the section, then process proceeds to step S131, to be described later.

After step S127 is carried out, or if in step S129 the picture in question is found to be the B-picture preceding the P-picture as the second picture of the section, i.e., if the picture to be encoded by a given encoder 41 is found to be one of the PBB pictures heading the section, step goes to step S130. In step S130, the encoding control section 154 uses the I-picture initially input as the reference picture for encoding the picture in question. Step S130 is followed by step S133, to be discussed later.

If in step S129, the picture in question is not found to be a B-picture preceding the P-picture as the second picture of the section, then goes to step S131. In step S131, the encoding control unit 154 checks to determine whether the picture to be encoded by a given encoder 41 is the last P-picture of the section. If in step S131, the picture in question is found to be the last P-picture of the section, then process proceeds to step S135, to be discussed later.

If in step S131, the picture in question is not found to be the last P-picture of the section, then goes to step S132. In step S132, the encoding control section 154 checks to determine whether the picture to be encoded by a given encoder 41 is the last I-picture of the section. If in step S131, the picture in question is found to be the last I-picture of the section, then process proceeds to step S134, to be described later.

After step S130 is carried out, or if in step S132 the picture in question is not found to be the last I-picture of the section, process proceeds to step S133. In step S133, as described above in reference to FIG. 8, the encoding control unit 154 carries out the encoding process while performing rate control in such a manner as to approximate the buffer occupancy in effect to the last value of the VBV buffer occupancy designated at the end of the section. Step S133 is followed by step S136, to be described later.

If in step S131, the picture in question is found to be the last I-picture of the section, then goes to step S134. In step S134, the encoding control unit 154 encodes the I-picture under the same fixed conditions as those for the corresponding I-picture encoded parallelly by another encoder 41 as the reference picture. Step S134 is followed by step S136, to be discussed later.

If in step S131, the picture in question is found to be the last P-picture of the section, then goes to step S135. In step S135, as described above in reference to FIG. 8, the encoding control unit 154 carries out the encoding process while performing rate control in such a manner as to match the buffer occupancy in effect to the last value of the VBV buffer occupancy designated at the end of the section.

Upon completion of step S124, S133, S134, or S135, in step S136, the encoding control unit 154 checks to determine whether the encoding process on the section in question has ended. If in step S136, the encoding control unit 154 does not find the encoding process to have ended on the section, then control is returned to step S123 and the subsequent steps are repeated. If in step S136, the encoding control unit 154 finds the encoding process to have ended on the section in question, then control is returned to step S88 in FIG. 16, and step S89.

If in step S122, the picture in question is found to be a picture in the ending section of the section group, process proceeds to step S137 in FIG. 18. Steps S137 through S142 in FIG. 18 are then carried out basically in the same manner as steps S123 through S128 described above.

More specifically, if the picture to be encoded by a given encoder 41 is found to be the first provided picture, i.e., if the picture of interest is found to be an I-picture for reference purposes from outside the section, then the encoding control unit 154 encodes the first provided picture as the reference picture. If the picture in question is not found to be the first provided picture, i.e., if the picture is found to be included in the section, then the encoding control unit 154 checks to determine whether the picture to be encoded by a given encoder 41 is the second provided picture, i.e., a P-picture heading the section.

If the picture in question is found to be the second provided picture, i.e., the P-picture heading the section, then the encoding control unit 154 adds a Quant Matrix Extension to the P-picture heading the encoded stream generated by the corresponding encoder 41 through encoding. This resets the Q-Matrix per section, so that each section is freed from the effects of any other section being encoded. The encoding control unit 154 then sets to a predetermined value the VBV buffer occupancy at the encode starting point of each section for each encoder 41, i.e., the VBV buffer occupancy of the P-picture heading the encoded stream generated by the corresponding encoder 41.

If the picture in question is not found to be the second provided picture, i.e., not the P-picture heading the section, then the encoding control unit 154 attaches a Quant Matrix Extension to the picture in question, according to needs, based on the MPEG standard.

In step S143, the encoding control unit 154 checks to determine whether the picture to be encoded by a given encoder 41 is a B-picture preceding the P-picture as the second picture of the section. If in step S143, the picture in question is not found to be a B-picture preceding the P-picture as the second picture of the section, then process proceeds to step S145, to be described later.

After step S141 is carried out, or if in step S143 the picture in question is found to be a B-picture preceding the P-picture as the second picture of the section, i.e., if the picture to be encoded by a given encoder 41 is found to be one of the PBB pictures heading the section, process proceeds to step S144. In step S144, the encoding control unit 154 uses the first input I-picture as the reference picture for encoding the picture in question.

After step S144 is carried out, or if in step S143 the picture in question is not found to be a B-picture preceding the P-picture as the second picture of the section, process proceeds to step S145. In step S145, the encoding control unit 154 performs the encoding process under normal rate control.

Upon completion of step S138 or S145, in step S146, the encoding control unit 154 checks to determine whether the encoding process on the section in question has ended. If in step S146, the encoding process is not found to have ended on the section of interest, then control is returned to step S137 and the subsequent steps are repeated. If in step S146, the encoding process on the section in question is found to have ended, then control is returned to step S88 in FIG. 16, and proceeds to step S89.

If in step S121, the picture in question is found to be a picture in the starting section, then goes to step S147 in FIG. 19. In step S147, the encoding control unit 154 checks to determine whether the picture in question is the first provided picture. If in step S147, the picture in question is not found to be the first provided picture, then process proceeds to step S149, to be discussed later.

If in step S147, the picture in question is found to be the first provided picture, i.e., the starting picture of the starting section, then goes to step S148. In step S148, the encoding control unit 154 sets the VBV buffer occupancy at the encode starting point of the starting section to a predetermined value. Step S148 is followed by step S153, to be described later.

If in step S147, the picture in question is not found to be the first provided picture, then goes to step S149. In step S149, the encoding control unit 154 checks to determine whether the picture in question is the last picture of the section.

If in step S149, the picture of interest is found to be the last picture of the section, then goes to step S150. In step S150, as described above in reference to FIG. 8, the encoding control unit 154 carries out the encoding process while performing rate control in such a manner as to match the buffer occupancy in effect to the last value of the VBV buffer occupancy designated at the end of the section. Step S149 is followed by step S154, to be discussed later.

If in step S149, the picture of interest is not found to be the last picture of the section, then goes to step S151. In step S151, the encoding control unit 154 checks to determine whether the picture to be encoded by a given encoder 41 is the last I-picture of the section. If in step S151, the picture in question is not found to be the last I-picture of the section, then process proceeds to step S153, to be described later.

If in step S151, the picture in question is found to be the last I-picture of the section, then goes to step S152. In step S152, the encoding control unit 154 encodes the I-picture under the same fixed conditions as those for the corresponding I-picture encoded parallelly by another encoder 41 as the reference picture. Step S152 is followed by step S154, to be described later.

After step S148 is carried out, or if in step S151 the picture in question is not found to be the last I-picture of the section, process proceeds to step S153. In step S153, as discussed above in reference to FIG. 8, the encoding control unit 154 carries out the encoding process while performing rate control in such a manner as to approximate the buffer occupancy in effect to the last value of the VBV buffer occupancy designated at the end of the section.

Upon completion of step S150, S152, or S153, in step S154, the encoding control unit 154 checks to determine whether the encoding process on the section in question has ended. If in step S154, the encoding process is not found to have ended on the section of interest, then control is returned to step S147 and the subsequent steps are repeated. If in step S154, the encoding process on the section in question is found to have ended, then control is returned to step S88 in FIG. 16, and step S89.

When the steps above are carried out, the sections involved are encoded according to the second method that is subject to the predetermined constraints. The streams encoded individually by the respective encoders 41 are subsequently spliced into one continuous stream in the memory 18. A plurality of sections included in each section group are individually encoded in parallel by a plurality of encoders 41, whereby the compression encoding of the Long-GOP structure is accomplished at high speed.

More specifically, the second method is subject to the second and the third constraints substantially the same as those imposed on the first method. Moreover, the second method is subject to the fourth, the fifth, and the sixth constraint different from the constraints applicable to the first method.

The second constraint on the second method involves adding a Quant Matrix Extension to the beginning of each section, i.e., to the encode starting point of each encoder 41. This resets the Q-Matrix per section, so that each section is freed from the effects of any other section being encoded.

The third constraint on the second method involves determining beforehand the VBV buffer occupancy at the encode starting point of each section (i.e., the beginning of a section) for a given encoder 41, and controlling the generated code quantity in such a manner that the VBV buffer occupancy at the encode ending point of the section destined for the corresponding encoder 41 becomes equal to the VBV buffer occupancy at the encode starting point of the next section.

The fourth constraint on the second method involves determining where to split data into sections in such a manner that the split sections have their splitting points shifted temporally backward by an interval M from the boundaries of the sections "Section_closed" under the first method (M=3 for the typical 15-picture MPEG Long-GOP structure), the interval M separating either an I-picture from the next I-picture or a P-picture from the next P-picture in the GOP. The fifth constraint involves performing the encoding process in such a manner that except for the starting section of the whole encoding process, i.e., other than section 0 that has no preceding frame, each section "Section_open x" is provided with the last picture of the preceding section (i.e., I-picture) as the reference picture when input to the encoder 41. The sixth constraint involves exactly matching the conditions for encoding the I-picture as the reference picture to the conditions for encoding the same I-picture of the preceding section. With the fourth, the fifth and the sixth constraints duly observed, the sections can be encoded not in the closed GOP structure but on an open GOP basis.

The third method will now be described in reference to FIGS. 20 through 27.

The third method involves partially pre-encoding (i.e., performing partial two-pass encoding of) sections in order to match the last value of the VBV buffer occupancy to a target value more precisely than the second method.

Figure 20:
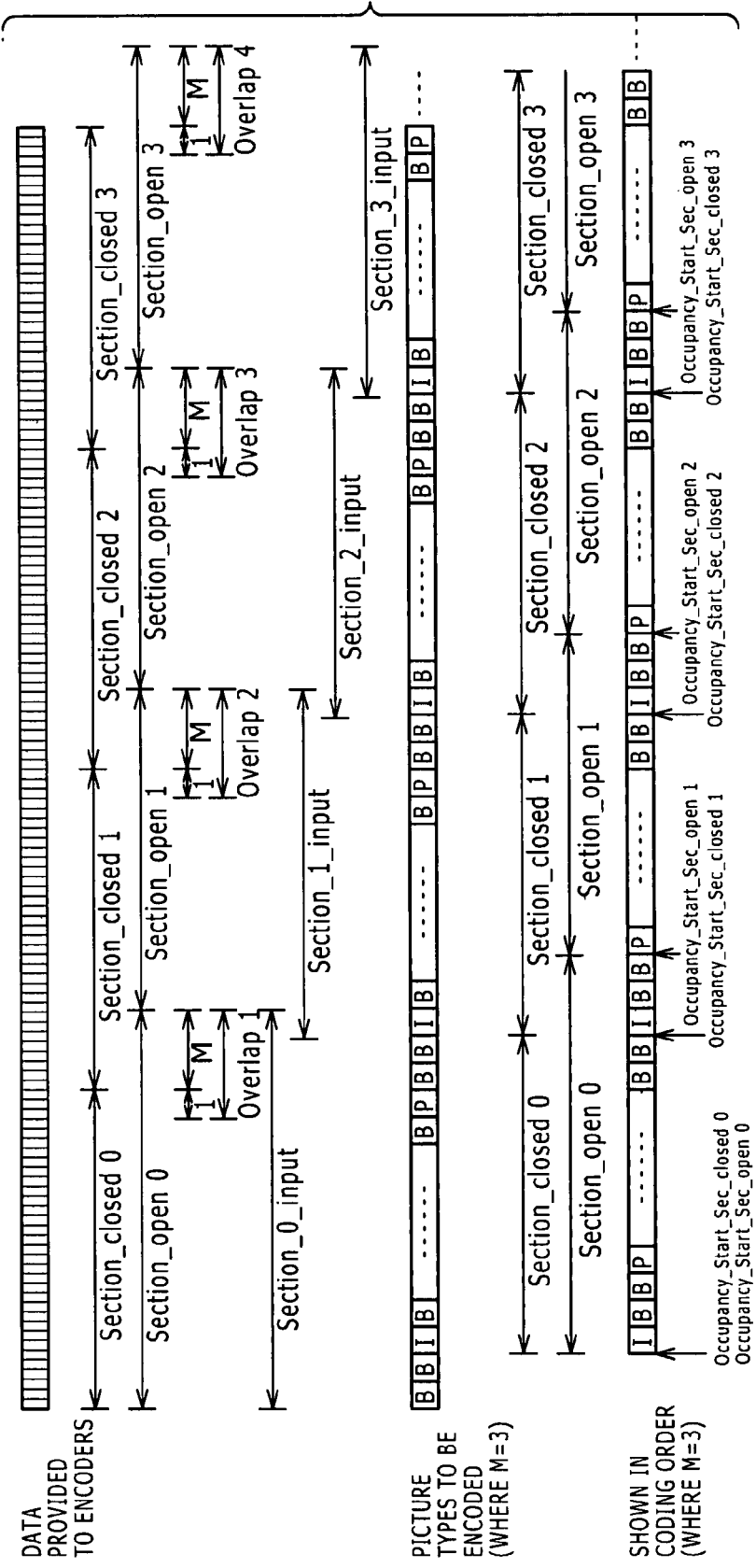
FIG. 20 is another schematic view explanatory of the second method.

Described below in reference to FIG. 20 is where data is split into sections according to the third method, along with the pictures to be input to the encoders 41.

In FIG. 20, the sections according to the first method are represented by "Section_closed" each. According to the third method, as under the second method, the selector 23 determines where to split data into sections in such a manner that the split sections have their splitting points shifted temporally backward by an interval M from the splitting points of the sections "Section_closed" under the first method (M=3 for the typical 15-picture MPEG Long-GOP structure), the interval M separating either an I-picture from the next I-picture or a P-picture from the next P-picture in the GOP. The starting section of the entire encoding process, i.e., section 0 with no preceding frame, is encoded in the same picture structure as the sections "Section_closed," the last section alone being shifted backward by the interval M. In FIG. 20, the sections split according to the third method are represented by "Section_open x" each.

According to the third method, as under the second method, the relations between sections and picture types are established so that the boundaries of the sections each come between the first BBI of each GOP and the succeeding two B pictures.

Also according to the third method, as under the second method, it is necessary to use the last I picture of the preceding section as the reference picture in order to encode the pictures in the first incomplete GOP (i.e., minus the first BBI) of a given section.

Under the third method, except for the starting section of the whole encoding process, i.e., other than section 0 that has no preceding frame, each section "Section_open x," when input to the corresponding encoder, is provided with as many as M pictures constituting one GOP preceding the incomplete GOP (i.e., minus the first BBI) heading the section, i.e., with the last BBI of the last section in FIG. 20, plus one preceding picture used as the reference picture for encoding the B-picture included in the M pictures (so that "M+1" pictures are attached to each section). In FIG. 20, the data portion provided to each encoder is represented by "Section_x_input." As shown by indications "Overlap 1 (2, 3, etc.,)" in FIG. 20, "Section_x_input" corresponding to each section overlaps by "M+1" pictures with "Section_x_input" corresponding to each of the immediately preceding and succeeding sections. That is, that portion of the baseband signal which corresponds to the starting section of the starting section group is input unchanged to the corresponding encoder. As for the sections other than the starting section, each section is supplemented by the last "M+1" pictures from the preceding section when input to the corresponding encoder.

Each section group is set to have as many sections as the number of encoders 41 used. The range of the baseband signal representative of each section "Section_x_input" is provided to the applicable encoder 41 so that the sections including each section group are encoded in parallel. The manner in which to determine the range of the baseband signal representative of each section "Section_x_input" and the applicable encoder 41 for which the range of the baseband signal is destined is the same as under the first method.

According to the third method, as described, the sections are determined in a manner shifted backward by the interval M relative to the boundaries of GOPs. That portion of the baseband signal which corresponds to the starting section of the starting section group is input unchanged to the corresponding encoder. The sections other than the starting section are each provided with the last "M+1" pictures from the preceding section when input to the corresponding encoder.

Figure 21:
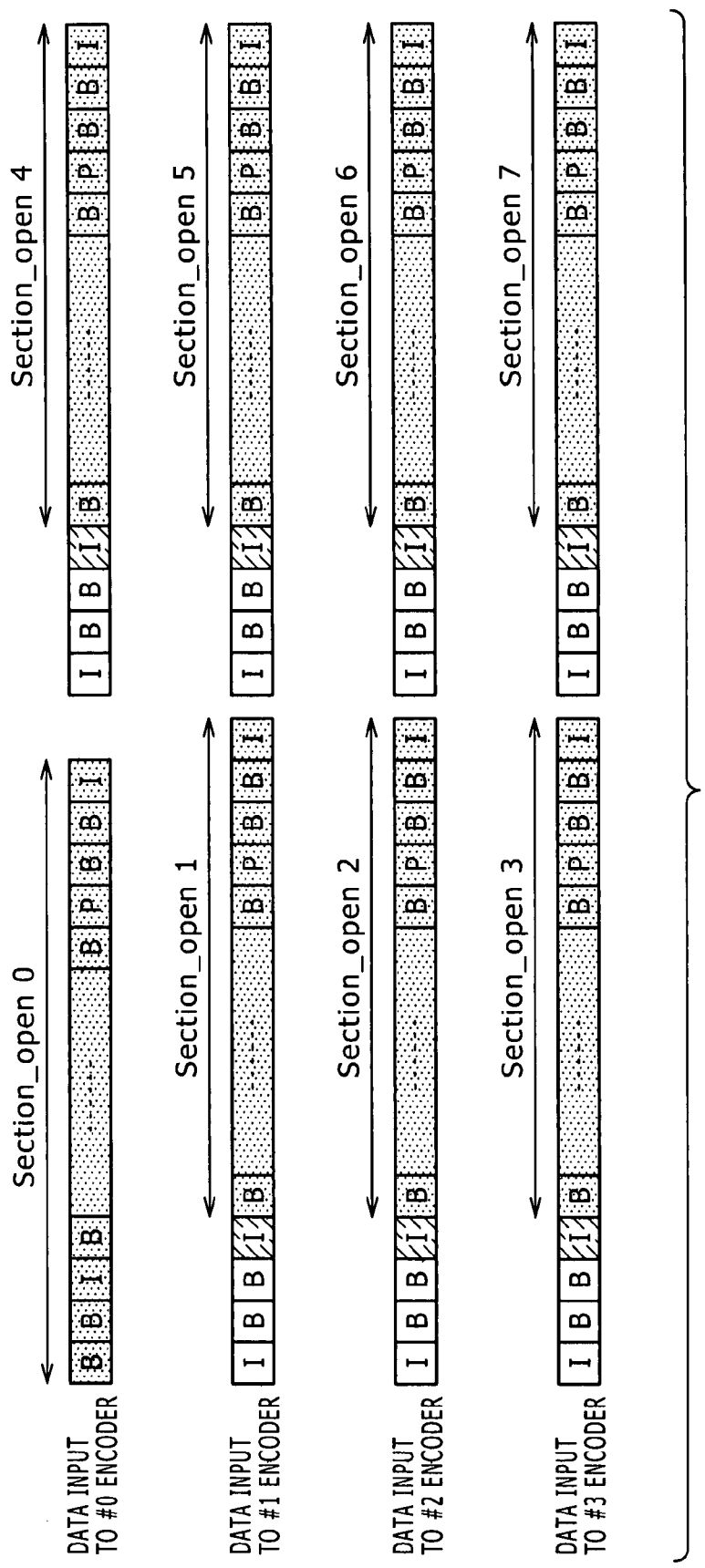
FIG. 21 is another schematic view explanatory of the second method.
Figure 22:
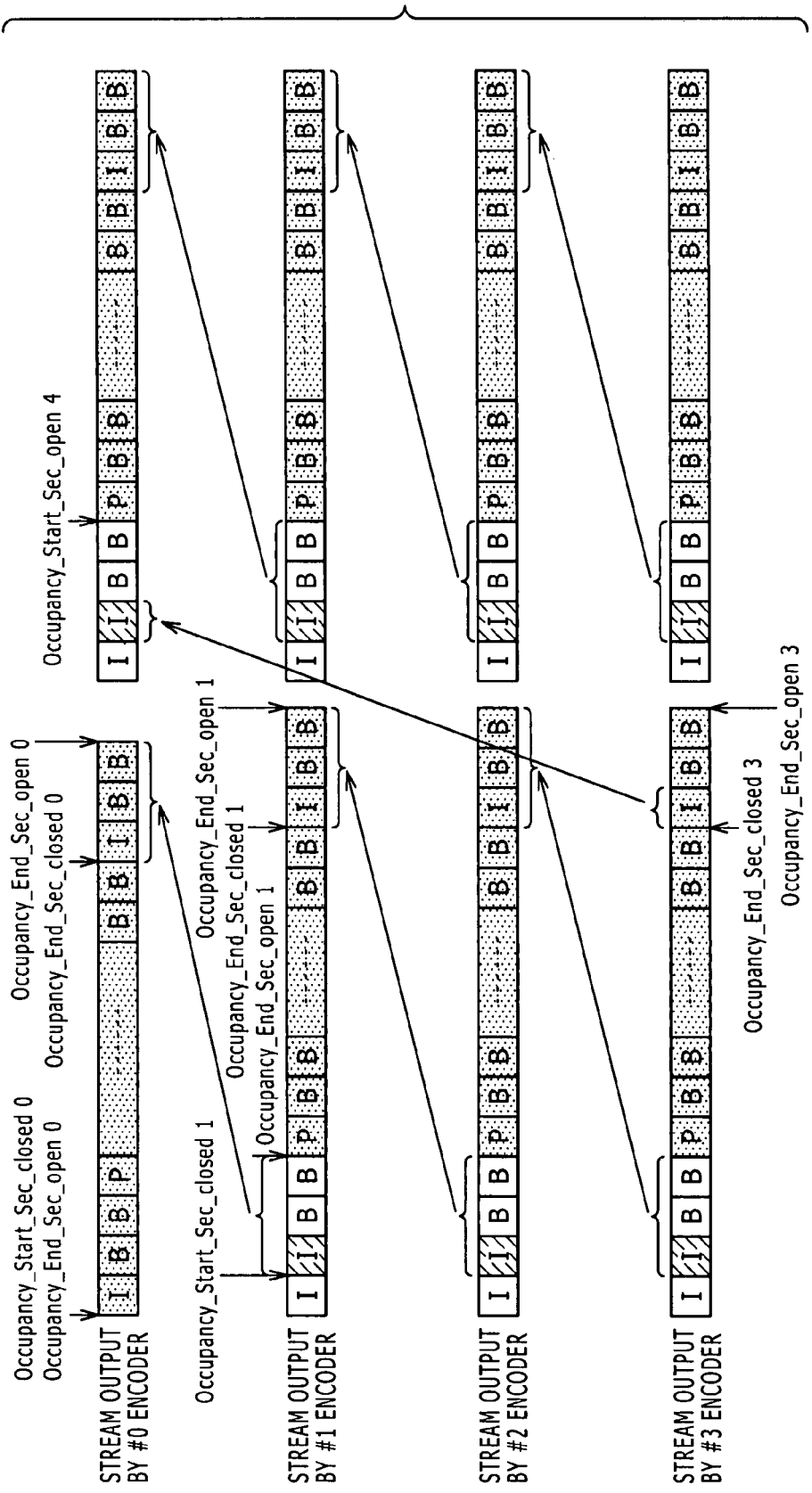
FIG. 22 is another schematic view explanatory of the second method.

Described below in reference to FIGS. 21 and 22 is how four sections are illustratively encoded in parallel according to the third method.

In FIG. 21, two section blocks (i.e., sections 0 through 7) are shown as the data to be input ("Section_x_input" each) to #0 encoder 41-1 through #3 encoder 41-4. As explained above, the first "M+1" pictures of each of sections 0 through 7 "Section_x_input" are used both as the reference pictures for encoding and as data for pre-encoding; the first "M+1" pictures of each encoded "Section_x_input" are not output. Just the sections "Section_open x" in FIG. 21 are output.

The sections each indicated by "Section_x_input" in FIG. 20 are input to #0 encoder 41-1 through #3 encoder 41-4 in display order. The input sections are then rearranged into coding order before they are encoded.

Partial pre-encoding is carried out under the conditions to be described below in order to acquire information for aligning splicing points in terms of VBV occupancies.

In the section preceding each of sections 1 through 7 with the exception of section 0 (i.e., at the beginning of the baseband signal input to each encoder 41), the picture corresponding to the P-picture is encoded as an I-picture that is turned into a locally decoded picture.

In each of sections 1 through 7, with the exception of section 0, the next picture in coding order is the I-picture used as the reference picture for encoding the first two B-pictures of the section question. According to the third method, as under the second method, the conditions for encoding the I-picture as the reference picture are made exactly to match those for encoding the same I-picture in the preceding section. Obviously, the conditions for encoding the reference picture for the starting section of a given section group are inherited from the conditions for encoding the same picture in the ending section of the preceding section group.

In coding order, the two succeeding B pictures are encoded in reference to two I-pictures. The encoding at this point is a pre-encoding process for acquiring the parameters used to control the generated code quantity at the end of the preceding section. The sign derived from the pre-encoding process is not output.

As shown in FIG. 22, the third and the fourth pictures to be encoded by #1 encoder 41-2 through #3 encoder 41-4 correspond to the last two B-pictures of the preceding section. Because the last two B-pictures of the preceding section are encoded later than the third and the fourth pictures, the subsequent encoding is carried out using information about the generated code quantity obtained from the pre-coding process. This makes it possible precisely to match the VBV buffer occupancy at the end of the section to the target value.

More specifically, as illustrated in FIG. 22, the baseband signal input to each encoder 41 is subject to pre-encoding of an I-picture and two B-pictures under rate control based on "Occupancy_Start_Sec_closed" and "Occupancy_End_Sec_closed" constituting respectively the first and the last temporary VBV buffer occupancies of one GOP starting from the second picture.

The pre-encoding process yields "Occupancy_Start_Sec_open x" constituting the VBV buffer occupancy at the beginning of the section upon actual encoding. The VBV buffer occupancy at the encode ending point of each section for each encoder 41 is arranged to become equal to the VBV buffer occupancy at the beginning of the next section. In other words, if the VBV buffer occupancy at the beginning of section "x" acquired through pre-encoding is represented by "Occupancy_Start_Sec_open x" and the VBV buffer occupancy at the end of section "x" is denoted by "Occupancy_End_Sec_open x," then each "Occupancy_End_Sec_open x" is set so that "Occupancy_End_Sec_open x" becomes equal to "Occupancy_Start_Sec_open x+1." With these arrangements in place, the VBV buffer occupancies can hold their consistency when the individually encoded streams are spliced together.

There is no need for a process to determine "Occupancy_Start_Sec_open" at the beginning of the section heading each section group.

The actual encoding of sections 1 through 7 starts from the first P-picture of each section through the use of the I-picture turned into a locally decoded picture as the reference picture upon completion of the encoding of four pictures "IIBB" from outside the section.

The last I-picture of the section is encoded under the same conditions as those for encoding the I-picture used as the reference picture for the next section. Where #0 encoder 41-1 through #n−1 encoder 41-n are functionally identical encoders, they carry out their encoding processes using the same algorithm. In that case, initial parameters are determined beforehand for use in encoding the two I-pictures. For example, if the rate control is implemented so as to determine the Q scale within the screen using "step 2" of TM5, then the bits allocated to the pictures and the Q scale for the first macro block are kept the same. This ensures the same results of encoding.

The last two B-pictures of the section are encoded under control of the generated code quantity based on the result of the pre-encoding process performed by a different encoder 41 before the encoding of the next section.

More specifically, the occupancy in effect upon completion of the encoding of the I-picture based on the result of the pre-encoding process is used to calculate the occupancy at the end of the two B-pictures having been encoded under the conditions applicable to the pre-encoding process. A difference is obtained between the occupancy thus acquired and "Occupancy_End_Sec_open" serving as the target value. The difference obtained in this manner is used to change the encoding conditions for control over the generated code quantity, whereby the last value of the VBV buffer occupancy is matched to "Occupancy_End_Sec_open."

With the above arrangements in place, the sections having predictive relations therebetween can be encoded in parallel by a plurality of encoders 41. The encoding process is performed without the need to carry out complex processes for preparing the reference picture or to generate the locally decoded picture entailing deterioration of picture quality. The picture at the end of each section is pre-encoded using a different encoder 41 and the result of the pre-encoding process is used as the basis for rate control. This renders the consistency of buffer occupancies between the sections more accurate than ever before.

The third method, as with the second method, is subject to the fourth and the sixth constraints. The fourth constraint involves determining where to split data into sections in such a manner that the split sections have their splitting points shifted temporally backward by an interval M from the splitting points of the sections "Section_closed" under the first method (M=3 for the typical 15-picture MPEG Long-GOP structure), the interval M separating either an I-picture from the next I-picture or a P-picture from the next P-picture in the GOP. The sixth constraint involves matching exactly the conditions for encoding the I-picture as the reference picture to the conditions for encoding the same I-picture in the preceding section. Unlike the first and the second methods, the third method is further subject to a seventh and an eighth constraint. Under the seventh constraint, except for the starting section of the whole encoding process, i.e., other than section 0 that has no preceding frame, each section "Section_open x," when input to the corresponding encoder 41, is provided with as many as "M+1" pictures: an I-picture used as the reference picture, two succeeding B-pictures, and a picture used as the reference picture for encoding these two B-pictures (the last picture is actually a P-picture in the section but is encoded as an I-picture upon pre-encoding). The eighth constraint involves controlling the generated code quantity of the pictures corresponding to the pre-encoded portion (in this case, the last two B-pictures of the section) by use of the result of the pre-encoding process.

Under the third method, the encoder 41 to which to input each section is determined in the same manner as under the first and the second methods.

Furthermore, the second and the third constraints imposed on the first method are also imposed on the third method.

That is, as discussed above in reference to FIG. 8, the encoding process is controlled in such a manner that the VBV buffer occupancy at the encode starting point of each section corresponding to a given encoder 41, i.e., at the P-picture heading the section, is determined beforehand, and that the VBV buffer occupancy at the encode ending point of each section corresponding to a given encoders 41 becomes equal to the VBV buffer occupancy at the encode starting point of the next section. With this arrangement, the individually encoded streams can restore their continuity in terms of VBV buffer occupancies when subsequently spliced together. Under the third method, the VBV buffer occupancy at the encode starting point of each section for each encoder 41 is determined in keeping with the result of the pre-encoding process.

As under the second method, a Quant Matrix Extension is added to the beginning of each section, i.e., to the P-picture heading each of the encoded streams generated by the encoders 41. This in turn resets the Q-Matrix per section, so that each section is freed from the effects of any other section being encoded.

The encoded streams derived from the encoding process are spliced together in the memory 18 under control of the CPU 20.

Figure 23:
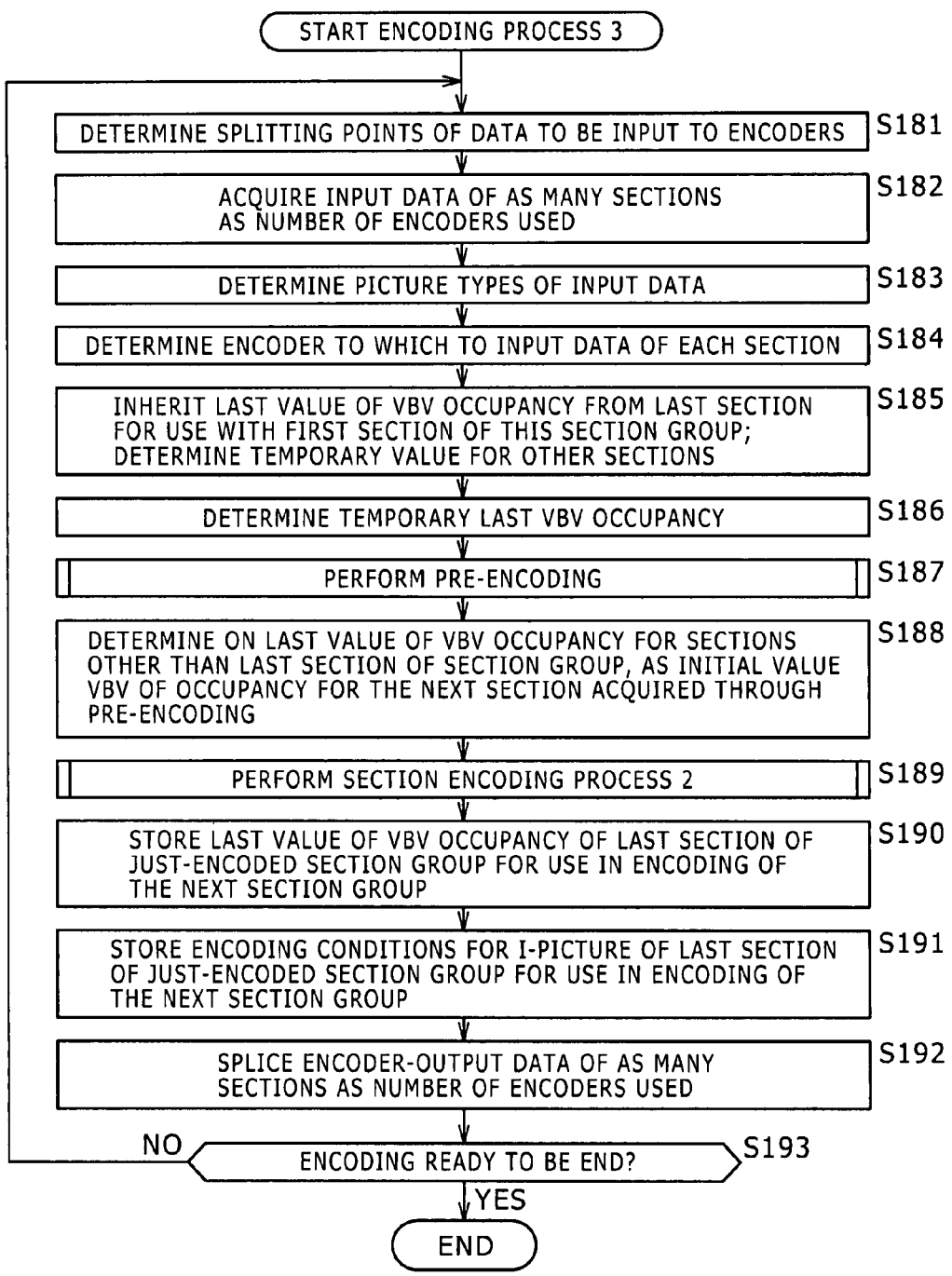
FIG. 23 is a flowchart of processing steps of an encoding process 3.

Described below in reference to the flowchart of FIG. 23 is a third example of the encoding process called the encoding process 3 corresponding to the third method above.

Steps S181 through S184 are carried out in substantially the same manner as steps S81 through S84 discussed above in reference to FIG. 16.

That is, the stream acquisition control unit 151 determines the number of encoders 41 used for parallel encoding out of the encoders 41 included in the encoder unit 24. The stream acquisition control unit 151 then determines where to split the data to be input to the encoders 41, i.e., decides on the sections and the section groups described above in reference to FIGS. 20 through 22. The stream acquisition control unit 151 then acquires as many sections of input data as the number of encoders 41 in use.

The encoding control unit 154 determines the picture types for the input data to be encoded so that the sections will have their boundaries shifted temporally backward by an interval M from the boundaries of GOPs (e.g., each boundary comes between the first BBI of each GOP and the succeeding two B pictures in the typical 15-picture Long-GOP structure), the interval M separating either an I-picture from the next I-picture or a P-picture from the next P-picture in the GOP.

The stream acquisition control unit 151 then determines the encoder from the encoders 41 to which to input each section of data.

In step S185, the encoding control unit 154 inherits the last value of the VBV buffer occupancy from the preceding section for use as the first value of the VBV buffer occupancy for the encoding of the baseband signal to be input to the encoder that encodes the starting section of the section group. Assuming that one GOP starting from the second picture is encoded, the encoding control unit 154 determines "Occupancy_Start_Sec_closed" constituting the temporary VBV buffer occupancy discussed above in reference to FIG. 22 as the VBV buffer occupancy at the encode starting point of each of the other sections.

In step S186, assuming that one GOP starting from the second picture is encoded, the encoding control unit 154 determines "Occupancy_End_Sec_closed" constituting the temporary last value of the VBV buffer occupancy described above in reference to FIG. 22.

Figure 24:
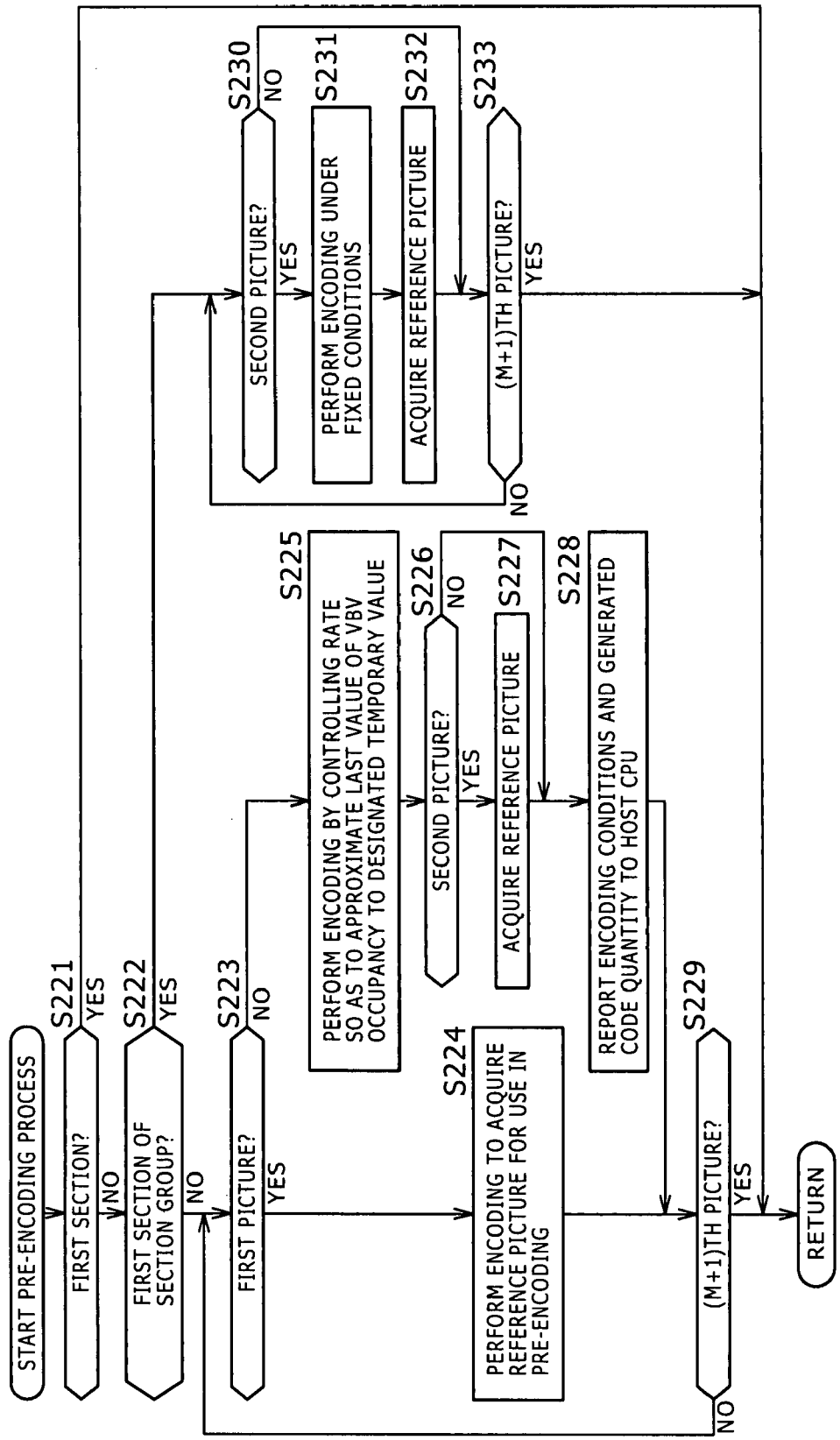
FIG. 24 is a flowchart of processing steps of a pre-encoding process.

In step S187, the pre-encoding process to be discussed later in reference to FIG. 24 is carried out.

In step S188, the encoding control unit 154 determines on the VBV buffer occupancy in effect at the encode ending point of any section other than the ending section of the section group, as the VBV buffer occupancy at the encode starting point of the next section obtained through pre-encoding.

Figure 25:
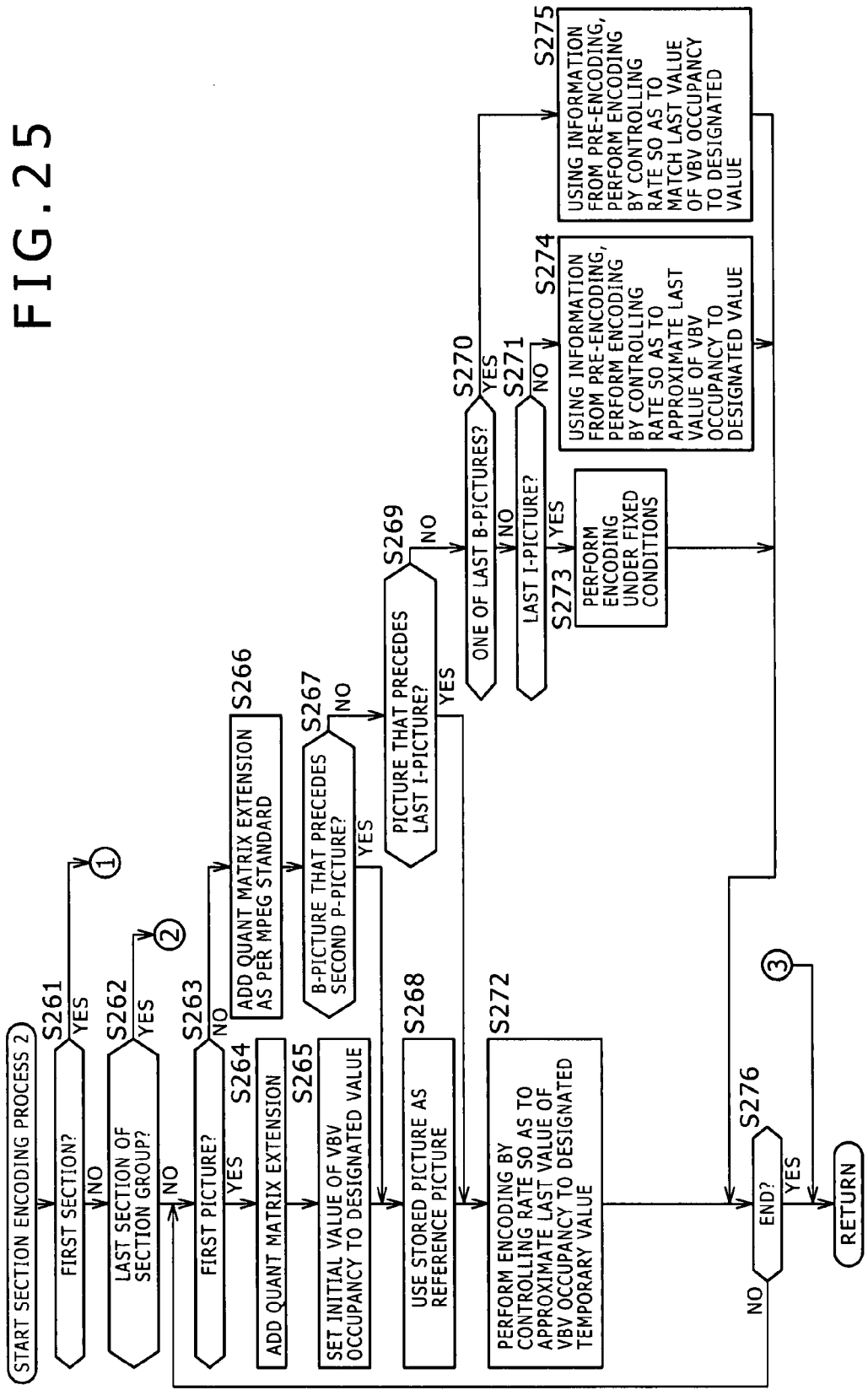
FIG. 25 is a flowchart of processing steps of a section encoding process 2.
Figure 26:
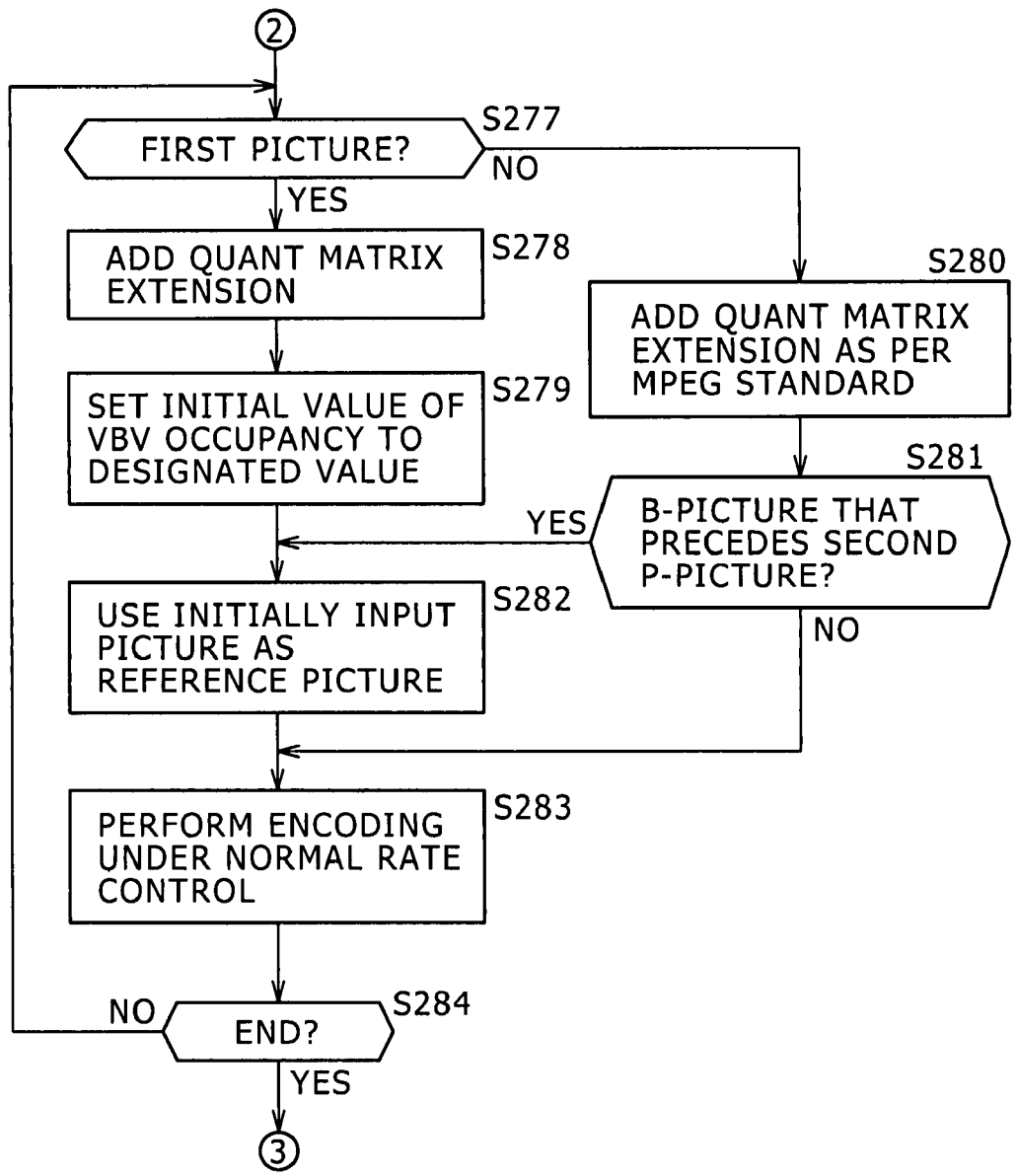
FIG. 26 is a flowchart of further processing steps of the section encoding process 2.
Figure 27:
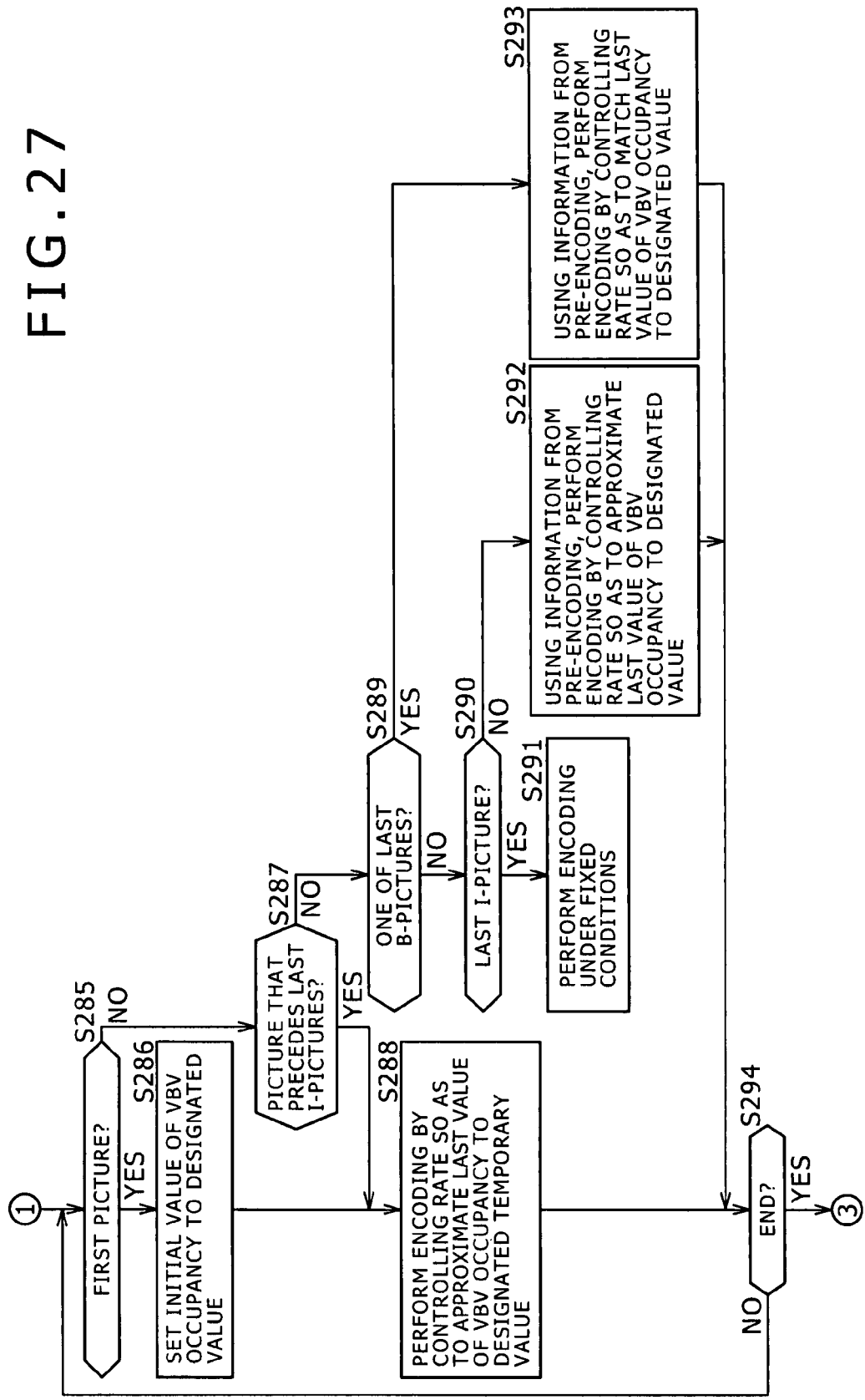
FIG. 27 is a flowchart of further processing steps of the section encoding process 2.

In step S189, the section encoding process 2 to be discussed later in reference to FIGS. 25 through 27 is carried out.

Steps S190 through S193 are performed in substantially the same manner as steps S89 through S92 discussed above in reference to FIG. 16.

That is, the last value of the VBV occupancy of the ending section in the just-encoded section group is temporarily stored for use in encoding the next section group. The conditions for encoding the I-picture of the ending section in the just-encoded section group are then temporarily stored for use in encoding the next section group. The addresses in the memory 18 to which to write the encoded streams sent from the encoder unit 24 to the PCI bridge 17, are controlled in such a manner that the encoder-output data of as many sections as the number of the parallelly operated encoders are spliced, i.e., that the encoded streams of which the lengths correspond to the sections involved are spliced together.

A check is then made to determine whether the encoding process is ready to be end. If the encoding process is not found ready to be end, control is returned to step S181 and the subsequent steps are repeated. If the encoding process is found ready to be end, then the encoding process 3 is brought to an end.

When the steps above are carried out, an I-picture is prepared as the reference picture without triggering deterioration of picture quality even if predictive relations still exist between sections. The Q-Matrix is reset per section so that each section is freed from the effects of any other section being encoded. With the VBV buffer occupancy passed on from one section to another, the encoded streams produced parallelly by a plurality of encoders 41 are subsequently spliced together in the memory 18 in such a manner as to maintain their consistency.

As described, the multiple encoders 41 are arranged to operate in parallel to execute their encoding processes in the Long-GOP structure at high speed.

Under the third method, the GOP corresponding to the starting section of the section group is arranged to be not a closed GOP but an open GOP. This makes it possible to prevent the deterioration of picture quality during encoding better than the first method.

The pre-encoding process is then carried out and the result of the process is used as the basis for controlling the generated code quantity being in effect. The third method thus renders the consistency of buffer occupancies between the sections more accurate than the first or the second method.

Described below in reference to the flowchart of FIG. 24 is the pre-encoding process performed in step S187 of FIG. 23.

The pre-encoding process is carried out by each of the encoders 41 individually under control of the encoding control unit 154.

In step S221, the encoding control unit 154 checks to determine whether the picture to be encoded by a given encoder 41 is a picture in the starting section of the data about to be encoded. If in step S221, the picture in question is found to be a section in the starting section, then control is returned to step S187 in FIG. 23, and step S188 is reached.

If in step S221, the picture of interest is not found to be a section in the starting section of the data to be encoded, then step S222 is reached. In step S222, the encoding control unit 154 checks to determine if the picture to be encoded by a given encoder 41 is in the starting section of a section group. If in step S222, the picture in question is found to be in the first section of the section group, then process proceeds to step S230, to be discussed later.

If in step S222, the picture in question is not found to be in the starting section of the section group, then step S223 is reached. In step S223, the encoding control unit 154 checks to determine whether the picture to be encoded by a given encoder 41 is the first picture that is input to the encoder.

If in step S223, the picture in question is found to be the first provided picture, then step S224 is reached. In step S224, the encoding control unit 154 encodes the picture in question as an I-picture in order to obtain the reference picture for pre-encoding purposes. Process then proceeds to step S229, to be discussed later.

If in step S223, the picture in question is not found to be the first provided picture, then step S225 is reached. In step S225, the encoding control unit 154 performs the encoding process while executing rate control in such a manner as to approximate the buffer occupancy at the encode ending point to "Occupancy_End_Sec_closed" constituting the temporary last value of the VBV buffer occupancy described above in reference to FIG. 22.

In step S226, the encoding control unit 154 checks to determine whether the picture to be encoded by a given encoder 41 is the second picture that is input to the encoder.

If in step S226, the picture in question is found to be the second provided picture, then step S227 is reached. In step S227, the encoding control unit 154 acquires an I-picture as the reference picture for use by the pictures in the section.

Step S228 is reached upon completion of step S227, or if in step S226 the picture in question is not found to be second provided picture. In step S228, the encoding control unit 154 informs the host CPU (i.e., CPU 20) of the encoding conditions used in the encoding process that has been carried out and of the generated code quantity in effect.

Step S229 is reached upon completion of step S224 or S228. In step S229, the encoding control unit 154 checks to determine whether the encoded picture is the (M+1)th picture. If in step S229, the picture in question is not found to be the (M+1)th picture, then control is returned to step S223 and the subsequent steps are repeated. If in step S229, the picture in question is found to be the (M+1)th picture, then control is returned to step S187 in FIG. 23, and step S188 is reached.

If in step S222, the picture in question is found to be in the first section of the section group, then step S230 is reached. In step S230, the encoding control unit 154 checks to determine whether the picture to be encoded by a given encoder 41 is the second picture that is input to the encoder. If in step S230, the picture in question is not the second provided picture, then process proceeds to step S233, to be described later.

If in step S230, the picture in question is found to be the second provided picture, then step S231 is reached. In step S231, the encoding control unit 154 encodes the picture in question as an I-picture under the same fixed conditions as those for the last I-picture of the preceding section, i.e., the ending section of the preceding section group.

In step S232, the encoding control unit 154 acquires the reference picture for use by the pictures in the section.

Step S233 is reached upon completion of step S232, or if in step S230 the picture in question is not found to be the second provided picture. In step S233, the encoding control unit 154 checks to determine whether the encoded picture is the (M+1)th picture. If in step S233, the encoded picture is not found to be the (M+1)th picture, then control is returned to step S230 and the subsequent steps are repeated. If in step S233, the encoded picture is found to be the (M+1)th picture, then control is returned to step S187 in FIG. 23, and step S188 is reached.

When the steps above are carried out, as many as (M+1) pictures are pre-encoded ahead of each section. The parameters for controlling generated code quantity are thus acquired, as well as the reference picture for use in encoding the pictures inside each section.

Described below in reference to FIGS. 25 through 27 is the section encoding process 2 carried out in step S189 shown in FIG. 23.

The section encoding process 2 is carried out by each of the encoders 41 individually under control of the encoding control unit 154.

In step S261, the encoding control unit 154 checks to determine whether the picture to be encoded by a given encoder 41 is a picture in the starting section. If in step S261, the picture in question is found to be a picture in the starting picture, then process proceeds to step S285, to be discussed later.

If in step S261, the picture in question is not found to be a picture in the starting section, then step S262 is reached. In step S262, the encoding control unit 154 checks to determine whether the picture to be encoded by a given encoder is a picture in the ending section of the section group. If in step S262, the picture in question is found to be a picture in the ending section of the section group, then process proceeds to step S277, to be described later.

If in step S262, the picture in question is not found to be a picture in the last section of the section group, then step S263 is reached. In step S263, the encoding control unit 154 checks to determine whether the picture to be encoded by a given encoder is the first picture of the section. If in step S263, the picture in question is not found to be the first picture of the section, then process proceeds to step S266, to be discussed later.

If in step S263, the picture in question is found to be the first picture of the section, i.e., a P-picture constituting the (M+2)th picture that is input to the encoder 41, then step S264 is reached. In step S264, the encoding control unit 154 adds a Quant Matrix Extension to the P-picture heading the encoded stream generated by the corresponding encoder 41. This allows the Q-Matrix to be reset for each section, so that the section in question is freed from the effects of any other section being encoded.

In step S265, the encoding control unit 154 sets the VBV buffer occupancy in effect at the encode starting point for one section to be encoded by the corresponding encoder 41, i.e., VBV buffer occupancy of the P-picture at the beginning of the section heading the encoded stream to be generated by the corresponding encoder 41. For example, the encoding control unit 154 sets the VBV buffer occupancy to the buffer occupancy in effect at the end of the pre-encoding process. Step S265 is followed by step S268, to be described later.

If in step S263, the picture in question is not found to be the first picture of the section, then step S266 is reached. In step S266, the encoding control unit 154 attaches a Quant Matrix Extension to the picture in question, according to needs, based on the MPEG standard.

In step S267, the encoding control unit 154 checks to determine whether the picture to be encoded by a given encoder 41 is a B-picture preceding the P-picture as the second picture of the section. If in step S267, the picture in question is not found to be a B-picture preceding the P-picture as the second picture of the section, then process proceeds to step S269, to be described later.

Step S268 is reached upon completion of step S265, or if in step S267 the picture in question is found to be a B-picture preceding the P-picture as the second picture of the section, i.e., if the picture to be encoded by a given encoder 41 is found to be one of the PBB pictures heading the section. In step S268, the encoding control unit 154 uses the first input I-picture as the reference picture for encoding the picture in question. Step S268 is followed by step S272, to be discussed later.

If in step S267, the picture in question is not found to be a B-picture preceding the P-picture as the second picture of the section, then step S269 is reached. In step S269, the encoding control unit 154 checks to determine whether the picture to be encoded by a given encoder 41 is a picture that comes before the last I-picture of the section. If in step S269, the picture in question is found to be a picture ahead of the last I-picture of the section, then process proceeds to step S272, to be described later.

If in step S269, the picture in question is not found to be a picture that comes before the last I-picture of the section, then step S270 is reached. In step S270, the encoding control unit 154 checks to determine whether the picture to be encoded by a given encoder 41 is one of the last B-pictures of the section. If in step S270, the section in question is found to be one of the last B-pictures of the section, then process proceeds to step S275, to be discussed later.

If in step S270, the section in question is not found to be any one of the last B-pictures of the section, then step S271 is reached. In step S271, the encoding control unit 154 checks to determine whether the picture to be encoded by a given encoder is the last I-picture of the section. If in step S271, the picture in question is found to be the last I-picture of the section, then process proceeds to step S273, to be described later. If in step S271, the picture of interest is not found to be the last I-picture of the section, then process proceeds to step S274, to be discussed later.

Step S272 is reached upon completion of step S268, or if in step S296 the picture in question is found to come before the last I-picture of the section. In step S272, the encoding control section 154 carries out the encoding process while performing rate control in such a manner as to approximate the VBV buffer occupancy to its temporary last value that is designated. Step S275 is followed by step S276, to be described later.

If in step S271, the picture in question is found to be the last I-picture of the section, then step S273 is reached. In step S273, the encoding control unit 154 encodes the I-picture under the same fixed conditions as those for the corresponding I-picture being encoded parallelly by another encoder 41 as the reference picture. Step S273 is followed by step S276, to be discussed later.

If in step S271, the picture in question is not found to be the last I-picture of the section, then step S274 is reached. In step S274, the encoding control unit 154 performs the encoding process while executing rate control using information from the pre-encoding process in such a manner as to approximate the VBV buffer occupancy to its last value that is designated. Step S274 is followed by step S276, to be described later.

If in step S270, the section in question is found to be one of the last B-pictures of the section, then step S275 is reached. In step S275, the encoding control unit 154 performs the encoding process while carrying out rate control using information from the pre-encoding process in such a manner as to match the VBV buffer occupancy to its last value that is designated. Step S275 is followed by step S276, to be discussed later.

Step S276 is reached upon completion of step S272, S273, S274 or S275. In step S276, the encoding control unit 154 checks to determine whether the encoding of the section in question is ready to be end. If in step S276, the encoding of the section in question is not found ready to be end, then control is returned to step S263 and the subsequent steps are repeated. If in step S276, the encoding of the section in question is found ready to be end, then control is returned to step S189 of FIG. 23, and step S190 is reached.

If in step S262, the section in question is found to be the last section of the section group, then steps S277 through S280 are reached and are carried out in basically the same manner as steps S263 through S266 described above.

That is, if the picture in question is found to be the first picture of the section, i.e., a P-picture constituting the (M+2)th picture that is input to a given encoder 41, then a Quant Matrix Extension is added to the P-picture heading the encoded stream generated by the corresponding encoder 41. The VBV buffer occupancy at the encode starting point for one section to be encoded by the corresponding encoder 41 is set to a predetermined value, e.g., to the buffer occupancy in effect at the end of the pre-encoding process.

If the picture in question is not found to be the first picture of the section, then a Quant Matrix Extension is attached to the picture in question, according to needs, based on the MPEG standard.

Step S281 is reached upon completion of step S280. In step S281, the encoding control unit 154 checks to determine whether the picture to be encoded by a given encoder 41 is a B-picture that comes before the P-picture as the second picture of the section. If in step S281, the picture in question is not found to be a B-picture ahead of the P-picture as the second picture of the section, then process proceeds to step S283, to be described later.

Step S282 is reached upon completion of step S279, or if in step S281 the picture in question is found to be a B-picture preceding the P-picture as the second picture of the section, i.e., if the picture to be encoded by a given encoder 41 is found to be one of the first PBB pictures of the section. In step S282, the encoding control unit 154 causes the picture in question to be encoded using the I-picture that was first input as the reference picture.

Step S283 is reached upon completion of step S282 or if in step S281 the picture in question is not found to be a B-picture that comes before the P-picture as the second picture of the section. In step S283, the encoding control unit 154 performs the encoding process under normal rate control.

In step S284, the encoding control unit 154 checks to determine whether the encoding of the section in question is ready to be end. If in step S284, the encoding of the section in question is not found ready to be end, then the encoding control unit 154 returns to step S277 and repeats the subsequent steps. If in step S284, the encoding of the section in question is found ready to be end, then the encoding control unit 154 returns to step S189 of FIG. 23 and goes to step S190.

If in step S261, the picture in question is found to be a picture in the starting section, then step S285 is reached. In step S285, the encoding control unit 154 checks to determine whether the picture to be encoded by a given encoder 41 is the first picture of the section.

If in step S285, the picture in question is found to be the first picture of the section, i.e., a P-picture constituting the (M+2)th picture that is provided to a given encoder 41, then step S286 is reached. In step S286, the encoding control unit 154 sets the VBV buffer occupancy in effect at the encode starting point for one section to be encoded by the corresponding encoder 41, i.e., the VBV buffer occupancy of the P-picture at the beginning of the section heading the encoded stream to be generated by the corresponding encoder 41. For example, the encoding control unit 154 sets the VBV buffer occupancy to the buffer occupancy in effect at the end of the pre-encoding process. Step S286 is followed by step S288, to be described later.

If in step S285, the picture in question is not found to be the first picture of the section, then step S287 is reached. In step S287, the encoding control unit 154 checks to determine whether the picture to be encoded by a given encoder 41 is a picture that comes before the last I-picture of the section.

Step S288 is reached upon completion of step S286 or if in step S287 the picture in question is found to a picture ahead of the last I-picture of the section. In step S288, the encoding control unit 154 carries out the encoding process while performing rate control in such a manner as to approximate the VBV buffer occupancy to its temporary last value that is designated. Step S288 is followed by step S294, to be described later.

If in step S287, the picture in question is not found to be a picture that comes before the last I-picture of the section, then step S289 is reached. In step S289, the encoding control unit 154 checks to determine whether the picture to be encoded by a given encoder 41 is one of the last B-pictures of the section. If in step S289, the picture in question is found to be one of the last B-pictures of the section, then process proceeds to step S293, to be discussed later.

If in step S289, the picture in question is not found to be any one of the last B-pictures of the section, then step S290 is reached. In step S290, the encoding control unit 154 checks to determine whether the picture to be encoded by a given encoder 41 is the last I-picture of the section.

If in step S290, the picture in question is found to be the last I-picture of the section, then step S291 is reached. In step S291, the encoding control unit 154 encodes the I-picture under the same fixed conditions as those for the corresponding I-picture being encoded parallelly by another encoder 41 as the reference picture. Step S291 is followed by step S294, to be described later.

If in step S290, the picture in question is not found to be the last I-picture of the section, then step S292 is reached. In step S292, the encoding control unit 154 performs the encoding process while carrying out rate control using information from the pre-encoding process in such a manner as to approximate the VBV buffer occupancy to its last value that is designated. Step S292 is followed by step S294, to be described later.

If in step S289, the picture in question is found to be one of the last B-pictures of the section, then step S293 is reached. In step S293, the encoding control unit 154 executes the encoding process while performing rate control using information from the pre-encoding process in such a manner as to match the VBV buffer occupancy to its last value that is designated. Step S293 is followed by step S294, to be discussed later.

Step S294 is reached upon completion of step S288, S291, S292, or S293. In step S294, the encoding control unit 154 checks to determine whether the encoding of the section in question has ended. If in step S294, the encoding of the section in question is not found to have ended, then step S285 is reached again and the subsequent steps are repeated. If in step S294, the encoding of the section in question is found to have ended, then control is returned to step S189 of FIG. 23, and step S190 is reached.

When the above steps are carried out, each of the sections involved is encoded according to the third method subject to the predetermined constraints. The encoders 41 are controlled individually to encode streams of data. The encoded streams are spliced together in the memory 18 into a single continuous stream. Because a plurality of encoders are used parallelly to encode a plurality of sections constituting each section group, it is possible to carry out compression encoding in the Long-GOP structure at high speed.

More specifically, the encoding process according to the third method is subject to some constraints common to the other methods: the same second and third constraints as those imposed on the first and the second methods, and the same fourth and sixth constraints as those imposed on the second method. The third method is further subject to the seventh and eighth constraints different from the constraints imposed on the first and the second methods. Under the seventh constraint, except for the starting section of the whole encoding process, i.e., other than section 0 that has no preceding frame, each section "Section_open x," when input to the corresponding encoder 41, is provided with as many as "M+1" pictures: an I-picture used as the reference picture, two succeeding B-pictures, and a picture used as the reference picture for encoding these two B-pictures (the last picture is actually a P-picture in the section but is encoded as an I-picture upon pre-encoding). The eighth constraint involves controlling the generated code quantity of the pictures corresponding to the pre-encoded portion (in this case, the last two B-pictures of the section) by use of the result of the pre-encoding process.

When the encoders are controlled in a manner subject to the seventh and the eighth constraints, the streams encoded on a section-by-section basis are spliced into one consistent stream with high accuracy in terms of VBV buffer occupancies.

Equipped with the above-described arrangements, the editing apparatus 1 can utilize a plurality of ordinary encoders to execute encoding processes at high speed in the Long-GOP structure. That is, high-speed encoding can be implemented by resorting to not a new encoder but a plurality of existing encoders operating in combination. This makes it possible to carry out rapid editing processes such as converting uncompressed materials or intra frame compressed materials into compressed data in the Long-GOP structure, and splicing streams into one stream at predetermined edit points.

Whereas the examples above were shown to adopt MPEG as the codec system, the present invention can also be applied to codec arrangements involving frame correlation and in particular to codec processing that is subject to buffer modeling. For example, the invention is applicable to AVC (Advanced Video Coding)/H.264.

The series of steps and processes described above may be executed either by hardware or by software. For the software-based processing to take place, the programs constituting the software may be either incorporated beforehand in dedicated hardware of a computer for program execution or installed upon use from a suitable recording medium into a general-purpose personal computer or like equipment capable of executing diverse functions based on the installed programs. For example, the editing apparatus 1 described above in reference to FIG. 1 may includes a personal computer 201 shown in FIG. 28.

Figure 28:
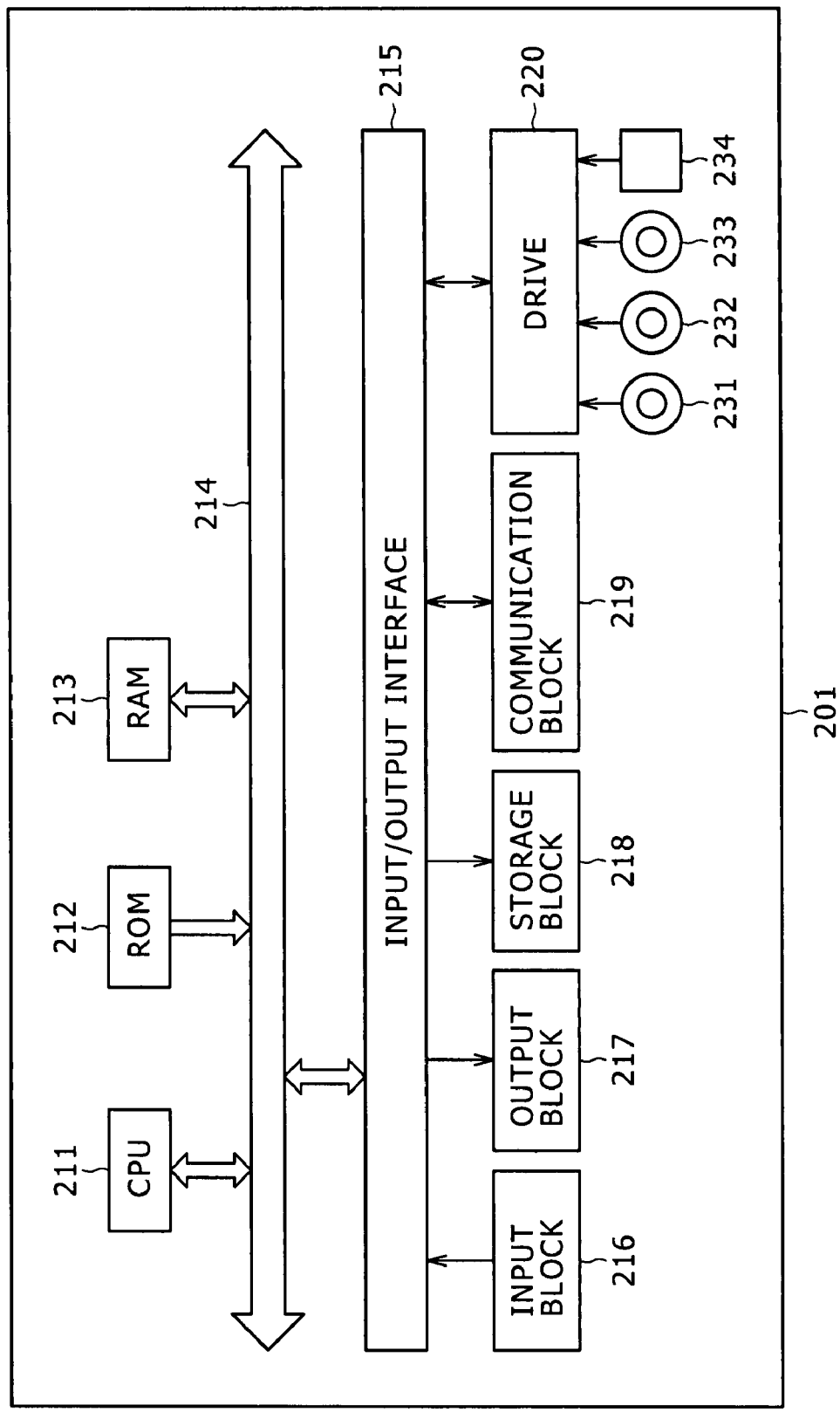
FIG. 28 is a block diagram showing a structure of a personal computer.

In FIG. 28, a CPU (central processing unit) 211 performs various processes based on the programs stored in a ROM (read only memory) 212 or on the programs loaded from a storage block 218 into a RAM (random access memory) 213. The RAM 213 also retains data that may be necessary for the CPU 211 to carry out its diverse processes.

The CPU 211, ROM 212, and RAM 213 are interconnected by a bus 214. An input/output interface 215 is also connected to the bus 214.

The input/output interface 215 is connected with an input block 216, an output block 217, the storage block 218, and a communication block 219. The input block 216 typically includes a keyboard and a mouse, and the output block 217 by a display unit and speakers. The storage block 218 is for example formed by a hard disk drive, and the communication block 219 by a modem and/or a terminal adapter. The communication block 219 performs communications over networks including the Internet.

The input/output interface 215 is also connected as necessary with a drive 220. A magnetic disk 231, an optical disk 232, a magneto-optical disk 233, or a semiconductor memory 234 may be loaded into the drive 220. Computer programs retrieved from the loaded recording medium are installed as necessary into the storage block 218.

For a series of processes to be carried out by software, the programs including the software may be either preinstalled into dedicated hardware of a suitable computer, or installed upon use over a network or from an appropriate recording medium into a general-purpose personal computer or like equipment capable of implementing diverse functions using the installed programs.

As shown in FIG. 28, the recording medium is provided to users not only as a package medium apart from their computers and includes the a magnetic disk 231 (including floppy disks), optical disk 232 (including CD-ROM (compact disk-read only memory) and DVD (digital versatile disk)), magneto-optical disk 233 (including MD (Mini-disc; registered trademark)), or semiconductor memory 234 (each medium carrying the necessary programs); but also in the form of the ROM 212 or the hard disk drive in the storage block 218, each accommodating the programs and incorporated beforehand in the apparatus when provided to the users.

In this specification, the steps which describe the programs stored in the recording medium represent not only the processes that are to be carried out in the depicted sequence (i.e., on a time series basis) but also processes that may be performed parallelly or individually and not chronologically.

The series of steps and processes discussed above may also be carried out by having a plurality of sub CPU cores operated in parallel. In this case, the editing apparatus 1 described earlier in reference to FIG. 1 may includes an editing system shown in FIG. 29.

Figure 29:
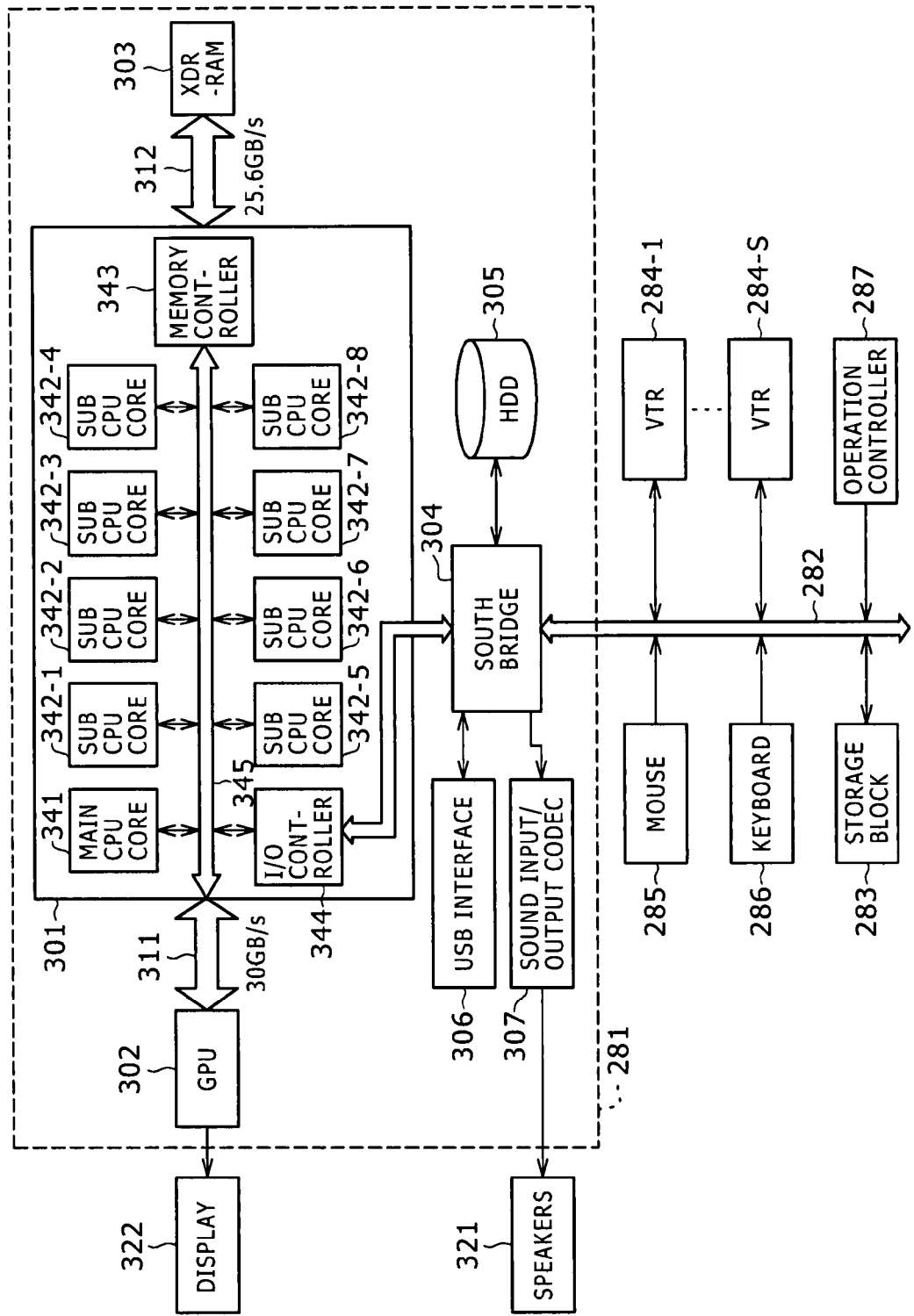
FIG. 29 is a schematic view explanatory of a structure of another apparatus to which the present invention can be applied.

As shown in FIG. 29, the editing system corresponding to the editing apparatus 1 in FIG. 1 includes an editing apparatus 281, a storage block 283, and a plurality of video tape recorders (VTR) 284-1 through 284-S. The storage block 283 and VTRs 284-1 through 284-S are connected to the editing apparatus 281 via a PCI bus 282. The editing system further includes a mouse 285, a keyboard 286, and an operation controller 287 which are manipulated by the user to operate the configured devices.

The editing system above is capable of admitting moving picture contents into the storage block 283 and having the acquired contents suitably edited into desired pictures and sounds. The resulting pictures and sounds are stored as newly created clips onto the large-capacity storage block 283 composed of RAID (Redundant Arrays of Independent Disks) or onto video tapes through the VTRs 284-1 through 284-S. Still picture contents recorded on the video tape loaded in any of the VTRs 284-1 through 284-S can also be recorded to the storage block 283.

The editing apparatus 281 includes a microprocessor 301, a GPU (graphics processing unit) 302, an XDR-RAM (extreme data rate-random access memory) 303, a south bridge 304, a HDD (hard disk drive) 305, a USB interface 306, and a sound input/output codec 307.

In the editing apparatus 281, the microprocessor 301 is connected with the GPU 302, XDR-RAM 303, and south bridge 304. The south bridge 304 is connected with the HDD 305, USB interface 306, and sound input/output codec 307. Speakers 321 are connected to the sound input/output codec 307, and a display unit 322 is connected to the GPU 302.

The south bridge 304 is connected with the mouse 285, keyboard 286, VTRs (video tape recorders) 284-1 through 284-S, storage block 283, and operation controller 287 by way of the PCI bus 282.

The mouse 285 and keyboard 286 receive the operations input by the user and send signals reflecting the user's operation input to the microprocessor 301 through the PCI bus 282 and south bridge 304. The storage block 283 and VTRs 284-1 through 284-S let designated data by recorded or reproduced.

The microprocessor 301 is includes a general-purpose main CPU core 341 for executing basic programs such as the OS (operating system), by a plurality of (e.g., eight) RISC (reduced instruction set computer) type signal processors (called sub CPU cores) 342-1 through 342-8 connected to the main CPU core 341 via an internal bus 345, by a memory controller 343 for controlling the XDR-RAM 303 for example with a capacity of 256 megabytes, and by an I/O (in/out) controller 344 for managing data input and output to and from the south bridge 304. These components make up a one-chip multi-core arrangement for example operating on an operation frequency of 4 GHz.

In the editing apparatus 281, the microprocessor 301 acts as a codec operating for example under the MPEG, JPEG (Joint Photographic Experts Group) 2000, or H.264/AVC (Advanced Video Coding) standards. In operation, the microprocessor 301 sends encoded streams through the south bridge 304 to the HDD 305 for storage. The microprocessor 301 also transfers the moving or still picture contents acquired through decoding and constituting reproduced videos to the GPU 302 for display on the display unit 322. The microprocessor 301 further carries out physical computations on coding and decoding operations.

In addition, the microprocessor 301 can extract various parameters from the baseband signal to be processed or from encoded streams.

In particular, eight sub CPU cores 342-1 through 342-8 including the microprocessor 301 play the roles of the encoders constituting the encoder unit. Thus structured, the eight sub CPU cores 342-1 through 342-8 can encode the baseband signal in sections concurrently and in parallel.

That is, the microprocessor 301 with its eight sub CPU cores 342-1 through 342-8 is designed to perform encoding processes in concurrently parallel fashion.

Alternatively, some of the eight sub CPU cores 342-1 through 342-8 in the microprocessor 301 may carry out encoding while the others perform decoding, parallelly and concurrently.

The PCI bus 282 may, for example, be connected with an independently established encoder, decoder, or codec. In this case, the eight sub CPU cores 342-1 through 342-8 including the microprocessor 301 can control the connected equipment in operation by way of the south bridge 304 and PCI bus 282. If a plurality of units of the equipment are connected to the PCI bus 282, or if the connected equipment includes a plurality of decoders or encoders, then the eight sub CPU cores 342-1 through 342-8 in the microprocessor 301 can separately control these decoders or encoders in carrying out their processing.

The main CPU core 341 is arranged to deal with those processing and management tasks that are not taken up by the eight sub CPU cores 342-1 through 342-8. In operation, the main CPU core 341 performs diverse processes in response to the instructions provided from the mouse 285, keyboard 286, or operation controller 287 by way of the south bridge 304.

Upon activation, the microprocessor 301 reads necessary application programs from the HDD 305 in accordance with control programs stored thereon and loads what has been retrieved into the XDR-RAM 303. Thereafter the microprocessor 301 carries out necessary control processes based on the loaded application programs and on the operator's manipulations.

The GPU 302 typically controls the following functions: ultimate rendering of textures to be pasted onto reproduced moving picture contents being displayed on the display unit 322; calculations of coordinate transformation to display on the display unit 322 a plurality of reproduced still or moving pictures derived from still or moving picture contents; and processes for enlarging and contracting reproduced still and moving pictures contents out of still and moving picture contents. By controlling these functions, the CPU 302 alleviates the processing load on the microprocessor 301.

Under control of the microprocessor 301, the GPU 302 performs relevant signal processing on the video data of provided moving picture contents as well as on the picture data of still picture contents. The resulting video data and picture data are sent to the display unit 322 which in turn displays pictures based on received picture signals.

A plurality of reproduced videos are transferred from a plurality of moving picture contents decoded in a concurrently parallel manner by the eight sub CPU cores 342-1 through 342-8 including the micro processor 301. The reproduced videos are transferred to the GPU 302 over the bus 311. The rate of reproduced video transfer is typically up to 30 gigabytes/second, which ensures a smooth and high-speed display of even a complex reproduced video full of special effects.

The microprocessor 301 performs audio mixing processing on the audio data out of moving picture contents (video data and audio data). The audio data thus edited is passed to the speakers 321 via the south bridge 304 and sound input/output codec 307. In turn, the speakers 321 output sounds based on received audio signals.

As described above, the encoding processes discussed in connection with the embodiment of the invention may also be carried out or controlled in parallel by the multiple sub CPU cores constituting the microprocessor 301 of the editing system.

In the embodiment of the invention discussed above, the editing apparatus 1 was shown to incorporate both decoders and encoders. Alternatively, the invention may be applied to a case where decoders and encoders are each structured as an independent entity. For example, as shown in FIG. 30, there may be provided a decoding apparatus 371 and an encoding apparatus 372 each established as an independent entity, the decoding apparatus 371 decoding stream data into a baseband signal, the encoding apparatus 372 encoding the baseband signal into stream data.

In the above structure, the decoding apparatus 371 may not only decode compression-encoded data and provide the uncompressed data to the encoding apparatus 372; the decoding apparatus 371 may also receive compression-encoded data from the encoding apparatus 372 that acquired it through partial encoding and editing according to the present embodiment and convert the received data into a baseband signal through decoding. The edited streams converted into the baseband signal are for example provided to a suitable display unit for display or output to another apparatus for necessary processing.

Another alternative of the above-described embodiment of the present invention can be applied to a case where the decoder unit 22 may incompletely decode provided compression-encoded data and the corresponding encoder unit 24 may partially encode the relevant part of the incompletely decoded data.

For example, if the decoder unit 22 performs only decoding and reverse quantization with regard to VLC (variable length coding) and does not carry out reverse DCT (discrete cosine transform), then the encoder unit 24 performs quantization and VLC but does not carry out DCT. The present invention obviously applies to this type of encoder that performs partial encoding (i.e., encoding of data from a halfway point onward).

As another alternative of the above-described embodiment, the present invention may be applied to cases in which the baseband signal completely decoded by the decoder unit 22 is encoded halfway by the encoder unit 24 (e.g., DCT and quantization are carried out but VLC is not performed), or in which halfway-encoded data from incomplete decoding by the decoder unit 22 (e.g., only decoding and reverse quantization regarding VLC are carried out and reverse DCT is not performed) is further encoded halfway by the encoder unit 24 (e.g., quantization is performed but VLC is not performed).

Furthermore, the present invention may also be applied to a case where the decoding apparatus 371 in FIG. 30 incompletely decodes provided stream data and the corresponding encoding apparatus 372 partially encodes the relevant part of the incompletely decoded data thus obtained.

For example, if the decoding apparatus 371 performs only decoding and reverse quantization with regard to VLC and does not carry out reverse DCT, then the encoding apparatus 372 executes quantization and VLC but does not conduct DCT. The present invention naturally applies to this case of partial decoding (i.e., decoding up to a halfway point) by the decoding apparatus 371 and of partial encoding (i.e., encoding from a halfway point on) by the encoding apparatus 372.

The present invention may also be applied to cases in which the baseband signal completely decoded by the decoding apparatus 371 is encoded halfway by the encoding apparatus 372 (e.g., DCT and quantization are carried out but VLC is not performed), or in which halfway-encoded data from incomplete decoding by the decoding apparatus 371 (e.g., only decoding and reverse quantization regarding VLC are carried out and reverse DCT is not performed) is further encoded halfway by the encoding apparatus 372 (e.g., quantization is carried out but VLC is not performed).

The present invention may further be applied to a transcoder 381 includes the decoding apparatus 371 that executes partial decoding (i.e., performs part of the decoding process) and by the decoding apparatus 372 that carries out partial encoding (i.e., performs part of the encoding process). This type of transcoder 381 is used for example in combination with an editing apparatus 382 that carries out slicing and other editing processes, i.e., an editing apparatus capable of taking over the functions of a stream splicer 25 and an effect/switch 26 included in the above-described editing apparatus 1.

In the embodiment discussed above, the CPU 11 and the CPU 20 were shown to be structured as separate entities. Alternatively, a single CPU arrangement may be provided to control the editing apparatus 1 as a whole. In a similar alternative of the embodiment above shown to have the memory 13 and the memory 21 set up separately, a single memory may be provided for the entire editing apparatus 1.

In the above-described embodiment, the CPU 11 and CPU 20 were shown connected with the HDD 16, decoder unit 22, selector 23, and encoder unit 24 through bridge and bus arrangements to make up an integral editing apparatus. Alternatively, some of these components may be connected wirelessly or in wired fashion from the outside. As another alternative, these components may be interconnected in diverse manners.

In the embodiment described above, the HDD was shown to store compression-encoded streams or uncompressed baseband signals thereon. Alternatively, the present invention may be applied to cases where encoded streams or baseband signals are recorded on such diverse recording media as optical disks, magneto-optical disks, semiconductor memory, or magnetic disks before they are processed.

In the embodiment discussed above, the decoder unit 22, selector 23, and encoder unit 24 were assumed to be mounted on a single extension card (e.g., PCI card, PCI-Express card). Alternatively, these components may be mounted on separate extension cards if sufficiently high rates of data transfer are ensured between the cards for example thanks to PCI-Express technology.

In this specification, the term "system" refers to an entire configuration includes a plurality of component devices or apparatuses.

It should be understood by those skilled in the art that various modifications, combinations, sub-combinations and alterations may occur depending on design requirements and other factor in so far as they are within the scope of the appended claims or the equivalents thereof.

What is claimed is:

1. An information processing apparatus for encoding a baseband signal, said information processing apparatus comprising:
    a data splitting block to acquire said baseband signal before splitting it into predetermined encoding sections;
    an encoder unit to generate encoded streams by parallelly encoding a continuous plurality of said encoding sections acquired by said data splitting block from said baseband signal;
    a control processor to control said encoder unit to perform the parallel encoding in a manner subject to predetermined constraints; and
    a splicing block to splice said encoded streams generated by said encoder unit,
    wherein said predetermined constraints include performing the encoding process in such a manner that said encoding sections acquired by said data splitting block have boundaries shifted temporally backward by an interval M from the boundaries of GOPs of said encoded streams generated by said encoder, said interval M separating either an I-picture from the next I-picture or a P-picture from the next P-picture.

2. The information processing apparatus according to claim 1, wherein said constraints involve performing the encoding process in such a manner that said encoding sections acquired by said data splitting block have boundaries overlapping with the boundaries of GOPs of said encoded streams generated by said encoder unit.

3. The information processing apparatus according to claim 2, wherein said constraints involve performing said encoding process in such a manner that a starting GOP of each of said encoding sections acquired by said data splitting block is used as a closed GOP.

4. The information processing apparatus according to claim 1, wherein said constraints involve adding either a Sequence Header or a Quant Matrix Extension to an encode starting point of each of said encoding sections acquired by said data splitting block.

5. The information processing apparatus according to claim 1, wherein said constraints involve controlling a generated code quantity in such a manner that VBV buffer occupancy at an encode ending point of each of said encoding sections acquired by said data splitting block becomes equal to VBV buffer occupancy at an encode starting point of the next encoding section.

6. The information processing apparatus according to claim 1, wherein said constraints involve performing said encoding process in such a manner as to acquire a baseband signal provided with the last picture of the preceding encoding section for each encoding section preceded by the baseband signal corresponding to another encoding section among said encoding sections acquired by said data splitting block, said last picture of said preceding encoding section being not output when encoded but used as a reference picture.

7. The information processing apparatus according to claim 6, wherein said constraints involve matching conditions for encoding said last picture of said preceding encoding section used as the reference picture, to the conditions for encoding the corresponding picture of the preceding encoding section being parallelly encoded.

8. The information processing apparatus according to claim 7, wherein said encoding conditions include bits assigned to the pictures and a Q scale of a first macro block.

9. The information processing apparatus according to claim 1, wherein said constraints involve performing said encoding process in such a manner as to acquire a baseband signal provided with the last M+1 pictures of the preceding encoding section for each encoding section preceded by the baseband signal corresponding to another section among said encoding sections acquired by said data splitting block, the last picture of the preceding encoding section being not output when encoded but used as a reference picture.

10. The information processing apparatus according to claim 9, wherein said constraints involve encoding a second and a third picture from said last M+1 pictures of the preceding encoding section using the encoded first picture as the reference picture, said second and said third pictures being not output when encoded but used as a basis for controlling the generated code quantity corresponding to the encoded second and third pictures of the preceding encoding section being parallelly encoded.

11. The information processing apparatus according to claim 10, wherein said constraints involve performing said encoding process using the first picture among said last M+1 pictures of the preceding encoding section acquired as an I-picture.

12. An information processing method for use with an information processing apparatus for encoding a baseband signal, said information processing method comprising the steps of:
controlling acquisition of said baseband signal before splitting it into predetermined encoding sections;
controlling provision of a continuous plurality of the predetermined encoding sections to encoders of said information processing apparatus;
generating encoded streams by causing said encoders parallelly to encode said predetermined encoding sections including said baseband in a manner subject to predetermined constraints; and
Splicing said encoded streams generated,
wherein said predetermined constraints include performing the encoding process in such a manner that said encoding sections acquired by said data splitting block have boundaries shifted temporally backward by an interval M from the boundaries of GOPs of said encoded streams generated by said encoder, said interval M separating either an I-picture from the next I-picture or a P-picture from the next P-picture.

* * * * *